United States Patent
Takanohashi et al.

(10) Patent No.: US 12,545,808 B2
(45) Date of Patent: Feb. 10, 2026

(54) HARD COATING FILM, HARD COATING FILM-APPLIED SUBSTRATE, COATING MATERIAL COMPOSITION, AND WINDOW MATERIAL

(71) Applicant: ASAHI KASEI KABUSHIKI KAISHA, Tokyo (JP)

(72) Inventors: Hiroaki Takanohashi, Tokyo (JP); Kyohei Hattori, Tokyo (JP); Megumi Sasaki, Tokyo (JP); Keigo Sasaki, Tokyo (JP); Toshinobu Ogasawara, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 954 days.

(21) Appl. No.: 17/271,809

(22) PCT Filed: Aug. 30, 2019

(86) PCT No.: PCT/JP2019/034136
§ 371 (c)(1),
(2) Date: Feb. 26, 2021

(87) PCT Pub. No.: WO2020/045632
PCT Pub. Date: Mar. 5, 2020

(65) Prior Publication Data
US 2021/0324232 A1 Oct. 21, 2021

(30) Foreign Application Priority Data

Aug. 31, 2018 (JP) ................................ 2018-163683
Apr. 2, 2019 (JP) ................................ 2019-070499

(51) Int. Cl.
| | |
|---|---|
| C09D 183/04 | (2006.01) |
| C08J 7/043 | (2020.01) |
| C08J 7/046 | (2020.01) |
| C08K 3/36 | (2006.01) |
| C09D 7/40 | (2018.01) |
| C09D 7/65 | (2018.01) |

(52) U.S. Cl.
CPC ............ *C09D 183/04* (2013.01); *C08J 7/043* (2020.01); *C08J 7/046* (2020.01); *C08K 3/36* (2013.01); *C09D 7/65* (2018.01); *C09D 7/67* (2018.01); *C09D 7/68* (2018.01); *C08J 2369/00* (2013.01); *C08J 2483/04* (2013.01); *C08K 2201/011* (2013.01)

(58) Field of Classification Search
None
See application file for complete search history.

(56) References Cited

U.S. PATENT DOCUMENTS

| | | |
|---|---|---|
| 2012/0285528 A1 | 11/2012 | Takanohashi et al. |
| 2014/0047974 A1 | 2/2014 | Sugimoto et al. |
| 2017/0276840 A1 | 9/2017 | Horio et al. |
| 2018/0045870 A1 | 2/2018 | Asahi et al. |
| 2018/0065147 A1 | 3/2018 | Iseda et al. |

FOREIGN PATENT DOCUMENTS

| | | | | |
|---|---|---|---|---|
| CN | 102341467 A | 2/2012 | | |
| CN | 105368070 A | 3/2016 | | |
| CN | 106715121 A | 5/2017 | | |
| CN | 107531028 A | 1/2018 | | |
| EP | 3315571 A1 * | 5/2018 | ........... | B05D 3/0254 |
| JP | 8-238683 A | 9/1996 | | |
| JP | 2004269699 A * | 9/2004 | | |
| JP | 2006-63244 A | 3/2006 | | |
| JP | 2007-332262 A * | 12/2007 | | |
| JP | 2009-29893 A | 2/2009 | | |
| JP | 2009-280706 A | 12/2009 | | |
| JP | 2010-228314 A | 10/2010 | | |
| JP | 2010-235682 A | 10/2010 | | |
| JP | 2014-109712 A | 8/2014 | | |
| JP | 2016-107231 A | 6/2016 | | |
| JP | 2016-108497 A | 6/2016 | | |
| JP | 2017-33032 A | 2/2017 | | |
| JP | 2017-114949 A | 8/2017 | | |
| WO | WO 2012/111626 A1 | 8/2012 | | |
| WO | WO 2016/208735 A | 12/2016 | | |

OTHER PUBLICATIONS 2-page article of Dynamic Ultra Micro Hardness Tester by Shimadzu, First Edition, Oct. 2020, Downloaded on Jun. 12, 2024.*
International Preliminary Report on Patentability and Written Opinion of the International Searching Authority with an English translation, dated Mar. 2, 2021 for International Application No. PCT/JP2019/034136.
International Search Report, dated Nov. 19, 2019, for International Application No. PCT/JP2019/034136, with an English translation.
European Supplementary Search Report for European Application No. 19855423.0, dated Oct. 5, 2021.

* cited by examiner

*Primary Examiner* — Tae H Yoon
(74) *Attorney, Agent, or Firm* — Birch, Stewart, Kolasch & Birch, LLP

(57) ABSTRACT

A hard coating film containing a polymer nanoparticle (A) and a matrix component (B), wherein
a Martens hardness $HM_A$ of the polymer nanoparticle (A) and a Martens hardness $HM_B$ of the matrix component (B) satisfy a relationship of $HM_B/HM_A>1$, and
a Martens hardness HM of the hard coating film is 100 $N/mm^2$ or more.

34 Claims, No Drawings

HARD COATING FILM, HARD COATING FILM-APPLIED SUBSTRATE, COATING MATERIAL COMPOSITION, AND WINDOW MATERIAL

CROSS REFERENCE TO RELATED APPLICATIONS

This application is the National Phase of PCT International Application No. PCT/JP2019/034136, filed on Aug. 30, 2019, which claims priority under 35 U.S.C. 119(a) to Patent Application No. 2018-163683, filed in Japan on Aug. 31, 2018 and Patent Application No. 2019-070499, filed in Japan on Apr. 2, 2019, all of which are hereby expressly incorporated by reference into the present application.

TECHNICAL FIELD

The present invention relates to a hard coating film, a hard coating film-applied substrate, a coating material composition, and a window material.

BACKGROUND ART

Resin materials, although are excellent in moldability and lightweight properties, are often inferior in hardness, barrier properties, contamination resistance, chemical resistance, flame retardance, heat resistance, weather resistance, and the like, as compared with inorganic materials such as metals and glass. Resin materials are, in particular, remarkably low in hardness as compared with inorganic glass, the surfaces thereof are easily scratched and thus often used with being covered with hard coatings, such hard coating films have a difficulty in keeping contamination resistance to soot and dust and performances at high temperature and high humidity, and resin materials covered with hard coatings are not used in applications where high abrasion resistance and high durability are required.

There have been proposed for the purpose of imparting abrasion resistance to resin materials, a method involving using an active energy ray-curing resin composition (for example, Patent Literature 1), a method involving adding an inorganic oxide to a resin material (for example, Patent Literature 2 and Patent Literature 3), and a method involving adding a polymer particle to a resin material (for example, Patent Literature 4).

CITATION LIST

Patent Literatures

Patent Literature 1: Japanese Patent Laid-Open No. 2014-109712
Patent Literature 2: Japanese Patent Laid-Open No. 2006-63244
Patent Literature 3: Japanese Patent Laid-Open No. 8-238683
Patent Literature 4: Japanese Patent Laid-Open No. 2017-114949

SUMMARY OF INVENTION

Technical Problem

While the methods of Patent Literature 1 and Patent Literature 2 are common methods for imparting abrasion resistance to resin materials, the methods have a difficulty in imparting high abrasion resistance thereto.

While the method of Patent Literature 3 is a common method using a soft silicone polymer and a hard inorganic oxide fine particle in a hard coating film, the silicone polymer corresponding to a matrix component does not have any sufficient hardness and thus abrasion resistance is not sufficient.

While Patent Literature 4 describes a method using a polymer particle, a silicone polymer and an inorganic oxide fine particle in a hard coating film and describes physical properties of such a coating film, it does not describe any physical properties of each component, does not provide sufficient abrasion resistance, and does not describe any contamination resistance.

The present invention has been made in view of the above problems, and an object thereof is to provide a hard coating film, a hard coating film-applied substrate, a coating material composition, and a window material, each of which has high abrasion resistance and high durability.

Solution to Problem

The present inventors have made intensive studies, and as a result, have found that the above problems can be solved by a coating film including predetermined components, thereby leading to completion of the present invention.

That is, the present invention encompasses the following aspects.

[1]
A hard coating film comprising a polymer nanoparticle (A) and a matrix component (B), wherein a Martens hardness $HM_A$ of the polymer nanoparticle (A) and a Martens hardness $HM_B$ of the matrix component (B) satisfy a relationship of $HM_B/HM_A>1$, and a Martens hardness HM of the hard coating film is 100 N/mm² or more.

[2]
The hard coating film according to [1], wherein when a Taber abrasion test is performed under conditions of an abrasive wheel CS-10F and a load of 500 g according to ASTM D1044, a difference between a haze at a rotation number of 500 and a haze at a rotation number of 10 is 10 or less.

[3]
The hard coating film according to [1] or [2], wherein when a Taber abrasion test is performed under conditions of an abrasive wheel CS-10F and a load of 500 g according to ASTM D1044, a difference between a haze at a rotation number of 1000 and a haze before the Taber abrasion test is 10 or less.

[4]
The hard coating film according to any one of [1] to [3], wherein an elastic recovery rate $\eta_{IT}$, as measured by an indentation test according to ISO14577-1, is 0.50 or more.

[5]
The hard coating film according to any one of [1] to [4], wherein
the polymer nanoparticle (A) comprises a hydrolyzable silicon compound (a), and
a content of the hydrolyzable silicon compound (a) in the polymer nanoparticle (A) is 50% by mass or more.

[6]
The hard coating film according to any one of [1] to [5], wherein a film thickness of the hard coating film is 1 μm or more and 100 μm or less.

[7]

The hard coating film according to any one of [1] to [6], wherein an average particle size of the polymer nanoparticle (A) is 10 nm or more and 400 nm or less.

[8]

The hard coating film according to any one of [1] to [7], wherein a volume fraction of the polymer nanoparticle (A) in the hard coating film is 2% or more and 80% or less.

[9]

The hard coating film according to any one of [1] to [8], wherein the hydrolyzable silicon compound (a) comprises one or more selected from a compound having an atomic group represented by the following formula (a-1) and a hydrolyzed product and a condensate thereof, and a compound represented by the following formula (a-2) and a hydrolyzed product and a condensate thereof:

$$-R^1_{n1}SiX^1_{3-n1} \quad \text{(a-1)}$$

wherein $R^1$ represents a hydrogen atom, an alkyl group, an alkenyl group or an alkynyl group having 1 to 10 carbon atoms, or an aryl group, $R^1$ optionally has a substituent having halogen, a hydroxy group, a mercapto group, an amino group, a (meth)acryloyl group or an epoxy group, $X^1$ represents a hydrolyzable group, and n1 represents an integer of 0 to 2;

$$SiX^2_4 \quad \text{(a-2)}$$

wherein $X^2$ represents a hydrolyzable group.

[10]

The hard coating film according to any one of [1] to [9], wherein the matrix component (B) comprises a hydrolyzable silicon compound (b).

[11]

The hard coating film according to [10], wherein the hydrolyzable silicon compound (b) comprises one or more selected from a compound having an atomic group represented by the following formula (b-1) and a hydrolyzed product and a condensate thereof, and a compound represented by the following formula (b-2) and a hydrolyzed product and a condensate thereof:

$$-R^2_{n2}SiX^3_{3-n2} \quad \text{(b-1)}$$

wherein $R^2$ represents a hydrogen atom, an alkyl group, an alkenyl group or an alkynyl group having 1 to 10 carbon atoms, or an aryl group, $R^2$ optionally has a substituent having halogen, a hydroxy group, a mercapto group, an amino group, a (meth)acryloyl group or an epoxy group, $X^3$ represents a hydrolyzable group, and n2 represents an integer of 0 to 2;

$$SiX^4_4 \quad \text{(b-2)}$$

wherein $X^4$ represents a hydrolyzable group.

[12]

The hard coating film according to any one of [1] to [11], wherein the matrix component (B) comprises an inorganic oxide (D).

[13]

The hard coating film according to [12], wherein an average particle size of the inorganic oxide (D) is 2 nm or more and 150 nm or less.

[14]

The hard coating film according to [12] or [13], wherein the inorganic oxide (D) is a silica particle.

[15-1]

A hard coating film comprising a polymer nanoparticle (A) and a matrix component (B), wherein a cohesion force $F_A$ of the polymer nanoparticle (A) and a cohesion force $F_B$ of the matrix component (B), as measured in a cohesion force mode of a scanning probe microscope, satisfy a relationship of $F_A/F_B>1$, and a Martens hardness HM of the hard coating film is 100 N/mm² or more.

[15-2]

The hard coating film according to [15-1], wherein when a Taber abrasion test is performed under conditions of an abrasive wheel CS-10F and a load of 500 g according to ASTM D1044, a difference between a haze at a rotation number of 500 and a haze at a rotation number of 10 is 10 or less.

[15-3]

The hard coating film according to [15-1] or [15-2], wherein when a Taber abrasion test is performed under conditions of an abrasive wheel CS-10F and a load of 500 g according to ASTM D1044, a difference between a haze at a rotation number of 1000 and a haze before the Taber abrasion test is 10 or less.

[15-4]

The hard coating film according to any one of [15-1] to [15-3], wherein an elastic recovery rate $\eta_{IT}$, as measured by an indentation test according to ISO14577-1, is 0.50 or more.

[15-5]

The hard coating film according to any one of [15-1] to [15-4], wherein the polymer nanoparticle (A) comprises a hydrolyzable silicon compound (a), and a content of the hydrolyzable silicon compound (a) in the polymer nanoparticle (A) is 50% by mass or more.

[15-6]

The hard coating film according to any one of [15-1] to [15-5], wherein a film thickness of the hard coating film is 1 μm or more and 100 μm or less.

[15-7]

The hard coating film according to any one of [15-1] to [15-6], wherein an average particle size of the polymer nanoparticle (A) is 10 nm or more and 400 nm or less.

[15-8]

The hard coating film according to any one of [15-1] to [15-7], wherein a volume fraction of the polymer nanoparticle (A) in the hard coating film is 2% or more and 80% or less.

[15-9]

The hard coating film according to any one of [15-1] to [15-8], wherein the hydrolyzable silicon compound (a) comprises one or more selected from a compound having an atomic group represented by the following formula (a-1) and a hydrolyzed product and a condensate thereof, and a compound represented by the following formula (a-2) and a hydrolyzed product and a condensate thereof:

$$-R^1_{n1}SiX^1_{3-n1} \quad \text{(a-1)}$$

wherein $R^1$ represents a hydrogen atom, an alkyl group, an alkenyl group or an alkynyl group having 1 to 10 carbon atoms, or an aryl group, $R^1$ optionally has a substituent having halogen, a hydroxy group, a mercapto group, an amino group, a (meth)acryloyl group or an epoxy group, $X^1$ represents a hydrolyzable group, and n1 represents an integer of 0 to 2;

$$SiX^2_4 \quad \text{(a-2)}$$

wherein $X^2$ represents a hydrolyzable group.

[15-10]

The hard coating film according to any one of [15-1] to [15-9], wherein the matrix component (B) comprises a hydrolyzable silicon compound (b).

[15-11]

The hard coating film according to [15-10], wherein the hydrolyzable silicon compound (b) comprises one or more selected from a compound having an atomic group represented by the following formula (b-1) and a hydrolyzed product and a condensate thereof, and a compound represented by the following formula (b-2) and a hydrolyzed product and a condensate thereof:

$$—R^2_{n2}SiX^3_{3-n2} \quad \text{(b-1)}$$

wherein $R^2$ represents a hydrogen atom, an alkyl group, an alkenyl group or an alkynyl group having 1 to 10 carbon atoms, or an aryl group, $R^2$ optionally has a substituent having halogen, a hydroxy group, a mercapto group, an amino group, a (meth)acryloyl group or an epoxy group, $X^3$ represents a hydrolyzable group, and n2 represents an integer of 0 to 2;

$$SiX^4_4 \quad \text{(b-2)}$$

wherein $X^4$ represents a hydrolyzable group.

[15-12]

The hard coating film according to any one of [15-1] to [15-11], wherein the matrix component (B) comprises an inorganic oxide (D).

[15-13]

The hard coating film according to [15-12], wherein an average particle size of the inorganic oxide (D) is 2 nm or more and 150 nm or less.

[15-14]

The hard coating film according to [15-12] or [15-13], wherein the inorganic oxide (D) is a silica particle.

[16]

The hard coating film according to any one of [1] to [14] and [15-1] to [15-14], for use in an automobile member.

[17]

A hard coating film-applied substrate, comprising
a substrate, and
the hard coating film according to any one of [1] to [14] and [15-1] to [15-14] and [16], formed on one surface and/or both surfaces of the substrate.

[18]

The hard coating film-applied substrate according to [17], further comprising an adhesion layer disposed between the substrate and the hard coating film.

[19]

The hard coating film-applied substrate according to [18], wherein the adhesion layer comprises an adhesive emulsion particle (F).

[20]

The hard coating film-applied substrate according to [19], wherein an average particle size of the adhesive emulsion particle (F) is 300 nm or less.

[21]

The hard coating film-applied substrate according to any one of [18] to [20], wherein the adhesion layer further comprises an inorganic oxide (G).

[22]

The hard coating film-applied substrate according to [21], wherein the inorganic oxide (G) is a silica particle.

[23]

The hard coating film-applied substrate according to any one of [17] to [22], for use in an automobile member.

[24]

A coating material composition comprising a polymer nanoparticle (A) and a matrix raw material component (B'), wherein an elastic recovery rate $\eta_{IT4}$ of the polymer nanoparticle (A), as measured by an indentation test according to ISO14577-1, is 0.30 or more and 0.90 or less, and a Martens hardness $HM_A$ of the polymer nanoparticle (A) and a Martens hardness $HM_{B'}$ of the matrix raw material component (B') satisfy a relationship of $HM_{B'}/HM_A>1$.

[25]

The coating material composition according to [24], wherein
the polymer nanoparticle (A) comprises a hydrolyzable silicon compound (a), and
the matrix raw material component (B') comprises a hydrolyzable silicon compound (b).

[26]

The coating material composition according to [25], wherein a content of the hydrolyzable silicon compound (a) in the polymer nanoparticle (A) is 50% by mass or more.

[27]

The coating material composition according to any one of [24] to [26], wherein a volume fraction of the polymer nanoparticle (A) based on a total of the polymer nanoparticle (A) and the matrix raw material component (B') is 2 to 80%.

[28]

The coating material composition according to any one of [24] to [27], wherein the polymer nanoparticle (A) has a functional group (e) having a secondary amide group and/or a tertiary amide group.

[29]

The coating material composition according to any one of [24] to [28], wherein an elastic recovery rate $\eta_{ITB'}$ of the matrix raw material component (B'), as measured by an indentation test according to ISO14577-1, is 0.60 or more and 0.95 or less.

[30]

The coating material composition according to any one of [24] to [29], wherein the hydrolyzable silicon compound (a) comprises one or more selected from a compound having an atomic group represented by the following formula (a-1) and a hydrolyzed product and a condensate thereof, and a compound represented by the following formula (a-2) and a hydrolyzed product and a condensate thereof:

$$—R^1_{n1}SiX^1_{3-n1} \quad \text{(a-1)}$$

wherein $R^1$ represents a hydrogen atom, an alkyl group, an alkenyl group or an alkynyl group having 1 to 10 carbon atoms, or an aryl group, $R^1$ optionally has a substituent having halogen, a hydroxy group, a mercapto group, an amino group, a (meth)acryloyl group or an epoxy group, $X^1$ represents a hydrolyzable group, and n1 represents an integer of 0 to 2;

$$SiX^2_4 \quad \text{(a-2)}$$

wherein $X^2$ represents a hydrolyzable group.

[31]

The coating material composition according to any one of [24] to [30], wherein the hydrolyzable silicon compound (b) comprises one or more selected from a compound having an atomic group represented by the following formula (b-1) and a hydrolyzed product and a condensate thereof, and a compound represented by the following formula (b-2) and a hydrolyzed product and a condensate thereof:

$$—R^2_{n2}SiX^3_{3-n2} \quad \text{(b-1)}$$

wherein $R^2$ represents a hydrogen atom, an alkyl group, an alkenyl group or an alkynyl group having 1 to 10 carbon atoms, or an aryl group, $R^2$ optionally has a substituent having halogen, a hydroxy group, a mercapto group, an amino group, a (meth)acryloyl group or an epoxy group, $X^3$ represents a hydrolyzable group, and n2 represents an integer of 0 to 2;

$$SiX^4{}_4 \qquad (b\text{-}2)$$

wherein $X^4$ represents a hydrolyzable group.

[32]
The coating material composition according to any one of [24] to [31], wherein the matrix raw material component (B') further comprises an inorganic oxide (D).

[33]
The coating material composition according to [32], wherein an average particle size of the inorganic oxide (D) is 2 nm or more and 150 nm or less.

[34]
The coating material composition according to [32] or [33], wherein the inorganic oxide (D) is a silica particle.

[35]
The coating material composition according to any one of [24] to [34], wherein the polymer nanoparticle (A) has a core/shell structure comprising a core layer and one or more shell layers covering the core layer.

[36]
A window material comprising a polycarbonate resin and a coating film disposed on the polycarbonate resin, wherein
the coating film comprises a polymer nanoparticle (A) and a matrix component (B),
the polymer nanoparticle (A) comprises a hydrolyzable silicon compound (a),
the matrix component (B) comprises a hydrolyzable silicon compound (b),
a Martens hardness $HM_J$ of the window material is 100 N/mm² or more and 4000 N/mm² or less, and an elastic recovery rate $\eta_{ITJ}$ of the window material, as measured by an indentation test according to ISO14577-1, is 0.50 or more.

[37]
The window material according to [36], wherein a content of the hydrolyzable silicon compound (a) in the polymer nanoparticle (A) is 50% by mass or more.

[38]
The window material according to [36] or [37], for use in an automobile.

Advantageous Effect of Invention

The present invention can provide a hard coating film, a hard coating film-applied substrate, a coating material composition, and a window material, each of which has high abrasion resistance and high durability.

DESCRIPTION OF EMBODIMENTS

Hereinafter, an embodiment (hereinafter, simply referred to as "the present embodiment".) for carrying out the present invention will be described in detail. The present invention is not here limited to the following present embodiment, and can be variously modified and carried out within the gist thereof.

<Hard Coating Film>
A hard coating film (hereinafter, also referred to as "coating film (C)".) of the present embodiment is a hard coating film including a polymer nanoparticle (A) and a matrix component (B), in which the Martens hardness $HM_A$ of the polymer nanoparticle (A) and the Martens hardness $HM_B$ of the matrix component (B) satisfy a relationship of $HM_B/HM_A>1$, and the Martens hardness HM of the hard coating film is 100 N/mm² or more.

Even if it is difficult to confirm the magnitude relationship between the Martens hardness $HM_A$ and the Martens hardness $HM_B$, the magnitude relationship with respect to such Martens hardness can be estimated by comparison between the respective cohesion forces of the polymer nanoparticle (A) and the matrix component (B) described below. A lower cohesion force means a higher elasticity, and thus a lower cohesion force means that a coating film is more unlikely to be deformed and is higher in hardness. Specifically, a hard coating film of the present embodiment can also be specified as follows. That is, the hard coating film of the present embodiment is a hard coating film including a polymer nanoparticle (A) and a matrix component (B), in which the cohesion force $F_A$ of the polymer nanoparticle (A) and the cohesion force $F_B$ of the matrix component (B), as measured in a cohesion force mode of a scanning probe microscope (SPM), satisfy a relationship of $F_A/F_B>1$, and the Martens hardness HM of the hard coating film is 100 N/mm² or more.

The hard coating film of the present embodiment is configured as described above, and thus has high abrasion resistance and high durability. The hard coating film of the present embodiment exhibits abrasion resistance and contamination resistance at high levels, thus is useful as, but not limited to the following, a hard coat for, for example, a building material, an automobile member, electronic equipment, and an electronic product, and is particularly preferably used in an automobile member.

The polymer nanoparticle (A) is preferably dispersed in the matrix component (B) in the hard coating film of the present embodiment. The "dispersing" in the present embodiment means that the polymer nanoparticle (A) is distributed in the matrix component (B) uniformly or with any structure being formed, under the assumption that the polymer nanoparticle (A) corresponds to a dispersing phase and the matrix component (B) corresponds to a continuous phase. The dispersing can be confirmed by cross-sectional SEM observation of the hard coating film. The hard coating film of the present embodiment tends to have high abrasion resistance due to dispersing of the polymer nanoparticle (A) in the matrix component (B).

Any coating film having a Martens hardness HM of 100 N/mm² or more is herein particularly referred to as "hard coating film".

[Martens Hardness]
The Martens hardness in the present embodiment is the hardness according to ISO14577-1, and is a value calculated from an indentation depth of 2 mN under measurement conditions (Vickers quadrangular pyramid diamond indenter, loading condition: 2 mN/20 sec, unloading condition: 2 mN/20 sec). The Martens hardness in the present embodiment can be measured by using, for example, a micro-hardness meter Fischer scope (HM2000S manufactured by Fischer Instruments K.K.), a nano indentation tester (ENT-NEXUS manufactured by Elionix Inc.), a nano indenter (iNano, G200 manufactured by Toyo Corporation), or a nano indentation system (TI980 manufactured by Bruker AXS GmbH), and a lower indentation depth means higher Martens hardness and a higher indentation depth means lower Martens hardness.

[Cohesion Force]
The cohesion force in the present embodiment can be measured with a scanning probe microscope (SPM), and a lower cohesion force means a higher elasticity and thus a lower cohesion force means that a coating film is more unlikely to be deformed and is higher in hardness. The method for measuring the cohesion force can be made by using, but not limited to the following, for example, SPM-970 or SPM-9700HT manufactured by Shimadzu Corporation, Dimension ICON manufactured by Bruker AXS GmbH, or AFM5000II manufactured by Hitachi High-Tech Science Corporation.

[Other Hardness]

The Martens hardness and the magnitude relationship between the cohesion forces in the present embodiment can also be estimated by confirming a magnitude relationship between measurement values with other hardness as an index. Such other hardness is not particularly limited as long as it is an index exhibiting the difficulty of deformation of a material in application of any force to the material, and examples thereof can also include Vickers hardness and indentation hardness each measured with an indentation hardness meter typified by a micro-hardness meter or a nano indentation instrument, and an index expressed as a logarithmic decay rate measured with pendulum-type viscoelasticity tester typified by a rigid pendulum-type physical property tester. Other examples can also include indices expressed as a phase, a frictional force, viscoelasticity, an adsorptive force, hardness, and elastic modulus, as measured with a scanning probe microscope (SPM). If it is confirmed by such indices that the hardness of the matrix component (B) is higher than the hardness of the polymer nanoparticle (A), it is presumed that the matrix component (B) is harder than the polymer nanoparticle (A) also in terms of the Martens hardness and the cohesion force.

[Martens hardness $HM_A$ of polymer nanoparticle (A) and Martens hardness $HM_B$ of matrix component (B)]

The Martens hardness $HM_A$ of the polymer nanoparticle (A) and the Martens hardness $HM_B$ of the matrix component (B) in the present embodiment satisfy a relationship of the following expression (1).

$$HM_B/HM_A > 1 \qquad \text{expression (1)}$$

The expression (1) indicates that the soft polymer nanoparticle (A) is present in the hard matrix component (B), and such hardness can be expressed with a three-dimensional slope and thus the coating film (C) can exhibit abrasion resistance which has not been exhibited by any conventional coating film. The reason for this is estimated, but not intended to be limited to the following, as follows: the soft nanoparticle absorbs any impact and the hard matrix component suppresses any deformation. The range of $HM_A$ is preferably the range of 50 N/mm$^2$ or more and 2000 N/mm$^2$ or less, more preferably 100 N/mm$^2$ or more and 800 N/mm$^2$ or less, further preferably 100 N/mm$^2$ or more and 350 N/mm$^2$ or less. The range of $HM_B$ is preferably the range of 100 N/mm$^2$ or more and 4000 N/mm$^2$ or less, more preferably 150 N/mm$^2$ or more and 4000 N/mm$^2$ or less, further preferably 150 N/mm$^2$ or more and 2000 N/mm$^2$ or less.

The coating film (C) can be obtained as a cured product formed by curing a coating material composition (I) described below, with hydrolytic condensation or the like. The polymer nanoparticle (A) is usually not changed in composition in the course of such curing. Accordingly, the value of the Martens hardness $HM_A$ in the coating film (C) can be determined under the assumption that the value of the Martens hardness $HM_A$ of the polymer nanoparticle (A) in the coating material composition (I), as measured by a method described in Examples below, is well matched with the value of the Martens hardness $HM_A$ of the polymer nanoparticle (A) in the coating film (C).

The matrix component (B) corresponds to a cured product formed by curing a matrix raw material component (B') described below, with hydrolytic condensation or the like. Accordingly, the value of the Martens hardness $HM_B$ can be determined under the assumption that the value of the Martens hardness $HM_{B'}$ of the matrix raw material component (B'), as measured by a method described in Examples below, is well matched with the Martens hardness $HM_B$ of the corresponding matrix component (B).

The respective values of the $HM_A$ and the $HM_B$ can be adjusted by, for example, the structures of and the compositional ratio between the respective structural components of the polymer nanoparticle (A) and a matrix raw material component (B') described below so as to satisfy the above magnitude relationship, but the adjustment is not limited thereto.

[Cohesion Force $F_A$ of Polymer Nanoparticle (A) and Cohesion Force $F_B$ of Matrix Component (B)]

The cohesion force $F_A$ of the polymer nanoparticle (A) and the cohesion force $F_B$ of the matrix component (B) in the present embodiment satisfy a relationship of the following expression (2).

$$F_A/F_B > 1 \qquad \text{Expression (2)}$$

The expression (2), as in the expression (1), also indicates that the soft polymer nanoparticle (A) is present in the hard matrix component (B), and such hardness can be expressed with a three-dimensional slope and thus the coating film (C) can exhibit abrasion resistance which has not been exhibited by any conventional coating film. The reason for this is estimated, but not intended to be limited to the following, as follows: the soft nanoparticle absorbs any impact and the hard matrix component suppresses any deformation.

The cohesion force $F_A$ of the polymer nanoparticle (A) and the cohesion force $F_B$ of the matrix component (B) correlate to the hardness of each of the components and can be adjusted by, for example, the structures of and the compositional ratio between the respective structural components of the polymer nanoparticle (A) and a matrix raw material component (B') described below so as to satisfy the above magnitude relationship, but the adjustment is not limited thereto.

[Martens Hardness HM of Coating Film (C)]

The Martens hardness HM of the coating film (C) is 100 N/mm$^2$ or more from the viewpoint of abrasion resistance, and higher Martens hardness has the advantage of less causing deformation against impact and less causing scratching associated with breakage. The Martens hardness HM of the coating film (C) is preferably 100 N/mm$^2$ or more and 4000 N/mm$^2$ or less, more preferably 150 N/mm$^2$ or more and 1500 N/mm$^2$ or less from the viewpoint of flex resistance. Examples of the method for adjusting the Martens hardness HM of the coating film (C) in the range include, but not limited to the following, a method involving coating a substrate with a coating material composition which satisfies a predetermined relationship represented by expression (3) described below and in which a composition including the polymer nanoparticle (A) and a matrix raw material component (B') described below, mixed, are dispersed and dissolved in a solvent, and subjecting the resultant to heat treatment, ultraviolet irradiation, infrared irradiation, and/or the like to thereby form a coating film. In particular, an increase in content of the matrix component (B) based on the total amount of the polymer nanoparticle (A) and the matrix component (B) tends to result in an increase in Martens hardness HM of the coating film (C), and a decrease in content of the matrix component (B) tends to result in a decrease in Martens hardness HM of the coating film (C).

[Amount of Change in Haze in Taber Abrasion Test]

The Taber abrasion test in the present embodiment is a measurement method according to the method described in ASTM D1044, and such measurement is performed under conditions of an abrasive wheel CS-10F and a load of 500 g. Any material smaller in amount of change in haze is higher in abrasion resistance, and any material where the amount of change in haze after 1000 rotations, relative to the haze before the test, namely, the difference between a haze at a rotation number of 1000 and a haze before the Taber abrasion test is 10 or less is adapted to the standards of automobile windows and can be suitably used in a hard coating film for automobile windows and any material where such a difference is 2 or less is adapted to the standards of ANSI/SAE 2.26.1, ECE R43 and JIS R3211/R3212 and can be suitably used in all automobile window glasses. Examples of the method for adjusting the amount of change in haze in the range include, but not limited to the following, a method involving coating a substrate with a coating material composition which satisfies a predetermined relationship represented by expression (3) described below and in which a composition including the polymer nanoparticle (A) and a matrix raw material component (B') described below, mixed, are dispersed and dissolved in a solvent, and subjecting the resultant to heat treatment, ultraviolet irradiation, infrared irradiation, and/or the like to thereby form a coating film.

[Difference Between Haze at Rotation Number of 500 and Haze at Rotation Number of 10 in Taber Abrasion Test (Hereinafter, Also Referred to as "ΔA".)]

The ΔA of the coating film (C) represents the difference between a haze at a rotation number of 500 and a haze at a rotation number of 10 in the Taber abrasion test, and a lower ΔA corresponds to higher long-term contamination resistance. A ΔA of 10 or less allows high contamination resistance to be exhibited, and the ΔA is preferably 7 or less, further preferably 5 or less. Although the detailed reason is not clear, it is, for example, presumed that a lower ΔA less causes contaminants to be incorporated into a film and is better in washability of contaminants. Examples of the method for adjusting the ΔA of the coating film (C) in the range include, but not limited to the following, a method involving coating a substrate with a coating material composition which satisfies a predetermined relationship represented by expression (3) described below and in which a composition including the polymer nanoparticle (A) and a matrix raw material component (B') described below, mixed, are dispersed and dissolved in a solvent, and subjecting the resultant to heat treatment, ultraviolet irradiation, infrared irradiation, and/or the like to thereby form a coating film. In particular, the adjustment is made with, for example, the composition of the polymer nanoparticle (A), the composition of a matrix raw material component (B') described below, and the compounding ratio, as well as, compounding conditions including the composition of a solvent, the compounding order, the stirring time and the solid content concentration, and film formation conditions including the drying temperature, the humidity and the drying time in the case of heat treatment, the irradiation intensity, the irradiation time and the humidity in the case of ultraviolet irradiation, and the irradiation intensity, the irradiation time and the humidity in the case of infrared irradiation.

[Elastic Recovery Rate $\eta_{IT}$ of Coating Film (C)]

The elastic recovery rate $\eta_{IT}$ of the coating film (C) is the ratio of the elastic return deformation workload $W_{elast}$ of a depression to the total mechanical workload $W_{total}$ of a depression, and is the parameter described as the "ratio $\eta_{IT}$ of $W_{elast}/W_{total}$" in ISO14577-1. As the elastic recovery rate $\eta_{IT}$ is higher, the coating film can be more returned to the original state when deformed, and is higher in ability to repair itself against deformation. The elastic recovery rate $\eta_{IT}$ is preferably 0.50 or more under measurement conditions (Vickers quadrangular pyramid diamond indenter, loading condition: 2 mN/20 sec, unloading condition: 2 mN/20 sec) and is more preferably higher as long as it is in the range, from the viewpoint that the ability to repair itself is effectively expressed. More specifically, the elastic recovery rate $\eta_{IT}$ is more preferably 0.55 or more, further preferably 0.60 or more, still further preferably 0.65 or more. The elastic recovery rate of the coating film in the present embodiment can be measured by, but not particularly limited to the following, for example, subjecting the surface of the hard coating film to an indentation test with a microhardness meter Fischer scope (HM2000S manufactured by Fischer Instruments K.K.), a nano indentation tester (ENT-NEXUS manufactured by Elionix Inc.), a nano indenter (iNano, G200 manufactured by Toyo Corporation), or a nano indentation system (T1980 manufactured by Bruker AXS GmbH). Examples of the method for adjusting the elastic recovery rate $\eta_{IT}$ in the range include, but not limited to the following, a method involving coating a substrate with a coating material composition which satisfies a predetermined relationship represented by expression (3) described below and in which a composition including the polymer nanoparticle (A) and a matrix raw material component (B') described below, mixed, are dispersed and dissolved in a solvent, and subjecting the resultant to heat treatment, ultraviolet irradiation, infrared irradiation, and/or the like to thereby form a coating film.

[Film Thickness of Coating Film (C)]

The film thickness is preferably appropriately adjusted in the present embodiment from the viewpoint that abrasion resistance of the hard coating film is further exhibited and from the viewpoint that conformability to deformation of a substrate is sufficiently ensured. Specifically, the film thickness of the coating film (C) is preferably 1.0 μm or more, more preferably 3.0 μm or more from the viewpoint of abrasion resistance. Furthermore, the film thickness of the coating film (C) is preferably 100.0 μm or less, more preferably 50.0 μm or less, further preferably 20.0 μm or less from the viewpoint of substrate conformability.

[Polymer Nanoparticle (A)]

The polymer nanoparticle (A) in the present embodiment can be used to thereby impart impact absorption to the hard coating film and decrease the amount of change in haze in the Taber abrasion test of the hard coating film. The polymer nanoparticle (A) is not particularly limited in terms of the shape thereof as long as the particle size thereof is in nanometer scale (less than 1 μm). The Martens hardness $HM_A$ of the polymer nanoparticle (A) can be controlled in the above range by the structure and the compositional ratio of the structural component of the polymer nanoparticle (A), but the control is not limited thereto.

[Average Particle Size of Polymer Nanoparticle (A)]

The average particle size of the polymer nanoparticle (A) in the present embodiment is not particularly limited as long as it is in nanometer scale (less than 1 μm), and is determined from the particle size determined by observation according to cross-sectional SEM or a dynamic light scattering method. The average particle size of the polymer nanoparticle (A) is preferably 10 nm or more and 400 nm or less, more preferably 15 nm or more and 200 nm or less, further preferably 20 nm or more and 100 nm or less from the viewpoint of optical properties. The method for measuring the average particle size of the polymer nanoparticle (A) can be made by, but not limited to the following, for example, using an aqueous polymer nanoparticle (A) dispersion and measuring the cumulant particle size with a dynamic light scattering type particle size distribution measuring apparatus manufactured by Otsuka Electronics Co., Ltd. (item number: ELSZ-1000).

[Volume Fraction of Polymer Nanoparticle (A) in Coating Film (C)]

The volume fraction of the polymer nanoparticle (A) in the coating film (C) in the present embodiment is preferably 2% or more from the viewpoint of film formability, and is preferably 80% or less from the viewpoint of transparency. That is, the volume fraction of the polymer nanoparticle (A) in the coating film (C) is preferably 2% or more and 80% or less, more preferably 3% or more and 70% or less, further preferably 5% or more and 45% or less. The volume fraction of the polymer nanoparticle (A) in the coating film (C) can be calculated from, for example, the proportion of the polymer nanoparticle (A) in the entire coating film (C) in a cross-sectional SEM image of the coating film, and/or the component ratio of the polymer nanoparticle (A) to the components constituting the coating film (C).

[Structural Component of Polymer Nanoparticle (A)]

[Hydrolyzable Silicon Compound (a)]

The polymer nanoparticle (A) in the present embodiment preferably includes a hydrolyzable silicon compound (a). The hydrolyzable silicon compound (a) is not particularly limited as long as it is a silicon compound having hydrolyzability, or a hydrolyzed product or a condensate thereof.

The hydrolyzable silicon compound (a) is preferably any of a compound having an atomic group represented by the following formula (a-1) and a hydrolyzed product and a condensate thereof from the viewpoint of enhancements in abrasion resistance and weather resistance.

$$—R^1_{n1}SiX^1_{3-n1} \quad (a\text{-}1)$$

In the formula (a-1), $R^1$ represents a hydrogen atom, an alkyl group, an alkenyl group or an alkynyl group having 1 to 10 carbon atoms, or an aryl group, $R^1$ optionally has a substituent having halogen, a hydroxy group, a mercapto group, an amino group, a (meth)acryloyl group or an epoxy group, $X^1$ represents a hydrolyzable group, and n1 represents an integer of 0 to 2. The hydrolyzable group is not particularly limited as long as it is a group which generates a hydroxyl group by hydrolysis, and examples of such a group include halogen, an alkoxy group, an acyloxy group, an amino group, a phenoxy group, and an oxime group.

Specific examples of the compound having an atomic group represented by formula (a-1) include, but not limited to the following, trimethoxysilane, triethoxysilane, methyltrimethoxysilane, methyltriethoxysilane, ethyltrimethoxysilane, ethyltriethoxysilane, propyltrimethoxysilane, propyltriethoxysilane, isobutyltriethoxysilane, hexyltrimethoxysilane, hexyltriethoxysilane, octyltrimethoxysilane, octyltriethoxysilane, decyltrimethoxysilane, decyltriethoxysilane, cyclohexyltrimethoxysilane, cyclohexyltriethoxysilane, phenyltrimethoxysilane, phenyltriethoxysilane, dimethoxysilane, diethoxysilane, methyldimethoxysilane, methyldiethoxysilane, dimethyldimethoxysilane, dimethyldiethoxysilane, dimethoxydiphenylsilane, diethoxydiphenylsilane, bis(trimethoxysilyl)methane, bis(triethoxysilyl)methane, bis(triphenoxysilyl)ethane, 1,1-bis(triethoxysilyl)ethane, 1,2-bis(triethoxysilyl)ethane, 1,1-bis(triethoxysilyl)propane, 1,2-bis(triethoxysilyl)propane, 1,3-bis(triethoxysilyl)propane, 1,4-bis(triethoxysilyl)butane, 1,5-bis(triethoxysilyl)pentane, 1,1-bis(trimethoxysilyl)ethane, 1,2-bis(trimethoxysilyl)ethane, 1,1-bis(trimethoxysilyl)propane, 1,2-bis(trimethoxysilyl)propane, 1,3-bis(trimethoxysilyl)propane, 1,4-bis(trimethoxysilyl)butane, 1,5-bis(trimethoxysilyl)pentane, 1,3-bis(triphenoxysilyl)propane, 1,4-bis(trimethoxysilyl)benzene, 1,4-bis(triethoxysilyl)benzene, 1,6-bis(trimethoxysilyl)hexane, 1,6-bis(triethoxysilyl)hexane, 1,7-bis(trimethoxysilyl)heptane, 1,7-bis(triethoxysilyl)heptane, 1,8-bis(trimethoxysilyl)octane, 1,8-bis(triethoxysilyl)octane, 3-chloropropyltrimethoxysilane, 3-chloropropyltriethoxysilane, trifluoropropyltrimethoxysilane, trifluoropropyltriethoxysilane, 3-hydroxypropyltrimethoxysilane, 3-hydroxypropyltriethoxysilane, 3-mercaptopropyltrimethoxysilane, 3-mercaptopropyltriethoxysilane, 3-mercaptopropylmethyldimethoxysilane, 3-mercaptopropylmethyldiethoxysilane, 3-glycidoxypropyltrimethoxysilane, 3-glycidoxypropyltriethoxysilane, 3-glycidoxypropylmethyldimethoxysilane, 3-glycidoxypropylmethyldiethoxysilane, 2-(3,4-epoxycyclohexyl)ethyltrimethoxysilane, 2-(3,4-epoxycyclohexyl)ethyltriethoxysilane, 3-acryloxypropyltrimethoxysilane, 3-acryloxypropyltriethoxysilane, 3-methacryloxypropyltrimethoxysilane, 3-methacryloxypropyltriethoxysilane, 3-methacryloxypropylmethyldimethoxysilane, 3-methacryloxypropylmethyldimethoxysilane, vinyltrimethoxysilane, vinyltriethoxysilane, p-styryltrimethoxysilane, p-styryltriethoxysilane, N-2-(aminoethyl)-3-aminopropylmethyldimethoxysilane, N-2-(aminoethyl)-3-aminopropylmethyldiethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, N-phenyl-3-aminopropyltrimethoxysilane, N-phenyl-3-aminopropyltriethoxysilane, 3-trimethoxysilyl-N-(1,3-dimethyl-butylidene)propylamine, 3-triethoxysilyl-N-(1,3-dimethyl-butylidene)propylamine, triacetoxysilane, tris(trichloroacetoxy)silane, tris(trifluoroacetoxy)silane, tris-(trimethoxysilylpropyl) isocyanurate, tris-(triethoxysilylpropyl)isocyanurate, methyltriacetoxysilane, methyltris(trichloroacetoxy)silane, trichlorosilane, tribromosilane, methyltrifluorosilane, tris(methylethylketoxime)silane, phenyltris(methylethylketoxime)silane, bis(methylethylketoxime)silane, methylbis(methylethylketoxime)silane, hexamethyldisilane, hexamethylcyclotrisilazane, bis(dimethylamino)dimethylsilane, bis(diethylamino)dimethylsilane, bis(dimethylamino)methylsilane, bis(diethylamino)methylsilane, 2-[(triethoxysilyl)propyl]dibenzylresorcinol, 2-[(trimethoxysilyl)propyl]dibenzylresorcinol, 2,2,6,6-tetramethyl-4-[3-(triethoxysilyl)propoxy]piperidine, 2,2,6,6-tetramethyl-4-[3-(trimethoxysilyl)propoxy]piperidine, 2-hydroxy-4-[3-(triethoxysilyl)propoxy]benzophenone and 2-hydroxy-4-[3-(trimethoxysilyl)propoxy]benzophenone.

The hydrolyzable silicon compound (a) preferably includes a compound represented by the following formula (a-2), a hydrolyzed product and a condensate thereof, from the viewpoints of being capable of imparting high hardness to the hard coating film and of more enhancing abrasion resistance.

$$SiX^2_4 \quad (a\text{-}2)$$

In the formula (a-2), $X^2$ represents a hydrolyzable group. The hydrolyzable group is not particularly limited as long as it is a group which generates a hydroxyl group by hydrolysis, and examples thereof include halogen, an alkoxy group, an acyloxy group, an amino group, a phenoxy group and an oxime group.

Specific examples of the compound represented by the formula (a-2) include, but not limited to the following, partially hydrolyzed condensates (for example, trade names "M Silicate 51", "Silicate 35", "Silicate 45", "Silicate 40" and "FR-3" manufactured by Tama Chemicals Co., Ltd.; trade names "MS51", "MS56", "MS57" and "MS56S" manufactured by Mitsubishi Chemical Corporation; and trade names "Methyl Silicate 51", "Methyl Silicate 53A", "Ethyl Silicate 40", "Ethyl Silicate 48", "EMS-485", "N-103X", "PX", "PS-169", "PS-162R", "PC-291", "PC-301", "PC-302R", "PC-309" and "EMSi48" manufactured by Colcoat Co., Ltd.) of tetramethoxysilane, tetraethoxysilane, tetra(n-propoxy)silane, tetra(i-propoxy)silane, tetra(n-butoxy)silane, tetra(i-butoxy)silane, tetra-sec-butoxysilane, tetra-tert-butoxysilane, tetraacetoxysilane, tetra(trichloroacetoxy)silane, tetra(trifluoroacetoxy)silane, tetrachlorosilane, tetrabromosilane, tetrafluorosilane, tetra(methylethylketoxime)silane, tetramethoxysilane or tetraethoxysilane.

As described above, the hydrolyzable silicon compound (a) in the present embodiment preferably includes at least one or more selected from the compound having an atomic group represented by the formula (a-1) and the hydrolyzed product and the condensate thereof, and the compound represented by the formula (a-2) and the hydrolyzed product and the condensate thereof.

[Content of Hydrolyzable Silicon Compound (a) in Polymer Nanoparticle (A)]

The content of the hydrolyzable silicon compound (a) in the present embodiment represents the weight proportion of the solid content of the hydrolyzable silicon compound (a) included in the polymer nanoparticle (A), and the content is more preferably higher and the content is preferably 50% by mass or more, more preferably 60% by mass or more, because a higher content allows for more enhancements in abrasion resistance, weather resistance and heat resistance. The content of the hydrolyzable silicon compound (a) in the polymer nanoparticle (A) can be measured according to, but not limited to the following, for example, IR analysis, NMR analysis, and/or elemental analysis of the polymer nanoparticle (A).

[Matrix Component (B)]

The matrix component (B) in the present embodiment can be used to thereby impart impact absorption to the hard coating film and decrease the amount of change in haze of the hard coating film in the Taber abrasion test. The hardness $HM_B$ of the matrix component (B) can be controlled in the above range by the structure and the compositional ratio of the structural component of a matrix raw material component (B') described below, but the control is not limited thereto.

[Structural Component of Matrix Component (B)]

[Hydrolyzable Silicon Compound (b)]

The matrix component (B) in the present embodiment is not particularly limited as long as it is any component in which the polymer nanoparticle (A) can be dispersed. The matrix component (B) in the present embodiment preferably includes a hydrolyzable silicon compound (b) from the viewpoint of high toughness. The "matrix component (B) including a hydrolyzable silicon compound (b)" herein means that the matrix component (B) includes a polymer having a structural unit derived from the hydrolyzable silicon compound (b). The hydrolyzable silicon compound (b) is not particularly limited as long as it is any of a silicon compound having hydrolyzability, and a hydrolyzed product and a condensate thereof.

The matrix component (B) may include various components except for the polymer nanoparticle (A), other than the above polymer. Examples of such a component which can be included other than the above polymer include water-soluble resins such as polyvinyl alcohol, polyethylene glycol, polyvinylpyrrolidone and polyacrylic acid; acrylic resins such as PMMA, PAN and polyacrylamide; polymers such as polystyrene, polyurethane, polyamide, polyimide, polyvinylidene chloride, polyester, polycarbonate, polyether, polyethylene, polysulfone, polypropylene, polybutadiene, PTFE, PVDF and EVA; and copolymers thereof.

The hydrolyzable silicon compound (b) preferably includes one or more selected from the group consisting of a compound having an atomic group represented by the following formula (b-1) and a hydrolyzed product and a condensate thereof, and a compound represented by the following formula (b-2) and a hydrolyzed product and a condensate thereof, from the viewpoints of further enhancements in abrasion resistance and weather resistance.

$$—R^2{}_{n2}SiX^3{}_{3-n2} \qquad (b\text{-}1)$$

In the formula (b-1), $R^2$ represents a hydrogen atom, an alkyl group, an alkenyl group or an alkynyl group having 1 to 10 carbon atoms, or an aryl group, $R^2$ optionally has a substituent having halogen, a hydroxy group, a mercapto group, an amino group, a (meth)acryloyl group or an epoxy group, $X^3$ represents a hydrolyzable group, and n2 represents an integer of 0 to 2. The hydrolyzable group is not particularly limited as long as it is a group which generates a hydroxyl group by hydrolysis, and examples of such a group include a halogen atom, an alkoxy group, an acyloxy group, an amino group, a phenoxy group and an oxime group.

$$SiX^4{}_4 \qquad (b\text{-}2)$$

In the formula (b-2), $X^4$ represents a hydrolyzable group. The hydrolyzable group is not particularly limited as long as it is a group which generates a hydroxyl group by hydrolysis, and examples of such a group include halogen, an alkoxy group, an acyloxy group, an amino group, a phenoxy group and an oxime group.

Specific examples of the compound having an atomic group represented by such general formula (b-1) include, but not limited to the following, trimethoxysilane, triethoxysilane, methyltrimethoxysilane, methyltriethoxysilane, ethyltrimethoxysilane, ethyltriethoxysilane, propyltrimethoxysilane, propyltriethoxysilane, isobutyltriethoxysilane, hexyltrimethoxysilane, hexyltriethoxysilane, octyltrimethoxysilane, octyltriethoxysilane, decyltrimethoxysilane, decyltriethoxysilane, cyclohexyltrimethoxysilane, cyclohexyltriethoxysilane, phenyltrimethoxysilane, phenyltriethoxysilane, dimethoxysilane, diethoxysilane, methyldimethoxysilane, methyldiethoxysilane, dimethyldimethoxysilane, dimethyldiethoxysilane, dimethoxydiphenylsilane, diethoxydiphenylsilane, bis(trimethoxysilyl)methane, bis(triethoxysilyl)methane, bis(triphenoxysilyl)ethane, 1,1-bis(triethoxysilyl)ethane, 1,2-bis(triethoxysilyl)ethane, 1,1-bis(triethoxysilyl)propane, 1,2-bis(triethoxysilyl)propane, 1,3-bis(triethoxysilyl)propane, 1,4-bis(triethoxysilyl)butane, 1,5-bis(triethoxysilyl) pentane, 1,1-bis(trimethoxysilyl)ethane, 1,2-bis(trimethoxysilyl)ethane, 1,1-bis(trimethoxysilyl) propane, 1,2-bis(trimethoxysilyl)propane, 1,3-bis(trimethoxysilyl)propane, 1,4-bis(trimethoxysilyl)butane, 1,5-bis(trimethoxysilyl)pentane, 1,3-bis(triphenoxysilyl)

propane, 1,4-bis(trimethoxysilyl)benzene, 1,4-bis(triethoxysilyl)benzene, 1,6-bis(trimethoxysilyl)hexane, 1,6-bis(triethoxysilyl)hexane, 1,7-bis(trimethoxysilyl)heptane, 1,7-bis(triethoxysilyl)heptane, 1,8-bis(trimethoxysilyl)octane, 1,8-bis(triethoxysilyl)octane, 3-chloropropyltrimethoxysilane, 3-chloropropyltriethoxysilane, trifluoropropyltrimethoxysilane, trifluoropropyltriethoxysilane, 3-hydroxypropyltrimethoxysilane, 3-hydroxypropyltriethoxysilane, 3-mercaptopropyltrimethoxysilane, 3-mercaptopropyltriethoxysilane, 3-mercaptopropylmethyldimethoxysilane, 3-mercaptopropylmethyldiethoxysilane, 3-glycidoxypropyltrimethoxysilane, 3-glycidoxypropyltriethoxysilane, 3-glycidoxypropylmethyldimethoxysilane, 3-glycidoxypropylmethyldiethoxysilane, 2-(3,4-epoxycyclohexyl)ethyltrimethoxysilane, 2-(3,4-epoxycyclohexyl)ethyltriethoxysilane, 3-acryloxypropyltrimethoxysilane, 3-acryloxypropyltriethoxysilane, 3-methacryloxypropyltrimethoxysilane, 3-methacryloxypropyltriethoxysilane, 3-methacryloxypropylmethyldimethoxysilane, 3-methacryloxypropylmethyldimethoxysilane, vinyltrimethoxysilane, vinyltriethoxysilane, p-styryltrimethoxysilane, p-styryltriethoxysilane, N-2-(aminoethyl)-3-aminopropylmethyldimethoxysilane, N-2-(aminoethyl)-3-aminopropylmethyldiethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, N-phenyl-3-aminopropyltrimethoxysilane, N-phenyl-3-aminopropyltriethoxysilane, 3-trimethoxysilyl-N-(1,3-dimethyl-butylidene)propylamine, 3-triethoxysilyl-N-(1,3-dimethyl-butylidene)propylamine, triacetoxysilane, tris(trichloroacetoxy)silane, tris(trifluoroacetoxy)silane, tris-(trimethoxysilylpropyl) isocyanurate, tris-(triethoxysilylpropyl)isocyanurate, methyltriacetoxysilane, methyltris(trichloroacetoxy)silane, trichlorosilane, tribromosilane, methyltrifluorosilane, tris(methylethylketoxime)silane, phenyltris(methylethylketoxime)silane, bis(methylethylketoxime)silane, methylbis(methylethylketoxime)silane, hexamethyldisilane, hexamethylcyclotrisilazane, bis(dimethylamino)dimethylsilane, bis(diethylamino)dimethylsilane, bis(dimethylamino)methylsilane, bis(diethylamino)methylsilane, 2-[(triethoxysilyl)propyl]dibenzylresorcinol, 2-[(trimethoxysilyl)propyl]dibenzylresorcinol, 2,2,6,6-tetramethyl-4-[3-(triethoxysilyl)propoxy]piperidine, 2,2,6,6-tetramethyl-4-[3-(trimethoxysilyl)propoxy]piperidine, 2-hydroxy-4-[3-(triethoxysilyl)propoxy]benzophenone and 2-hydroxy-4-[3-(trimethoxysilyl)propoxy]benzophenone.

Specific examples of the compound represented by the formula (b-2) include, but not limited to the following, partially hydrolyzed condensates (for example, trade names "M Silicate 51", "Silicate 35", "Silicate 45", "Silicate 40" and "FR-3" manufactured by Tama Chemicals Co., Ltd.; trade names "MS51", "MS56", "MS57" and "MS56S" manufactured by Mitsubishi Chemical Corporation; and trade names "Methyl Silicate 51", "Methyl Silicate 53A", "Ethyl Silicate 40", "Ethyl Silicate 48", "EMS-485", "N-103X", "PX", "PS-169", "PS-162R", "PC-291", "PC-301", "PC-302R", "PC-309" and "EMSi48" manufactured by Colcoat Co., Ltd.) of tetramethoxysilane, tetraethoxysilane, tetra(n-propoxy)silane, tetra(i-propoxy)silane, tetra(n-butoxy)silane, tetra(i-butoxy)silane, tetra-sec-butoxysilane, tetra-tert-butoxysilane, tetraacetoxysilane, tetra(trichloroacetoxy)silane, tetra(trifluoroacetoxy)silane, tetrachlorosilane, tetrabromosilane, tetrafluorosilane, tetra(methylethylketoxime)silane, tetramethoxysilane or tetraethoxysilane.

As described above, the hydrolyzable silicon compound (b) in the present embodiment preferably includes at least one or more selected from the compound having an atomic group represented by the formula (b-1) and the hydrolyzed product and the condensate thereof, and the compound represented by the formula (b-2) and the hydrolyzed product and the condensate thereof.

The "hydrolyzable silicon compound (a) included in the polymer nanoparticle (A)" in the present embodiment may be the same as or different from the "hydrolyzable silicon compound (b) included in the matrix component (B)". Even if both compounds are the same, such compounds are distinguished from each other by defining the compound included in the polymer nanoparticle (A) as the hydrolyzable silicon compound (a) and defining the compound included in the matrix component (B) as the hydrolyzable silicon compound (b).

[Inorganic Oxide (D)]

The matrix component (B) in the present embodiment preferably includes inorganic oxide (D). The inorganic oxide (D) is included to result in not only a tendency to enhance hardness of the matrix component (B) and enhance abrasion resistance, but also a tendency to enhance contamination resistance of the coating film due to hydrophilicity of a hydroxyl group on a particle surface.

Specific examples of the inorganic oxide (D) in the present embodiment include, but not limited to the following, respective oxides of silicon, aluminum, titanium, zirconium, zinc, cerium, tin, indium, gallium, germanium, antimony, and molybdenum. Such an oxide is not limited in terms of the shape thereof, and may be used singly or as a mixture. Such an oxide is not particularly limited, and is preferably any silica particle typified by dry silica or colloidal silica from the viewpoint of interaction with the above hydrolyzable silicon compound (b), and such a silica particle is preferably in the form of colloidal silica from the viewpoint of dispersibility. When colloidal silica is used as the inorganic oxide (D), such silica is preferably in the form of an aqueous dispersion liquid, and can be used even if is either acidic or basic.

[Average Particle Size of Inorganic Oxide (D)]

The average particle size of the inorganic oxide (D) in the present embodiment is preferably 2 nm or more from the viewpoint of an improvement in storage stability of a composition for the hard coating film, and is preferably 150 nm or less from the viewpoint of an improvement in transparency. That is, the average particle size of the inorganic oxide (D) is preferably 2 nm or more and 150 nm or less, more preferably 2 nm or more and 100 nm or less, further preferably 2 nm or more and 50 nm or less. The method for measuring the average particle size of the inorganic oxide (D) can be made by, but not limited to the following, for example, observing colloidal silica dispersed in water at a magnification of 50,000 to 100,000× with a transmission micrograph, taking an image so that 100 to 200 inorganic oxides as particles are taken, and measuring a longer diameter and a shorter diameter of each of such inorganic oxide particles to thereby determine the average value.

[Colloidal Silica Suitably Used as Inorganic Oxide (D)]

The acidic colloidal silica suitably used in the present embodiment, for which water is used as a dispersing solvent, is not particularly limited, and any one prepared according to a sol-gel method can also be used and a commercially available product can also be utilized. Such preparation according to a sol-gel method can be made with reference to Werner Stober et al; J. Colloid and Interface Sci., 26, 62-69

(1968), Rickey D. Badley et al; Lang muir 6, 792-801 (1990), Journal of the Japan Society of Colour Material, 61 [9] 488-493 (1988), and the like. Examples of such a commercially available product utilized include Snowtex-O, Snowtex-OS, Snowtex-OXS, Snowtex-O-40, Snowtex-OL, Snowtex-OYL, Snowtex-OUP, Snowtex-PS-SO, Snowtex-PS-MO, Snowtex-AK-XS, Snowtex-AK, Snowtex-AK-L, Snowtex-AK-YL and Snowtex-AK—PS-S (trade names, manufactured by Nissan Chemical Corporation), Adelite AT-20Q (trade name, manufactured by Adeka Corporation), and Klebosol 20H12 and Klebosol 30CAL25 (trade names, manufactured by Clariant Japan K.K.).

The basic colloidal silica is silica stabilized by addition of an alkali metal ion, an ammonium ion or an amine and is not particularly limited, and examples thereof include Snowtex-20, Snowtex-30, Snowtex-XS, Snowtex-50, Snowtex-30L, Snowtex-XL, Snowtex-YL, Snowtex ZL, Snowtex-UP, Snowtex-ST-PS-S, Snowtex ST-PS-M, Snowtex-C, Snowtex-CXS, Snowtex-CM, Snowtex-N, Snowtex-NXS, Snowtex-NS and Snowtex-N-40 (trade names, manufactured by Nissan Chemical Corporation), Adelite AT-20, Adelite AT-30, Adelite AT-20N, Adelite AT-30N, Adelite AT-20A, Adelite AT-30A, Adelite AT-40 and Adelite AT-50 (trade names, manufactured by Adeka Corporation), Klebosol 30R9, Klebosol 30R50 and Klebosol 50R50 (trade names, manufactured by Clariant Japan K.K.), and Ludox HS-40, Ludox HS-30, Ludox LS, Ludox AS-30, Ludox SM-AS, Ludox AM, Ludox HAS and Ludox SM (trade names, manufactured by DuPont).

The colloidal silica for which a water-soluble solvent is used as a dispersing medium is not particularly limited, and examples thereof include MA-ST-M (methanol dispersion type having a particle size of 20 to 25 nm), IPA-ST (isopropyl alcohol dispersion type having a particle size of 10 to 15 nm), EG-ST (ethylene glycol dispersion type having a particle size of 10 to 15 nm), EGST-ZL (ethylene glycol dispersion type having a particle size of 70 to 100 nm), NPC-ST (ethylene glycol monopropyl ether dispersion type having a particle size of 10 to 15 nm) and TOL-ST (toluene dispersion type having a particle size of 10 to 15 nm), manufactured by Nissan Chemical Corporation.

The dry silica particle is not particularly limited, and examples thereof include AEROSIL manufactured by Nippon Aerosil Co., Ltd., and Reolosil manufactured by Tokuyama Corporation.

Such a silica particle may include an inorganic base (for example, sodium hydroxide, potassium hydroxide, lithium hydroxide, and/or ammonia) and/or an organic base (for example, tetramethylammonium and/or triethylamine) as stabilizer(s).

[Shape of Inorganic Oxide (D)]

Examples of the shape of the inorganic oxide (D) in the present embodiment include, but not limited to the following, spherical, horned, polyhedron, elliptical, flattened, linear, and beaded shapes, and a spherical shape is particularly preferable from the viewpoints of hardness and transparency of the hard coating film.

[Functional Group (e)]

The polymer nanoparticle (A) in the present embodiment preferably has a functional group (e) which interacts with the matrix component (B), from the viewpoint that dispersibility of the polymer nanoparticle (A) in the matrix component (B) can be enhanced to result in an enhancement in abrasion resistance. Whether or not the polymer nanoparticle (A) has such a functional group (e) can be confirmed by, for example, compositional analysis with IR, GC-MS, pyrolysis GC-MS, LC-MS, GPC, MALDI-MS, TOF-SIMS, TG-DTA and/or NMR, or analysis with a combination thereof.

Specific examples of the functional group (e) in the present embodiment include, but not limited to the following, functional groups such as a hydroxyl group, a carboxyl group, an amino group, an amide group and a functional group having an ether bond, a functional group having a hydrogen bond is preferable from the viewpoint of interaction, and an amide group is more preferable and a secondary amide group and/or a tertiary amide group are/is further preferable from the viewpoint of high hydrogen bondability.

Examples of the compound having the functional group (e) and a reaction product thereof include 2-hydroxyethyl (meth)acrylate, 2-hydroxypropyl (meth)acrylate, 4-hydroxybutyl (meth)acrylate, 2-hydroxyethyl vinyl ether or 4-hydroxybutyl vinyl ether, 2-hydroxyethyl allyl ether, (meth)acrylic acid, 2-carboxyethyl (meth)acrylate, 2-dimethylaminoethyl (meth)acrylate, 2-diethylaminoethyl (meth)acrylate, 2-di-n-propylaminoethyl (meth)acrylate, 3-dimethylaminopropyl (meth)acrylate, 4-dimethylaminobutyl (meth)acrylate, N-[2-(meth)acryloyloxy]ethylmorpholine, vinylpyridine, N-vinylcarbazole, N-vinylquinoline, N-methylacrylamide, N-methylmethacrylamide, N-ethylacrylamide, N,N-dimethylacrylamide, N,N-dimethylmethacrylamide, N,N-diethylacrylamide, N-ethylmethacrylamide, N-methyl-N-ethylacrylamide, N-methyl-N-ethylmethacrylamide, N-isopropylacrylamide, N-n-propylacrylamide, N-isopropylmethacrylamide, N-n-propylmethacrylamide, N-methyl-N-n-propylacrylamide, N-methyl-N-isopropylacrylamide, N-acryloylpyrrolidine, N-methacryloylpyrrolidine, N-acryloylpiperidine, N-methacryloylpiperidine, N-acryloylhexahydroazepine, N-acryloylmorpholine, N-methacryloylmorpholine, N-vinylpyrrolidone, N-vinylcaprolactam, N,N'-methylenebisacrylamide, N,N'-methylenebismethacrylamide, N-vinylacetamide, diacetone acrylamide, diacetone methacrylamide, N-methylolacrylamide, N-methylolmethacrylamide, Blemmers PE-90, PE-200, PE-350, PME-100, PME-200, PME-400 and AE-350 (trade names, manufactured by NOF Corporation), and MA-30, MA-50, MA-100, MA-150, RA-1120, RA-2614, RMA-564, RMA-568, RMA-1114 and MPG130-MA (trade names, manufactured by Nippon Nyukazai Co., Ltd.). Herein, the "(meth)acrylate" simply represents acrylate or methacrylate, and the "(meth)acrylic acid" simply represents acrylic acid or methacrylic acid.

[Core/Shell Structure of Polymer Nanoparticle (A)]

The polymer nanoparticle (A) in the present embodiment preferably has a core/shell structure including a core layer and one or more shell layers covering the core layer. The polymer nanoparticle (A) preferably has the functional group (e) from the viewpoint of interaction with the matrix component (B) on the outermost layer of the core/shell structure.

[Other Compound Optionally Included in Polymer Nanoparticle (A)]

The polymer nanoparticle (A) in the present embodiment optionally includes any polymer shown below from the viewpoint of an enhancement in stability of the particle due to electrostatic repulsion force of the particles. Examples include a polyurethane-based, polyester-based, poly(meth)acrylate-based, poly(meth)acrylic acid, polyvinyl acetate-based, polybutadiene-based, polyvinyl chloride-based, chlorinated polypropylene-based, polyethylene-based or polystyrene-based polymer, or a poly(meth)acrylate-silicone-based, polystyrene-(meth)acrylate-based or styrene-maleic anhydride-based copolymer.

Examples of a compound particularly excellent in electrostatic repulsion, among the above polymers each optionally included in the polymer nanoparticle (A), include a (meth)acrylic acid or (meth)acrylate polymer or copolymer. Specific examples include, but not limited to the following, methyl acrylate, (meth)acrylic acid, methyl methacrylate, butyl methacrylate, cyclohexyl methacrylate, 2-ethylhexyl acrylate, n-butyl acrylate, 2-hydroxyethyl (meth)acrylate, 2-hydroxypropyl (meth)acrylate, 3-hydroxybutyl (meth)acrylate, 4-hydroxybutyl (meth)acrylate, 3-hydroxybutyl (meth)acrylate or 4-hydroxybutyl (meth)acrylate polymer or copolymer. Such (meth)acrylic acids may be each partially or fully neutralized with ammonia, an amine such as triethylamine or dimethylethanolamine, or a base such as NaOH or KOH, for a further enhancement in electrostatic repulsion force.

The polymer nanoparticle (A) optionally includes an emulsifier. The emulsifier is not particularly limited, and examples thereof include acidic emulsifiers such as alkylbenzene sulfonic acid, alkylsulfonic acid, alkylsulfosuccinic acid, polyoxyethylene alkyl sulfuric acid, polyoxyethylene alkyl aryl sulfuric acid and polyoxyethylene distyryl phenyl ether sulfonic acid; anionic surfactants such as alkali metal (Li, Na, K, and the like) salts of such acidic emulsifiers, ammonium salts of such acidic emulsifier, and fatty acid soap of such anionic surfactant; quaternary ammonium salt, pyridinium salt, and imidazolinium salt type cationic surfactants such as alkyltrimethylammonium bromide, alkylpyridinium bromide and imidazolinium laurate; and nonionic surfactants and reactive emulsifiers having a radical polymerizable double bond, such as polyoxyethylene alkyl aryl ether, polyoxyethylene sorbitan fatty acid ester, a polyoxyethylene oxypropylene block copolymer and polyoxyethylene distyryl phenyl ether.

Examples of the reactive emulsifier having a radical polymerizable double bond include, but not limited to the following, Eleminol JS-2 (trade name, manufactured by Sanyo Chemical Industries, Ltd.), Latemul S-120, S-180A or S-180 (trade name, manufactured by Kao Corporation), Aqualon HS-10, KH-1025, RN-10, RN-20, RN30 or RN50 (trade name, manufactured by DKS Co., Ltd.), Adekariasoap SE1025, SR-1025, NE-20, NE-30 or NE-40 (trade name, manufactured by Adeka Corporation), an ammonium salt of p-styrene sulfonic acid, a sodium salt of p-styrene sulfonic acid, a potassium salt of p-styrene sulfonic acid, alkyl sulfonic acid (meth)acrylate such as 2-sulfoethyl acrylate, methylpropane sulfonic acid (meth)acrylamide, an ammonium salt of allyl sulfonic acid, a sodium salt of allyl sulfonic acid, or a potassium salt of allyl sulfonic acid.

[Other Component Optionally Included in Coating Film (C)]

The coating film (C) of the present embodiment optionally includes a solvent, an emulsifier, a plasticizer, a pigment, a dye, a filler, an anti-aging agent, a conductive material, an ultraviolet absorber, a light stabilizer, a peel strength adjusting agent, a softener, a surfactant, a flame retardant, an antioxidant, and/or catalyst, as the matrix component (B), depending on the application. The coating film preferably includes an ultraviolet absorber and a light stabilizer because high weather resistance is required particularly in an outdoor application. Specific examples of the ultraviolet absorber and the light stabilizer include, but not limited to the following, benzophenone-based ultraviolet absorbers such as 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-benzyloxybenzophenone, bis(5-benzoyl-4-hydroxy-2-methoxyphenyl)methane, 2,2'-dihydroxy-4-methoxybenzophenone, 2,2'-dihydroxy-4,4'dimethoxybenzophenone (trade name "UVINUL3049" manufactured by BASF SE), 2,2',4,4'-tetrahydroxybenzophenone (trade name "UVINUL3050" manufactured by BASF SE), 4-dodecyloxy-2-hydroxybenzophenone, 5-benzoyl-2,4-dihydroxybenzophenone, 2-hydroxy-4-methoxy-2'-carboxybenzophenone, 2-hydroxy-4-stearyloxybenzophenone and 4,6-dibenzoylresorcinol; benzotriazole-based ultraviolet absorbers such as 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, 2-(2-hydroxy-5-tert-octylphenyl)benzotriazole, 2-(2-hydroxy-3,5-di-tert-octylphenyl)benzotriazole, 2-[2'-hydroxy-3',5'-bis(α,α'-dimethylbenzyl)phenyl]benzotriazole), a condensate (trade name "TINUVIN1130" manufactured by BASF SE) of methyl-3-[3-tert-butyl-5-(2H-benzotriazole-2-yl)-4-hydroxyphenyl]propionate and polyethylene glycol (molecular weight: 300), isooctyl-3-[3-(2H-benzotriazole-2-yl)-5-tert-butyl-4-hydroxyphenyl]propionate (trade name "TINUVIN384" manufactured by BASF SE), 2-(3-dodecyl-5-methyl-2-hydroxyphenyl)benzotriazole (trade name "TINUVIN571" manufactured by BASF SE), 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-4'-octoxyphenyl)benzotriazole, 2-[2'-hydroxy-3'-(3",4",5",6"-tetrahydrophthalimidemethyl)-5'-methylphenyl]benzotriazole, 2,2-methylenebis[4-(1,1,3,3-tetramethylbutyl)-6-(2H-benzotriazole-2-yl)phenol], 2-(2H-benzotriazole-2-yl)-4,6-bis(1-methyl-1-phenylethyl)phenol (trade name "TINUVIN900" manufactured by BASF SE), and TINUVIN384-2, TINUVIN326, TINUVIN327, TINUVIN109, TINUVIN970, TINUVIN328, TINUVIN171, TINUVIN970, TINUVIN PS, TINUVIN P, TINUVIN99-2 and TINVIN928 (trade names, manufactured by BASF SE); triazine-based ultraviolet absorbers such as 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, 2,4-bis(2-hydroxy-4-butyloxyphenyl)-6-(2,4-bisbutyloxyphenyl)-1,3,5-triazine (trade name "TINUVIN460" manufactured by BASF SE), 2-(2-hydroxy-4-[1-octyloxycarbonylethoxy]phenyl)-4,6-bis(4-phenylphenyl)-1,3,5-triazine (trade name "TINUVIN479" manufactured by BASF SE), and TINUVIN400, TINUVIN405, TINUVIN477 and TINUVIN1600 (trade name, manufactured by BASF SE); malonic acid ester-based ultraviolet absorbers such as HOSTAVIN PR25, HOSTAVIN B-CAP and HOSTAVIN VSU (trade names, manufactured by Clariant Japan K.K.); cyanoacrylate-based ultraviolet absorbers such as ethyl-2-cyano-3,3-diphenyl acrylate (trade name "UVINUL3035" manufactured by BASF SE), (2-ethylhexyl)-2-cyano-3,3-diphenyl acrylate (trade name "UVINUL3039" manufactured by BASF SE) and 1,3-bis ((2'-cyano-3',3'-diphenylacryloyl)oxy)-2,2-bis-(((2'-cyano-3',3'-diphenylacryloyl)oxy)methyl)propane (trade name "UVINUL3030" manufactured by BASF SE); radical polymerizable ultraviolet absorbers each having a radical polymerizable double bond in its molecule, such as 2-hydroxy-4-acryloxybenzophenone, 2-hydroxy-4-methacryloxybenzophenone, 2-hydroxy-5-acryloxybenzophenone, 2-hydroxy-5-methacryloxybenzophenone, 2-hydroxy-4-(acryloxy-ethoxy)benzophenone, 2-hydroxy-4-(methacryloxy-ethoxy)benzophenone, 2-hydroxy-4-(methacryloxy-diethoxy)benzophenone, 2-hydroxy-4-(acryloxy-triethoxy)benzophenone, 2-(2'-hydroxy-5'-methacryloxyethylphenyl)-2H-benzotriazole (trade name "RUVA-93" manufactured by Otsuka Chemical Co., Ltd.), 2-(2'-hydroxy-5'-methacryloxyethyl-3-tert-butylphenyl)-2H-benzotriazole, 2-(2'-hydroxy-5'-methacryloxypropyl-3-tert-butylphenyl)-5-chloro-2H-benzotriazole and 3-methacryloyl-2-hydroxypropyl-3-[3'-(2''-benzotriazolyl)-4-hydroxy-5-tert-butyl]phenyl propionate (trade name "CGL-104" manufactured by Ciba-Geigy Japan Ltd.); polymers each having ultraviolet absorptivity, such as UV-G101, UV-G301, UV-G137, UV-G12 and UV-G13 (trade names, manufactured by Nippon Shokubai Co., Ltd.); hindered amine-based light stabilizers such as bis(2,2,6,6-tetramethyl-4-piperidyl)succinate, bis(2,2,6,6-tetramethylpiperidyl)sebacate, bis(1,2,2,6,6-pentamethyl-4-piperidyl)2-(3,5-di-tert-butyl-4-hydroxybenzyl)-2-butylmalonate, 1-[2-[3-(3,5-di-tert-butyl-4-hydroxyphenyl)propynyloxy]ethyl]-4-[3-(3,5-di-tert-butyl-4-hydroxyphenyl)propynyloxy]-2,2,6,6-tetramethylpiperidine, a mixture (trade name "TINUVIN292" manufactured by BASF SE) of bis (1,2,2,6,6-pentamethyl-4-piperidyl)sebacate and methyl-1,2,2,6,6-pentamethyl-4-piperidyl-sebacate, bis(1-octoxy-2,2,6,6-tetramethyl-4-piperidyl)sebacate, and TINUVIN123, TINUVIN144, TINUVIN152, TINUVIN249, TINUVIN292 and TINUVIN5100 (trade names, manufactured by BASF SE); radical polymerizable hindered amine-based light stabilizers such as 1,2,2,6,6-pentamethyl-4-piperidyl methacrylate, 1,2,2,6,6-pentamethyl-4-piperidyl acrylate, 2,2,6,6-tetramethyl-4-piperidyl methacrylate, 2,2,6,6-tetramethyl-4-piperidyl acrylate, 1,2,2,6,6-pentamethyl-4-iminopiperidyl methacrylate, 2,2,6,6,-tetramethyl-4-iminopiperidyl methacrylate, 4-cyano-2,2,6,6-tetramethyl-4-piperidyl methacrylate and 4-cyano-1,2,2,6,6-pentamethyl-4-piperidyl methacrylate; polymers each having photostability, such as U-Double E-133, U-Double E-135, U-Double S-2000, U-Double S-2834, U-Double S-2840, U-Double S-2818 and U-Double S-2860 (trade names, manufactured by Nippon Shokubai Co., Ltd.); ultraviolet absorbers each having reactivity with a silanol group, an isocyanate group, an epoxy group, a semicarbazide group or a hydrazide group; and inorganic ultraviolet absorbers such as cerium oxide, zinc oxide, aluminum oxide, zirconium oxide, bismuth oxide, cobalt oxide, copper oxide, tin oxide and titanium oxide, and these may be used singly or in combinations of two or more thereof.

[Transparency of Hard Coating Film]

The hard coating film of the present embodiment, when applied as a transparent material, preferably has a transparency so as not to have any adverse effect on the outer appearance of the material and the visibility through the material. The transparency of the hard coating film can be evaluated in terms of the total light transmittance retention rate obtained by the following expression, from the viewpoint of the change in outer appearance. In the present embodiment, the total light transmittance retention rate of the hard coating film is preferably 90% or more, more preferably 95% or more from the viewpoint of securement of lighting, extremely preferably 98% or more from the viewpoint of securement of the visibility through the material. The total light transmittance retention rate of the hard coating film can be adjusted in the above range by, for example, adopting any preferable respective aspects described above with respect to the polymer nanoparticle (A) and the matrix component (B).

Total light transmittance retention rate (%) of hard coating film=(Total light transmittance (%) of hard coating film-applied substrate/Total light transmittance (%) of substrate)×100

[Contamination Resistance of Hard Coating Film]

The hard coating film of the present embodiment, when applied as a transparent material, is required not to have any adverse effect on the visibility in use for a long period. That is, the hard coating film preferably has favorable contamination resistance in the above application. The contamination resistance here represents the degree of attachment of soot and dust in use for a long period, and can be evaluated by, for example, attaching a JIS test powder 1 (12 kinds, carbon black) to a coating film subjected to an abrasion test and determining the total light transmittance retention rate after the test, obtained by the following expression.

Total light transmittance retention rate (%) after black carbon test=(Total light transmittance after test/Total light transmittance before test)×100

As the total light transmittance retention rate after such a black carbon test is higher, black carbon tends to be less attached in use for a long period, resulting in excellent contamination resistance.

[Moisture Resistance of Hard Coating Film]

The hard coating film of the present embodiment is required to keep performance under a usage environment in an application where the hard coating film is used for a long period. For example, the hard coating film is expected to be used at a high temperature and a high humidity in an application of a window material for automobiles, and thus is preferably not changed in outer appearance and adhesiveness after exposure at 50° C. and 95% RH according to JIS-R3211 and R3222 for 2 weeks.

<Hard Coating Film-Applied Substrate>

A hard coating film-applied substrate according to the present embodiment includes a substrate, and the hard coating film of the present embodiment, formed on one surface and/or both surfaces of the substrate. The hard coating film-applied substrate includes such a film on at least one surface and/or both surfaces of the substrate.

The hard coating film-applied substrate of the present embodiment is configured as described above, and thus has high abrasion resistance and high durability. The hard coating film-applied substrate of the present embodiment exhibits abrasion resistance and contamination resistance at high levels, and thus is useful as, but not limited to the following, for example, a hard coating for, for example, a building material, an automobile member, electronic equipment, and an electronic product, and extremely preferably used for an automobile member.

[Substrate]

The substrate to be coated with the hard coating film of the present embodiment is not particularly limited, and examples thereof include a resin, a metal, and glass. Examples of the shape of the substrate include, but not limited to the following, a plate-like shape, a shape including irregularities, a shape having a curved surface, a hollow shape, a porous shape, and any combination thereof. The type of the substrate is not limited, and examples thereof include a sheet, a film, and a fiber. In particular, a resin is preferable from the viewpoints of impartment of hard coatability, and moldability. That is, a structure having a substrate including a resin, and the hard coating film of the present embodiment has excellent abrasion resistance, moldability and contamination resistance. Examples of the resin for use in the substrate include, but not limited to the following, a thermoplastic resin and a thermosetting resin.

Examples of the thermoplastic resin for use in the substrate include, but not limited to the following, polyethylene, polypropylene, polystyrene, an ABS resin, a vinyl chloride resin, a methyl methacrylate resin, nylon, a fluororesin, polycarbonate, and a polyester resin. Examples of the thermosetting resin for use in the substrate include, but not limited to the following, a phenol resin, a urea resin, a melamine resin, an unsaturated polyester resin, an epoxy resin, a silicon resin, silicone rubber, SB rubber, natural rubber, and a thermosetting elastomer.

[Adhesion Layer]

The hard coating film-applied substrate according to the present embodiment may further have an adhesion layer between the substrate and the hard coating film. The adhesion layer here used can be any adhesion layer commonly used and is not particularly limited, and examples thereof include a thermoplastic resin, a thermosetting resin, and a rubber-elastomer, and in particular, an acrylic resin, an acrylic urethane-based resin, a urethane-based resin, and a silicone-based resin are preferable. The adhesion layer optionally includes, if necessary, any appropriate additive. Examples of the additive include, but not limited to the following, a crosslinking agent, a tackifier, a plasticizer, a pigment, a dye, a filler, an anti-aging agent, a conductive material, an ultraviolet absorber, an inorganic oxide, a light stabilizer, a peel strength adjusting agent, a softener, a surfactant, a flame retardant, and an antioxidant. Examples of the crosslinking agent include, but not limited to the following, an isocyanate-based crosslinking agent, an epoxy-based crosslinking agent, a carbodiimide-based crosslinking agent, an oxazoline-based crosslinking agent, an aziridine-based crosslinking agent, an amine-based crosslinking agent, a peroxide-based crosslinking agent, a melamine-based crosslinking agent, a urea-based crosslinking agent, a metal alkoxide-based crosslinking agent, a metal chelate-based crosslinking agent, and a metal salt-based crosslinking agent.

[Adhesive Emulsion Particle (F)]

The adhesion layer in the present embodiment preferably includes an adhesive emulsion particle (F). The adhesive emulsion particle (F) serves to impart flexibility and enhance adhesiveness to the substrate. The adhesive emulsion particle (F) is not particularly limited, and is a particle formed from one or more of polyurethane-based, polyester-based, poly(meth)acrylate-based, polyvinyl acetate-based, polybutadiene-based, polyvinyl chloride-based, chlorinated polypropylene-based, polyethylene-based, polystyrene-based, and polystyrene-(meth)acrylate-based copolymers, a rosin-based derivative, an alcohol adduct of a styrene-maleic anhydride copolymer, a polycarbonyl compound such as a cellulose-based resin, and a silicone compound. In the present embodiment, the adhesive emulsion particle (F) is preferably a poly(meth)acrylate-based particle.

The method for preparing the adhesive emulsion particle (F) in the present embodiment is not particularly limited, and such a particle preferably has a structure obtained by polymerization of a vinyl monomer in the presence of water and an emulsifier. The adhesive emulsion particle (F) thus obtained, when included in the adhesion layer, tends to better maintain adhesiveness to the substrate.

The vinyl monomer is not particularly limited, and examples thereof can include not only a (meth)acrylic acid ester, an aromatic vinyl compound, and a vinyl cyanide compound, but also functional group-containing monomers such as a carboxyl group-containing vinyl monomer, a hydroxyl group-containing vinyl monomer, an epoxy group-containing vinyl monomer, a carbonyl group-containing vinyl monomer, and a vinyl monomer having secondary and/or tertiary amide group(s).

The (meth)acrylic acid ester is not particularly limited, and examples thereof include a (meth)acrylic acid alkyl ester having an alkyl moiety having 1 to 50 carbon atoms, and a (poly)oxyethylene di(meth)acrylate having 1 to 100 ethylene oxide groups.

The (meth)acrylic acid alkyl ester is not particularly limited, and examples thereof include methyl (meth)acrylate, ethyl (meth)acrylate, n-butyl (meth)acrylate, 2-ethylhexyl (meth)acrylate, methylcyclohexyl (meth)acrylate, cyclohexyl (meth)acrylate, lauryl (meth)acrylate, and dodecyl (meth)acrylate.

The (poly)oxyethylene di(meth)acrylate is not particularly limited, and examples thereof include ethylene glycol di(meth)acrylate, diethylene glycol di(meth)acrylate, diethylene glycol methoxy(meth)acrylate, and tetraethylene glycol di(meth)acrylate.

The aromatic vinyl compound is not particularly limited, and examples thereof include styrene and 4-vinyltoluene.

The vinyl cyanide compound is not particularly limited, and examples thereof include acrylonitrile and methacrylonitrile.

The carboxyl group-containing vinyl monomer is not particularly limited, and examples thereof include (meth)acrylic acid, crotonic acid, itaconic acid, maleic acid, fumaric acid, maleic anhydride, or a half ester of a dibasic acid such as itaconic acid, maleic acid, or fumaric acid. In the case of use of a carboxyl acid group-containing vinyl monomer, a carboxyl group can be introduced into the adhesive emulsion particle (F) in the present embodiment, and electrostatic repulsion force between such particles tends to enhance stability of an emulsion, for example, enhance a resistive force to dispersion destruction action from the outside, for example, aggregation in stirring. The carboxyl group introduced can also be partially or fully neutralized with ammonia, an amine compound such as triethylamine or dimethylethanolamine, or a base such as NaOH or KOH from the viewpoint of a further enhancement in electrostatic repulsion force.

The hydroxyl group-containing vinyl monomer is not particularly limited, and examples thereof include (meth) acrylic acid hydroxyalkyl esters such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate and 4-hydroxybutyl (meth) acrylate;

hydroxyalkyl esters of fumaric acid, such as di-2-hydroxyethyl fumarate and mono-2-hydroxyethyl monobutyl fumarate; allyl alcohol and (poly)oxyethylene mono(meth) acrylate having 1 to 100 ethylene oxide groups; (poly) oxypropylene mono(meth)acrylate having 1 to 100 propylene oxide groups; and "Placcel FM, FA monomer" (trade name of a caprolactone-added monomer manufactured by Daicel Corporation) and other α,β-ethylenically unsaturated carboxylic acid hydroxyalkyl esters.

The (poly)oxyethylene (meth)acrylate is not particularly limited, and examples thereof include ethylene glycol (meth)acrylate, ethylene glycol methoxy(meth)acrylate, diethylene glycol (meth)acrylate, diethylene glycol methoxy (meth)acrylate, tetraethylene glycol (meth)acrylate, and tetraethylene glycol methoxy(meth)acrylate.

The (poly)oxypropylene (meth)acrylate is not particularly limited, and examples thereof include propylene glycol (meth)acrylate, propylene glycol methoxy(meth)acrylate, dipropylene glycol (meth)acrylate, dipropylene glycol methoxy(meth)acrylate, tetrapropylene glycol (meth)acrylate, and tetrapropylene glycol methoxy(meth)acrylate.

The epoxy group-containing vinyl monomer is not particularly limited, and examples thereof include a glycidyl group-containing vinyl monomer. The glycidyl group-containing vinyl monomer is not particularly limited, and examples thereof include glycidyl (meth)acrylate, allyl glycidyl ether, and allyl dimethyl glycidyl ether.

The carbonyl group-containing vinyl monomer is not particularly limited, and examples thereof include diacetone acrylamide.

Specific examples of any vinyl monomer other than the above are not particularly limited, and examples include not only olefins such as ethylene, propylene and isobutylene, dienes such as butadiene, haloolefins such as vinyl chloride, vinylidene chloride, vinyl fluoride, tetrafluoroethylene and chlorotrifluoroethylene, carboxylic acid vinyl esters such as vinyl acetate, vinyl propionate, vinyl n-butyrate, vinyl benzoate, vinyl p-t-butylbenzoate, vinyl pivalate, vinyl 2-ethylhexanoate, vinyl versatate and vinyl laurate, carboxylic acid isopropenyl esters such as isopropenyl acetate and isopropenyl propionate, vinyl ethers such as ethyl vinyl ether, isobutyl vinyl ether and cyclohexyl vinyl ether, allyl esters such as allyl acetate and allyl benzoate, and allyl ethers such as allyl ethyl ether and allyl phenyl ether, but also 4-(meth)acryloyloxy-2,2,6,6,-tetramethylpiperidine, 4-(meth)acryloyloxy-1,2,2,6,6,-pentamethylpiperidine, perfluoromethyl (meth)acrylate, perfluoropropyl (meth)acrylate, perfluoropropyl methyl (meth)acrylate, vinylpyrrolidone, trimethylolpropane tri(meth)acrylate and allyl (meth)acrylate, and any combination thereof.

The vinyl monomer having secondary and/or tertiary amide group(s) is not particularly limited, and examples thereof can include N-alkyl or N-alkylene-substituted (meth)acrylamide. Specific examples can include N-methylacrylamide, N-methylmethacrylamide, N-ethylacrylamide, N,N-dimethylacrylamide, N,N-dimethylmethacrylamide, N,N-diethylacrylamide, N-ethylmethacrylamide, N-methyl-N-ethylacrylamide, N-methyl-N-ethylmethacrylamide, N-isopropylacrylamide, N-n-propylacrylamide, N-isopropylmethacrylamide, N-n-propylmethacrylamide, N-methyl-N-n-propylacrylamide, N-methyl-N-isopropylacrylamide, N-acryloylpyrrolidine, N-methacryloylpyrrolidine, N-acryloylpiperidine, N-methacryloylpiperidine, N-acryloylhexahydroazepine, N-acryloylmorpholine, N-methacryloylmorpholine, N-vinylpyrrolidone, N-vinylcaprolactam, N,N'-methylenebisacrylamide, N,N'-methylenebismethacrylamide, N-vinylacetamide, diacetone acrylamide, diacetone methacrylamide, N-methylolacrylamide and N-methylolmethacrylamide.

The silicone compound is not particularly limited, and examples thereof include respective hydrolyzed condensates of trimethoxysilane, triethoxysilane, methyltrimethoxysilane, methyltriethoxysilane, cyclohexyltrimethoxysilane, cyclohexyltriethoxysilane, phenyltrimethoxysilane, phenyltriethoxysilane, dimethoxysilane, diethoxysilane, methyldimethoxysilane, methyldiethoxysilane, dimethyldimethoxysilane, dimethyldiethoxysilane, dimethoxydiphenylsilane, diethoxydiphenylsilane, 3-acryloxypropyltrimethoxysilane, 3-acryloxypropyltriethoxysilane, 3-methacryloxypropyltrimethoxysilane, 3-methacryloxypropyltriethoxysilane, 3-methacryloxypropylmethyldimethoxysilane, 3-methacryloxypropylmethyldimethoxysilane, vinyltrimethoxysilane, vinyltriethoxysilane, p-styryltrimethoxysilane, p-styryltriethoxysilane, tetramethoxysilane, and tetraethoxysilane.

The adhesive emulsion particle (F) optionally includes an emulsifier. The emulsifier is not particularly limited, and examples thereof include acidic emulsifiers such as alkylbenzene sulfonic acid, alkylsulfonic acid, alkylsulfosuccinic acid, polyoxyethylene alkyl sulfuric acid, polyoxyethylene alkyl aryl sulfuric acid and polyoxyethylene distyryl phenyl ether sulfonic acid; anionic surfactants such as alkali metal (Li, Na, K, and the like) salts of such acidic emulsifiers, ammonium salts of such acidic emulsifier, and fatty acid soap; quaternary ammonium salt, pyridinium salt, and imidazolinium salt type cationic surfactants such as alkyltrimethylammonium bromide, alkylpyridinium bromide and imidazolinium laurate; and nonionic surfactants and reactive emulsifiers having a radical polymerizable double bond, such as polyoxyethylene alkyl aryl ether, polyoxyethylene sorbitan fatty acid ester, a polyoxyethylene oxypropylene block copolymer and polyoxyethylene distyryl phenyl ether.

Examples of the reactive emulsifier having a radical polymerizable double bond include, but not limited to the following, Eleminol JS-2 (trade name, manufactured by Sanyo Chemical Industries, Ltd.), Latemul S-120, S-180A or S-180 (trade name, manufactured by Kao Corporation), Aqualon HS-10, KH-1025, RN-10, RN-20, RN30 or RN50 (trade name, manufactured by DKS Co., Ltd.), Adekariasoap SE1025, SR-1025, NE-20, NE-30 or NE-40 (trade name, manufactured by Adeka Corporation), an ammonium salt of p-styrene sulfonic acid, a sodium salt of p-styrene sulfonic acid, a potassium salt of p-styrene sulfonic acid, alkyl sulfonic acid (meth)acrylate such as 2-sulfoethyl acrylate, methylpropane sulfonic acid (meth)acrylamide, an ammonium salt of allyl sulfonic acid, a sodium salt of allyl sulfonic acid, or a potassium salt of allyl sulfonic acid.

[Average Particle Size of Adhesive Emulsion Particle (F)]

The average particle size of the adhesive emulsion particle (F) in the present embodiment is determined from the size of such any particle observed according to a cross-sectional SEM or dynamic light scattering method. The average particle size of the adhesive emulsion particle (F) is preferably 300 nm or less. The average particle size of the adhesive emulsion particle (F) is adjusted in the range, and thus a coating film still higher in adhesiveness can be likely formed due to an enhancement in contact area with the substrate. The average particle size is more preferably 200 nm or less from the viewpoint of an enhancement in transparency of the resulting coating film. The method for measuring the average particle size of the adhesive emulsion particle (F) can be made by, but not limited to the following, for example, using an aqueous adhesive emulsion particle (F) dispersion and measuring the cumulant particle size with a dynamic light scattering type particle size distribution measuring apparatus manufactured by Otsuka Electronics Co., Ltd. (item number: ELSZ-1000).

[Inorganic Oxide (G)]

The adhesion layer preferably further includes an inorganic oxide (G) from the viewpoint of an enhancement in adhesiveness due to interaction with the hard coating film.

Specific examples of the inorganic oxide (G) in the present embodiment include, but not limited to the following, respective oxides of silicon, aluminum, titanium, zirconium, zinc, cerium, tin, indium, gallium, germanium, antimony, and molybdenum. Such an inorganic oxide may be in the form of a single substance or a mixture. In particular, the inorganic oxide (G) is preferably a silica particle.

The average particle size of the inorganic oxide (G) in the present embodiment is preferably 2 nm or more from the viewpoint of an improvement in storage stability of a raw material composition of the adhesion layer, and is preferably 150 nm or less from the viewpoint of an improvement in transparency of the entire hard coating film-applied substrate. Thus, the average particle size is preferably 2 nm or more and 100 nm or less, more preferably 2 nm or more and 50 nm or less.

A silica particle typified by dry silica or colloidal silica is preferable, but not particularly limited thereto, from the viewpoints of strong interaction with the hydrolyzable silicon compound (b) and adhesiveness to the hard coating film. Colloidal silica is preferable because it can also be used even in the form of an aqueous dispersion liquid.

[Colloidal Silica Suitably Used as Inorganic Oxide (G)]

The acidic colloidal silica suitably used in the present embodiment, for which water is used as a dispersing solvent, is not particularly limited, and any one prepared according to a sol-gel method can also be used and a commercially available product can also be utilized. Such preparation according to a sol-gel method can be made with reference to Werner Stober et al; J. Colloid and Interface Sci., 26, 62-69 (1968), Rickey D. Badley et al; Lang muir 6, 792-801 (1990), Journal of the Japan Society of Colour Material, 61 [9] 488-493 (1988), and the like.

Examples of such a commercially available product utilized include Snowtex-O, Snowtex-OS, Snowtex-OXS, Snowtex-O-40, Snowtex-OL, Snowtex-OYL, Snowtex-OUP, Snowtex-PS-SO, Snowtex-PS-MO, Snowtex-AK-XS, Snowtex-AK, Snowtex-AK-L, Snowtex-AK-YL and Snowtex-AK-PS-S (trade names, manufactured by Nissan Chemical Corporation), Adelite AT-20Q (trade name, manufactured by Adeka Corporation), and Klebosol 20H12 and Klebosol 30CAL25 (trade names, manufactured by Clariant Japan K.K.).

The basic colloidal silica is silica stabilized by addition of an alkali metal ion, an ammonium ion or an amine and is not particularly limited, and examples thereof include Snowtex-20, Snowtex-30, Snowtex-XS, Snowtex-50, Snowtex-30L, Snowtex-XL, Snowtex-YL, Snowtex ZL, Snowtex-UP, Snowtex-ST-PS-S, Snowtex ST-PS-M, Snowtex-C, Snowtex-CXS, Snowtex-CM, Snowtex-N, Snowtex-NXS, Snowtex-NS and Snowtex-N-40 (trade names, manufactured by Nissan Chemical Corporation), Adelite AT-20, Adelite AT-30, Adelite AT-20N, Adelite AT-30N, Adelite AT-20A, Adelite AT-30A, Adelite AT-40 and Adelite AT-50 (trade names, manufactured by Adeka Corporation), Klebosol 30R9, Klebosol 30R50 and Klebosol 50R50 (trade names, manufactured by Clariant Japan K.K.), and Ludox HS-40, Ludox HS-30, Ludox LS, Ludox AS-30, Ludox SM-AS, Ludox AM, Ludox HAS and Ludox SM (trade names, manufactured by DuPont).

The colloidal silica for which a water-soluble solvent is used as a dispersing medium is not particularly limited, and examples thereof include MA-ST-M (methanol dispersion type having a particle size of 20 to 25 nm), IPA-ST (isopropyl alcohol dispersion type having a particle size of 10 to 15 nm), EG-ST (ethylene glycol dispersion type having a particle size of 10 to 15 nm), EGST-ZL (ethylene glycol dispersion type having a particle size of 70 to 100 nm), NPC-ST (ethylene glycol monopropyl ether dispersion type having a particle size of 10 to 15 nm) and TOL-ST (toluene dispersion type having a particle size of 10 to 15 nm), manufactured by Nissan Chemical Corporation.

The dry silica particle is not particularly limited, and examples thereof include AEROSIL manufactured by Nippon Aerosil Co., Ltd., and Reolosil manufactured by Tokuyama Corporation.

Such a silica particle may include an inorganic base (for example, sodium hydroxide, potassium hydroxide, lithium hydroxide, and/or ammonia) and/or an organic base (for example, tetramethylammonium and/or triethylamine) as stabilizer(s).

[Shape of Inorganic Oxide (G)]

Examples of the shape of the inorganic oxide (G) in the present embodiment include, but not limited to the following, spherical, horned, polyhedron, elliptical, flattened, linear, and beaded shapes, and a spherical shape is particularly preferable from the viewpoints of hardness and transparency of the hard coating film.

The thickness of the adhesion layer is preferably 0.1 μm or more and 100.0 μm or less, more preferably 0.3 μm or more and 50.0 μm or less from the viewpoint of adhesiveness.

The coating film (C) may be further provided with a functional layer on at least one surface thereof. Examples of the functional layer include, but not limited to the following, an antireflective layer, an antifouling layer, a polarizing layer, and an impact-absorbing layer.

The hard coating film-applied substrate may be subjected to surface treatment with silica and thus provided with a silica layer formed thereon from the viewpoint of weather resistance. The method for forming such a silica layer will be described below.

[Component Optionally Included in Adhesion Layer]

The adhesion layer in the present embodiment optionally includes a solvent, an emulsifier, a plasticizer, a pigment, a dye, a filler, an anti-aging agent, a conductive material, an ultraviolet absorber, a light stabilizer, a peel strength adjusting agent, a softener, a surfactant, a flame retardant, an antioxidant, and/or a catalyst, depending on the application. The adhesion layer preferably includes an ultraviolet absorber and/or a light stabilizer because high weather resistance is demanded particularly in an outdoor application. Specific examples include, but not limited to the following, benzophenone-based ultraviolet absorbers such as 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-benzyloxybenzophenone, bis(5-benzoyl-4-hydroxy-2-methoxyphenyl)methane, 2,2'-dihydroxy-4-methoxybenzophenone, 2,2'-dihydroxy-4,4'dimethoxybenzophenone (trade name "UVINUL3049" manufactured by BASF SE), 2,2',4,4'-tetrahydroxybenzophenone (trade name "UVINUL3050" manufactured by BASF SE), 4-dodecyloxy-2-hydroxybenzophenone, 5-benzoyl-2,4-dihydroxybenzophenone, 2-hydroxy-4-methoxy-2'-carboxybenzophenone, 2-hydroxy-4-stearyloxybenzophenone and 4,6-dibenzoylresorcinol; benzotriazole-based ultraviolet absorbers such as 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, 2-(2-hydroxy-5-tert-octylphenyl)benzotriazole, 2-(2-hydroxy-3,5-di-tert-octylphenyl)benzotriazole, 2-[2'-hydroxy-3',5'-bis(a,a'-dimethylbenzyl)phenyl]benzotriazole), a condensate (trade name "TINUVIN1130" manufactured by BASF SE) of methyl-3-[3-tert-butyl-5-(2H-benzotriazole-2-yl)-4-hydroxyphenyl]propionate and polyethylene glycol (molecular weight: 300), isooctyl-3-[3-(2H-benzotriazole-2-yl)-5-tert-butyl-4-hydroxyphenyl]propionate (trade name "TINUVIN384" manufactured by BASF SE), 2-(3-dodecyl-5-methyl-2-hydroxyphenyl)benzotriazole (trade name "TINUVIN571" manufactured by BASF SE), 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-4'-octoxyphenyl)benzotriazole, 2-[2'-hydroxy-3'-

(3",4",5",6"-tetrahydrophthalimidemethyl)-5'-methylphenyl]benzotriazole, 2,2-methylenebis[4-(1,1,3,3-tetramethylbutyl)-6-(2H-benzotriazole-2-yl)phenol], 2-(2H-benzotriazole-2-yl)-4,6-bis(1-methyl-1-phenylethyl)phenol (trade name "TINUVIN900" manufactured by BASF SE), and TINUVIN384-2, TINUVIN326, TINUVIN327, TINUVIN109, TINUVIN970, TINUVIN328, TINUVIN171, TINUVIN970, TINUVIN PS, TINUVIN P, TINUVIN99-2 and TINVIN928 (trade names, manufactured by BASF SE); triazine-based ultraviolet absorbers such as 2-[4-[(2-hydroxy-3-dodecyloxypropyl)oxy]-2-hydroxyphenyl]-4,6-bis (2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, 2,4-bis(2-hydroxy-4-butyloxyphenyl)-6-(2,4-bisbutyloxyphenyl)-1,3,5-triazine (trade name "TINUVIN460" manufactured by BASF SE), 2-(2-hydroxy-4-[1-octyloxycarbonylethoxy]phenyl)-4,6-bis (4-phenylphenyl)-1,3,5-triazine (trade name "TINUVIN479" manufactured by BASF SE), and TINUVIN400, TINUVIN405, TINUVIN477 and TINUVIN1600 (trade name, manufactured by BASF SE); malonic acid ester-based ultraviolet absorbers such as HOSTAVIN PR25, HOSTAVIN B-CAP and HOSTAVIN VSU (trade names, manufactured by Clariant Japan K.K.); cyanoacrylate-based ultraviolet absorbers such as ethyl-2-cyano-3,3-diphenyl acrylate (trade name "UVINUL3035" manufactured by BASF SE), (2-ethylhexyl)-2-cyano-3,3-diphenyl acrylate (trade name "UVINUL3039" manufactured by BASF SE) and 1,3-bis ((2'-cyano-3',3'-diphenylacryloyl)oxy)-2,2-bis-(((2'-cyano-3',3'-diphenylacryloyl)oxy)methyl)propane (trade name "UVINUL3030" manufactured by BASF SE); radical polymerizable ultraviolet absorbers each having a radical polymerizable double bond in its molecule, such as 2-hydroxy-4-acryloxybenzophenone, 2-hydroxy-4-methacryloxybenzophenone, 2-hydroxy-5-acryloxybenzophenone, 2-hydroxy-5-methacryloxybenzophenone, 2-hydroxy-4-(acryloxy-ethoxy)benzophenone, 2-hydroxy-4-(methacryloxy-ethoxy)benzophenone, 2-hydroxy-4-(methacryloxy-diethoxy)benzophenone, 2-hydroxy-4-(acryloxy-triethoxy) benzophenone, 2-(2'-hydroxy-5'-methacryloxyethylphenyl)-2H-benzotriazole (trade name "RUVA-93" manufactured by Otsuka Chemical Co., Ltd.), 2-(2'-hydroxy-5'-methacryloxyethyl-3-tert-butylphenyl)-2H-benzotriazole, 2-(2'-hydroxy-5'-methacryloxypropyl-3-tert-butylphenyl)-5-chloro-2H-benzotriazole and 3-methacryloyl-2-hydroxypropyl-3-[3'-(2"-benzotriazolyl)-4-hydroxy-5-tert-butyl]phenyl propionate (trade name "CGL-104" manufactured by Ciba-Geigy Japan Ltd.); polymers each having ultraviolet absorptivity, such as UV-G101, UV-G301, UV-G137, UV-G12 and UV-G13(trade names, manufactured by Nippon Shokubai Co., Ltd.); hindered amine-based light stabilizers such as bis(2,2,6,6-tetramethyl-4-piperidyl)succinate, bis(2,2,6,6-tetramethylpiperidyl)sebacate, bis(1,2,2,6,6-pentamethyl-4-piperidyl)2-(3,5-di-tert-butyl-4-hydroxybenzyl)-2-butylmalonate, 1-[2-[3-(3,5-di-tert-butyl-4-hydroxyphenyl)propynyloxy]ethyl]-4-[3-(3,5-di-tert-butyl-4-hydroxyphenyl)propynyloxy]-2,2,6,6-tetramethylpiperidine, a mixture (trade name "TINUVIN292" manufactured by BASF SE) of bis (1,2,2,6,6-pentamethyl-4-piperidyl)sebacate and methyl-1, 2,2,6,6-pentamethyl-4-piperidyl-sebacate, bis(1-octoxy-2,2, 6,6-tetramethyl-4-piperidyl)sebacate, and TINUVIN123, TINUVIN144, TINUVIN152, TINUVIN249, TINUVIN292 and TINUVIN5100 (trade names, manufactured by BASF SE); radical polymerizable hindered amine-based light stabilizers such as 1,2,2,6,6-pentamethyl-4-piperidyl methacrylate, 1,2,2,6,6-pentamethyl-4-piperidyl acrylate, 2,2,6, 6-tetramethyl-4-piperidyl methacrylate, 2,2,6,6-tetramethyl-4-piperidyl acrylate, 1,2,2,6,6-pentamethyl-4-iminopiperidyl methacrylate, 2,2,6,6,-tetramethyl-4-iminopiperidyl methacrylate, 4-cyano-2,2,6,6-tetramethyl-4-piperidyl methacrylate and 4-cyano-1,2,2,6,6-pentamethyl-4-piperidyl methacrylate; polymers each having photostability, such as U-Double E-133, U-Double E-135, U-Double S-2000, U-Double S-2834, U-Double S-2840, U-Double S-2818 and U-Double S-2860 (trade names, manufactured by Nippon Shokubai Co., Ltd.); ultraviolet absorbers each having reactivity with a silanol group, an isocyanate group, an epoxy group, a semicarbazide group or a hydrazide group; and inorganic ultraviolet absorbers such as cerium oxide, zinc oxide, aluminum oxide, zirconium oxide, bismuth oxide, cobalt oxide, copper oxide, tin oxide and titanium oxide, and these may be used singly or in combinations of two or more thereof.

<Coating Material Composition>

The coating film (C) of the present embodiment is obtained by using, for example, the following coating material composition (I). The coating material composition (I) is a coating material composition including a polymer nanoparticle (A) and a matrix raw material component (B'), in which the elastic recovery rate $\eta_{IT4}$ of the polymer nanoparticle (A), as measured by an indentation test according to ISO14577-1, is 0.30 or more and 0.90 or less, and the Martens hardness $HM_A$ of the polymer nanoparticle (A) and the Martens hardness $HM_{B'}$ of the matrix raw material component (B') satisfy a relationship of $HM_{B'}/HM_A>1$.

[Hardness $HM_A$ of Polymer Nanoparticle (A) and Hardness $HM_B$ of Matrix Raw Material Component (B')]

The Martens hardness $HM_A$ of the polymer nanoparticle (A) and the Martens hardness $HM_{B'}$ of the matrix raw material component (B') in the coating material composition (I) satisfy a relationship of the following expression (3).

$$HM_{B'}/HM_A>1 \qquad \text{expression (3)}$$

The relationship is satisfied in the coating material composition (I) as described above, and therefore the relationship of the expression (3) is satisfied also by the Martens hardness $HM_A$ of the polymer nanoparticle (A) and the Martens hardness $HM_{B'}$ of the matrix raw material component (B') in the coating film (C) obtained with the coating material composition (I). Such each Martens hardness with respect to the coating material composition (I) can be measured by, for example, separating the polymer nanoparticle (A) and the matrix raw material component (B') by an operation such as centrifugation and/or ultrafiltration, and subjecting each component separated, to measurement based on a method described in Examples described below.

The respective values of the $HM_A$ and the $HM_B$ can be adjusted by, for example, the structures of and the compositional ratio between the respective structural components of the polymer nanoparticle (A) and the matrix raw material component (B') so as to satisfy the above magnitude relationship, but the adjustment is not limited thereto.

[Elastic Recovery Rate $\eta_{IT4}$ of Polymer Nanoparticle (A)]

The elastic recovery rate $\eta_{IT4}$ of the polymer nanoparticle (A) in the present embodiment is obtained by measuring the parameter described as the ratio $\eta_{IT}$ of $W_{elast}/W_{total}$ in ISO14577-1 with respect to a coating film formed of the polymer nanoparticle (A), and is represented as the ratio of the elastic return deformation workload $W_{elast}$ of a depression to the total mechanical workload $W_{total}$ of a depression. As the elastic recovery rate $\eta_{IT4}$ is higher, the coating film can be more returned to the original state when is subject to impact, and is higher in ability to repair itself against impact.

The elastic recovery rate $\eta_{IT4}$ of the polymer nanoparticle (A) is 0.30 or more under measurement conditions (Vickers quadrangular pyramid diamond indenter, loading condition: 2 mN/20 sec, unloading condition: 2 mN/20 sec) from the viewpoint that the ability to repair itself is effectively expressed, and the $\eta_{IT4}$ is 0.90 or less from the viewpoint of being able to conform to deformation of the substrate and/or the matrix raw material component (B') in formation of the coating film. The elastic recovery rate $\eta_{IT4}$ of the polymer nanoparticle (A) is more preferably 0.50 or more, further preferably 0.60 or more. The elastic recovery rate of the polymer nanoparticle (A) can be measured by, but not limited to the following, for example, separating the polymer nanoparticle (A) and the matrix raw material component (B') by an operation such as centrifugation and/or ultrafiltration, dispersing the polymer nanoparticle (A) separated, in a solvent, to provide a composition, performing coating with the composition to form a coating film, and subjecting the coating film to measurement with, for example, a microhardness meter Fischer scope (HM2000S manufactured by Fischer Instruments K.K.), a nano indentation tester (ENT-NEXUS manufactured by Elionix Inc.), a nano indenter (iNano, G200 manufactured by Toyo Corporation), and/or a nano indentation system (TI980 manufactured by Bruker AXS GmbH). Examples of the method for adjusting the elastic recovery rate $\eta_{IT4}$ in the range include, but not limited to the following, adjustment of the structure and the compositional ratio of the structural component of the polymer nanoparticle (A).

The coating film (C) can be obtained as a cured product formed by curing the coating material composition (I) with hydrolytic condensation or the like. The polymer nanoparticle (A) is usually not changed in composition in the course of such curing. Accordingly, the value of the elastic recovery rate $\eta_{IT4}$ in the coating film (C) can be determined under the assumption that the value of the elastic recovery rate $\eta_{IT4}$ of the polymer nanoparticle (A) in the coating material composition (I), as measured by a method described in Examples below, is well matched to the elastic recovery rate $\eta_{IT4}$ of the polymer nanoparticle (A) in the coating film (C).

[Solvent (H)]

The coating material composition (I) in the present embodiment preferably contains a solvent (H). A usable solvent (H) is not particularly limited, and a common solvent can be used. Examples of the solvent include, but not limited to the following, water; alcohols such as ethylene glycol, butyl cellosolve, isopropanol, n-butanol, 2-butanol, ethanol, methanol, modified ethanol, 2-methoxy-1-propanol, 1-methoxy-2-propanol, diacetone alcohol glycerin, monoalkyl monoglyceryl ether, propylene glycol monomethyl ether, diethylene glycol monobutyl ether, propylene glycol monoethyl ether, propylene glycol monobutyl ether, dipropylene glycol monoethyl ether, dipropylene glycol monobutyl ether, diethylene glycol monophenyl ether and tetraethylene glycol monophenyl ether; aromatic hydrocarbons such as toluene and xylene; aliphatic hydrocarbons such as hexane, cyclohexane and heptane; esters such as ethyl acetate and n-butyl acetate; ketones such as acetone, methyl ethyl ketone, methyl isobutyl ketone and cyclohexanone; ethers such as tetrahydrofuran and dioxane; amides such as dimethylacetamide and dimethylformamide; halogen compounds such as chloroform, methylene chloride and carbon tetrachloride; dimethylsulfoxide, and nitrobenzene; and these may be used singly or in combinations of two or more thereof. In particular, such a solvent particularly preferably includes water and/or any alcohol from the viewpoint of a decrease in environmental load in removal of the solvent.

Hereinafter, the structural component, the size, the compositional ratio, and the like of the polymer nanoparticle (A) included in the coating material composition (I) will be described, and the detail about any matter not mentioned below is as described above with respect to the polymer nanoparticle (A) included in the coating film (C).

The matrix raw material component (B') included in the coating material composition (I) is cured with hydrolytic condensation or the like in the course of obtaining the coating film (C). That is, the matrix raw material component (B') included in the coating material composition (I) is in a relationship so as to correspond to the matrix component (B) in the resulting coating film (C). Hereinafter, the structural component, the size, the compositional ratio, and the like of the matrix raw material component (B') will be described, and the detail about any matter not mentioned below is as described above with respect to the matrix component (B) included in the coating film (C).

The polymer nanoparticle (A) and the matrix raw material component (B') in the coating material composition (I) preferably include the above hydrolyzable silicon compound (a) and the above hydrolyzable silicon compound (b), respectively. The hydrolyzable silicon compound (a) in the coating material composition (I) also preferably includes at least one or more selected from the compound having an atomic group represented by the formula (a-1) and the hydrolyzed product and the condensate thereof, and the compound represented by the formula (a-2) and the hydrolyzed product and the condensate thereof. The hydrolyzable silicon compound (b) in the coating material composition (I) also preferably includes at least one or more selected from the compound having an atomic group represented by the formula (b-1), and the hydrolyzed product and the condensate thereof, and the compound represented by the formula (b-2), and the hydrolyzed product and the condensate thereof.

The details of the hydrolyzable silicon compounds (a) and (b) in the coating material composition (I) are as described above with respect to the polymer nanoparticle (A) and the matrix component (B) included in the coating film (C), respectively.

[Content of Hydrolyzable Silicon Compound (a) in Polymer Nanoparticle (A)]

The content of the hydrolyzable silicon compound (a) in the coating material composition (I) represents the weight proportion of the solid content of the hydrolyzable silicon compound (a) included in the polymer nanoparticle (A), and the content is preferably higher because, as the content is higher, abrasion resistance, weather resistance and heat resistance are enhanced. The content is preferably 50% by mass or more, more preferably 60% by mass or more. The content of the hydrolyzable silicon compound (a) in the polymer nanoparticle (A) can be measured by, but not limited to the following, for example, IR analysis, NMR analysis, and/or elemental analysis of the polymer nanoparticle (A).

[Functional Group (e)]

The polymer nanoparticle (A) in the coating material composition (I) preferably has a functional group (e) which interacts with the matrix raw material component (B'). When the polymer nanoparticle (A) has such a functional group (e), the matrix raw material component (B') easily adsorbs to the surface of the polymer nanoparticle (A) and tends to be in the form of protective colloid and thus stabilized, resulting in a tendency to enhance storage stability of the coating material composition (I). Furthermore, when the polymer nanoparticle (A) has such a functional group (e), an increase in interaction between the polymer nanoparticle (A) and the matrix raw material component (B') tends to lead to an increase in thickening of the solid content concentration of the coating material composition (I) and suppression of sagging in coating of a complicated shape, resulting in a tendency to uniform the film thickness of the coating film (C). Whether or not the polymer nanoparticle (A) has such a functional group (e) can be confirmed by, for example, compositional analysis with IR, GC-MS, pyrolysis GC-MS, LC-MS, GPC, MALDI-MS, TOF-SIMS, TG-DTA, and/or NMR, or analysis with any combination thereof.

Specific examples of the functional group (e) in the present embodiment include, but not limited to the following, functional groups such as a hydroxyl group, a carboxyl group, an amino group, an amide group and a functional group having an ether bond, a functional group having a hydrogen bond is preferable from the viewpoint of interaction, and an amide group is more preferable and a secondary amide group and/or a tertiary amide group are/is further preferable from the viewpoint of high hydrogen bondability.

Examples of the compound having the functional group (e) and a reaction product thereof include 2-hydroxyethyl (meth)acrylate, 2-hydroxypropyl (meth)acrylate, 4-hydroxybutyl (meth)acrylate, 2-hydroxyethyl vinyl ether or 4-hydroxybutyl vinyl ether, 2-hydroxyethyl allyl ether, (meth)acrylic acid, 2-carboxyethyl (meth)acrylate, 2-dimethylaminoethyl (meth)acrylate, 2-diethylaminoethyl (meth)acrylate, 2-di-n-propylaminoethyl (meth)acrylate, 3-dimethylaminopropyl (meth)acrylate, 4-dimethylaminobutyl (meth)acrylate, N-[2-(meth)acryloyloxy]ethylmorpholine, vinylpyridine, N-vinylcarbazole, N-vinylquinoline, N-methylacrylamide, N-methylmethacrylamide, N-ethylacrylamide, N,N-dimethylacrylamide, N,N-dimethylmethacrylamide, N,N-diethylacrylamide, N-ethylmethacrylamide, N-methyl-N-ethylacrylamide, N-methyl-N-ethylmethacrylamide, N-isopropylacrylamide, N-n-propylacrylamide, N-isopropylmethacrylamide, N-n-propylmethacrylamide, N-methyl-N-n-propylacrylamide, N-methyl-N-isopropylacrylamide, N-acryloylpyrrolidine, N-methacryloylpyrrolidine, N-acryloylpiperidine, N-methacryloylpiperidine, N-acryloylhexahydroazepine, N-acryloylmorpholine, N-methacryloylmorpholine, N-vinylpyrrolidone, N-vinylcaprolactam, N,N'-methylenebisacrylamide, N,N'-methylenebismethacrylamide, N-vinylacetamide, diacetone acrylamide, diacetone methacrylamide, N-methylolacrylamide, N-methylolmethacrylamide, Blemmers PE-90, PE-200, PE-350, PME-100, PME-200, PME-400 and AE-350 (trade names, manufactured by NOF Corporation), and MA-30, MA-50, MA-100, MA-150, RA-1120, RA-2614, RMA-564, RMA-568, RMA-1114 and MPG130-MA (trade names, manufactured by Nippon Nyukazai Co., Ltd.). Herein, the "(meth)acrylate" simply represents acrylate or methacrylate, and the "(meth)acrylic acid" simply represents acrylic acid or methacrylic acid.

[Elastic recovery rate $\eta_{ITB'}$ of matrix raw material component (B') and elastic recovery rate $\eta_{ITB}$ of matrix component (B)]

The elastic recovery rate $\eta_{ITB'}$ of the matrix raw material component (B') in the coating material composition (I) is the parameter described as the "ratio $\eta_{IT}$ of $W_{elast}/W_{total}$" in ISO14577-1, is measured with respect to a coating film formed of the matrix raw material component (B'), and is represented as the ratio of the elastic return deformation workload $W_{elast}$ of a depression to the total mechanical workload $W_{total}$ of a depression. As the elastic recovery rate $\eta_{ITB'}$ is higher, the coating film can be more returned to the original state when is subject to impact, and is higher in ability to repair itself against impact. The elastic recovery rate $\eta_{ITB'}$ of the matrix raw material component (B') is preferably 0.60 or more, more preferably 0.65 or more under measurement conditions (Vickers quadrangular pyramid diamond indenter, loading condition: 2 mN/20 sec, unloading condition: 2 mN/20 sec) from the viewpoint that the ability to repair itself is effectively expressed. The $\eta_{ITB'}$ is preferably 0.95 or less from the viewpoint of being able to conform to deformation of the substrate and/or the component (A) in formation of the coating film. The elastic recovery rate of the matrix raw material component (B') can be measured by, but not limited to the following, for example, separating the polymer nanoparticle (A) and the matrix raw material component (B') by an operation such as centrifugation, dissolving the matrix raw material component (B') separated, in a solvent, to provide a composition, performing coating with the composition and drying to form a coating film, and subjecting the coating film to measurement with, for example, a micro-hardness meter Fischer scope (HM2000S manufactured by Fischer Instruments K.K.), a nano indentation tester (ENT-NEXUS manufactured by Elionix Inc.), a nano indenter (iNano, G200 manufactured by Toyo Corporation), and/or a nano indentation system (TI980 manufactured by Bruker AXS GmbH).

As described above, a cured product obtained by curing the matrix raw material component (B') with hydrolytic condensation or the like corresponds to the matrix component (B). Accordingly, the value of the elastic recovery rate $\eta_{ITB'}$ of the matrix raw material component (B') can be determined under the assumption that the value of the elastic recovery rate $\eta_{ITB'}$ of the matrix raw material component (B'), as measured by a method described in Examples below, is well matched with the elastic recovery rate $\eta_{ITB}$ of the corresponding matrix component (B). That is, the elastic recovery rate $\eta_{ITB}$ of the matrix component (B) in the present embodiment is preferably 0.60 or more, more preferably 0.65 or more. The $\eta_{ITB}$ is preferably 0.95 or less from the viewpoint of being able to conform to deformation of the substrate and/or the component (A) in formation of the coating film.

Examples of the method for adjusting the elastic recovery rate $\eta_{ITB'}$ and the elastic recovery rate $\eta_{ITB}$ in the respective ranges include, but not limited to the following, adjustment of the structure and the compositional ratio of the structural component of the matrix raw material component (B').

The "hydrolyzable silicon compound (a) included in the polymer nanoparticle (A)" in the coating material composition (I) may be the same as or different from the "hydrolyzable silicon compound (b) included in the matrix raw material component (B')". Even if both compounds are the same, such compounds are distinguished from each other by defining the compound included in the polymer nanoparticle (A) as the hydrolyzable silicon compound (a) and defining the compound included in the matrix raw material component (B') as the hydrolyzable silicon compound (b).

[Inorganic Oxide (D)]

The matrix raw material component (B') in the present embodiment preferably includes an inorganic oxide (D). The inorganic oxide (D) is included to result in a tendency to enhance hardness of the matrix raw material component (B') and enhance abrasion resistance. For example, it is preferable that the inorganic oxide (D) contain a hydroxyl group, because the hydrophilicity tends to enhance contamination resistance of the coating film.

The inorganic oxide (D) in the present embodiment is not limited in terms of the shape thereof, and may be in the form of a single substance or a mixture. Any silica particle is preferable from the viewpoint of interaction with the above hydrolyzable silicon compound (b), and such a silica particle is preferably in the form of colloidal silica from the viewpoint of dispersibility. When colloidal silica is used as the inorganic oxide (D), such silica is preferably in the form of an aqueous dispersion liquid, and can be used even if is either acidic or basic.

The average particle size of the inorganic oxide (D) in the present embodiment is preferably 2 nm or more from the viewpoint of an improvement in storage stability of the coating material composition (I), and is preferably 150 nm or less from the viewpoint of an improvement in transparency. That is, the average particle size is preferably 2 nm or more and 150 nm or less, more preferably 2 nm or more and 100 nm or less, further preferably 2 nm or more and 50 nm or less.

[Volume Fraction of Polymer Nanoparticle (A) Based on Total of Polymer Nanoparticle (A) and Matrix Raw Material Component (B')]

The volume fraction of the polymer nanoparticle (A) based on the total of the polymer nanoparticle (A) and the matrix raw material component (B') in the coating material composition (I) is preferably 2% or more from the viewpoint of film formability, and is preferably 80% or less from the viewpoint of transparency of the coating film formed. That is, the volume fraction of the polymer nanoparticle (A) in the coating material composition (I) is preferably 2% or more and 80% or less, more preferably 3% or more and 70% or less, further preferably 5% or more and 45% or less. The volume fraction of the polymer nanoparticle (A) in the coating material composition (I) can be calculated from, for example, the proportion of the polymer nanoparticle (A) in the entire coating film (C) in a cross-sectional SEM image after formation of the coating film, and/or the component ratio of the polymer nanoparticle (A) to the components constituting the coating material composition (I).

[Core/Shell Structure of Polymer Nanoparticle (A)]

The polymer nanoparticle (A) in the coating material composition (I) preferably has a core/shell structure including a core layer and one or more shell layers covering the core layer. The polymer nanoparticle (A) preferably has the above functional group (e) also from the viewpoint of interaction with the matrix raw material component (B') on the outermost layer of the core/shell structure. Whether or not the polymer nanoparticle (A) has the core/shell structure can be confirmed in, for example, a transmission electron microscope image of a cross section of the coating film.

[Other Component Optionally Included in Coating Material Composition (I)]

The coating material composition (I) may include not only the above components, but also, if necessary, a thickening agent, a leveling agent, a thixotropic agent, a defoamer, a freezing stabilizer, a dispersant, a wetting agent, a rheology controlling agent, a film formation aid, a rust inhibitor, a plasticizer, a lubricant, a preservative agent, an antifungal agent, an antielectrostatic agent, and/or an antistatic agent, each compounded in the form of the matrix raw material component (B'), from the viewpoint of a more enhancement in coatability of the coating material composition (I). A wetting agent and/or a film formation aid are/is preferably used from the viewpoint of an enhancement in film formability, and specific examples thereof include, but not particularly limited, diethylene glycol monobutyl ether, ethylene glycol monobutyl ether, diethylene glycol diethyl ether, diethylene glycol dibutyl ether, ethylene glycol mono-2-ethylhexyl ether, 2,2,4-trimethyl-1,3-butanediol isobutyrate, diisopropyl glutarate, propylene glycol-n-butyl ether, dipropylene glycol-n-butyl ether, tripropylene glycol-n-butyl ether, dipropylene glycol methyl ether, tripropylene glycol methyl ether, Megafac F-443, F-444, F-445, F-470, F-471, F-472SF, F-474, F-475, F-477, F-479, F-480SF, F-482, F-483, F-489, F-172D and F-178K (trade names, manufactured by DIC Corporation), and SN Wet 366, SN Wet 980, SN Wet L, SN Wet S, SN Wet 125, SN Wet 126 and SN Wet 970 (trade names, manufactured by San Nopco Limited). Such compounds may be used singly or in combinations of two or more thereof.

[Catalyst]

The coating material composition (I) may include a catalyst as the matrix raw material component (B'). When the coating material composition (I) includes a catalyst which promotes a reaction of reactive groups is preferable in that any un-reactive group is unlikely to remain in the coating film to result in not only an increase in hardness and an enhancement in abrasion resistance, but also an enhancement in weather resistance. The catalyst is not particularly limited, and is preferably one which is dissolved or dispersed when the hard coating film is obtained. Such a catalyst is not particularly limited, and examples thereof include an organic acid, an inorganic acid, an organic base, an inorganic base, a metal alkoxide, and a metal chelate, and such catalysts may be used singly or in combinations of two or more thereof.

[Properties of Coating Material Composition (I)]

The solid content concentration of the coating material composition (I) is preferably 0.01 to 60% by mass, more preferably 1 to 40% by mass from the viewpoint of coatability. The viscosity at 20° C. of the coating material composition (I) is preferably 0.1 to 100000 mPa·s, preferably 1 to 10000 mPa·s from the viewpoint of coatability.

<Method for Producing Hard Coating Film>

The method for producing the hard coating film and the hard coating film-applied substrate, of the present embodiment, is not particularly limited, and a coating film can be obtained by, for example, coating the substrate with the coating material composition (I) in which the polymer nanoparticle (A), the matrix raw material component (B'), and any other appropriate component are dispersed and dissolved in a solvent, and subjecting the resultant to, for example, a heat treatment, ultraviolet irradiation, and/or infrared irradiation to thereby form a coating film. Examples of the coating method include, but not limited to the following, a spraying method, a flow coating method, a brush coating method, a dip coating method, a spin coating method, a screen printing method, a casting method, a gravure printing method, and a flexographic printing method. The coating material composition (I) subjected to coating can be preferably formed into a coating film by, for example, a heat treatment at room temperature to 250° C., more preferably 40° C. to 150° C., and/or ultraviolet or infrared irradiation.

[Surface Treatment]

The hard coating film or the hard coating film-applied substrate, of the present embodiment, may be subjected to surface treatment with silica and thus provided with a silica layer formed thereon from the viewpoint of weather resistance. The method for forming the silica layer is not particularly limited, and specific examples thereof include a silica treatment with PECVD for depositing/curing silicone or silazane and a silica treatment technique for modifying a surface by silica due to irradiation with ultraviolet light at 155 nm. In particular, such a silica treatment with PECVD is preferable because a layer through which oxygen and steam are unlikely to penetrate can be produced without degradation of any surface. Specific examples of such silicone or silazane which can be used in PECVD include, but not limited to the following, octamethylcyclotetrasiloxane, tetramethylcyclotetrasiloxane, decamethylcyclopentasiloxane, hexamethyldisiloxane, vinylmethoxysilane, vinylmethoxysilane, dimethyldimethoxysilane, TEOS, tetramethyldisiloxane, tetramethyltetravinylcyclotetrasiloxane and hexamethyldisilazane, and these may be used singly or in combinations of two or more thereof.

<Applications of Hard Coating Film and Hard Coating Film-Applied Substrate>

The hard coating film and the hard coating film-applied substrate, of the present embodiment, each have excellent abrasion resistance and durability. Accordingly, examples of the applications of the hard coating film and the hard coating film-applied substrate include, but not particularly limited, a building material, an automobile member, electronic equipment and an electronic product. Examples of such a building material application include, but not limited to the following, a skin material for wallpaper, a signboard, an alternative to glass, and an external wall material. Examples of the automobile member include, but not limited to the following, exterior members such as a bumper and a door mirror, interior members such as a center panel and a door panel, head lamp and rear lamp members, a front grille member, an emblem cover, a member for a vehicle-mounted camera lens, an instrument panel member, a lighting cover, and an alternative member to glass. Examples of the electronic product preferably include, but not limited to the following, a cellular phone, a personal computer, and a portable gaming device. The hard coating film and the hard coating film-applied substrate, of the present embodiment, can be each used in a coating material for not only the above, but also a traffic light member, a signboard, and any other machine/apparatus.

<Window Material>

A window material (hereinafter, also referred to as "window material (J)".) of the present embodiment is a window material including a polycarbonate resin and a coating film disposed on the polycarbonate resin, in which the coating film includes a polymer nanoparticle (A) and a matrix component (B), the polymer nanoparticle (A) includes a hydrolyzable silicon compound (a), the matrix component (B) includes a hydrolyzable silicon compound (b), the Martens hardness $HM_J$ of the window material is 100 N/mm$^2$ or more and 4000 N/mm$^2$ or less, and the elastic recovery rate $\eta_{ITJ}$ of the window material, as measured by an indentation test according to ISO14577-1, is 0.50 or more. The window material (J) thus configured has high abrasion resistance and high durability. The window material (J) exhibits abrasion resistance and contamination resistance at high levels, and thus is preferably applied to, but not limited to the following, for example, as a window material for automobiles.

The window material (J) may be described below with reference to the structural components and the like of the polymer nanoparticle (A) and the matrix component (B) included in the window material (J), and the details of the structural components and the like are as described above with respect to the polymer nanoparticle (A) and the matrix component (B) included in the coating film (C).

The polymer nanoparticle (A) is preferably dispersed in the matrix component (B) in the window material (J). Such a dispersing state can be confirmed by cross-sectional SEM observation of a coating film.

The polymer nanoparticle (A) and the matrix component (B) in the window material (J) include the above hydrolyzable silicon compound (a) and the above hydrolyzable silicon compound (b), respectively. The hydrolyzable silicon compound (a) in the window material (J) also preferably includes at least one or more selected from the compound having an atomic group represented by the formula (a-1) and the hydrolyzed product and the condensate thereof, and the compound represented by the formula (a-2) and the hydrolyzed product and the condensate thereof. The hydrolyzable silicon compound (b) in the window material (J) also preferably includes at least one or more selected from the compound having an atomic group represented by the formula (b-1), and the hydrolyzed product and the condensate thereof, and the compound represented by the formula (b-2), and the hydrolyzed product and the condensate thereof.

The details of the hydrolyzable silicon compounds (a) and (b) in the window material (J) are as described above with respect to the polymer nanoparticle (A) and the matrix component (B) included in the coating film (C), respectively.

[Martens Hardness $HM_J$ of Window Material (J)]

The Martens hardness $HM_J$ of the window material (J) is 100 N/mm$^2$ or more from the viewpoint of abrasion resistance, and higher Martens hardness has the advantage of less causing deformation against impact and less causing scratching associated with breakage. The Martens hardness $HM_J$ of the window material (J) is preferably 100 N/mm$^2$ or more and 4000 N/mm$^2$ or less, more preferably 150 N/mm$^2$ or more and 1500 N/mm$^2$ or less from the viewpoint of flex resistance. Examples of the method for adjusting the Martens hardness $HM_J$ of the window material (J) in the range include, but not limited to the following, a method involving coating a substrate with a coating material composition which satisfies a predetermined relationship represented by the expression (3) and in which a composition including the polymer nanoparticle (A) and the matrix raw material component (B') mixed are dispersed and dissolved in a solvent, and subjecting the resultant to heat treatment, ultraviolet irradiation, infrared irradiation, and/or the like to thereby form a coating film. In particular, an increase in content of the matrix component (B) based on the total amount of the polymer nanoparticle (A) and the matrix component (B) tends to result in an increase in Martens hardness $HM_J$ of the window material (J), and a decrease in content of the matrix component (B) tends to result in a decrease in Martens hardness $HM_J$ of the window material (J).

The elastic recovery rate $\eta_{ITJ}$ of the window material (J) is the ratio of the elastic return deformation workload $W_{elast}$ of a depression to the total mechanical workload $W_{total}$ of a depression, and is the parameter described as the "ratio $\eta_{IT}$ of $W_{elast}/W_{total}$" in ISO14577-1. As the elastic recovery rate $\eta_{ITJ}$ is higher, the window material can be more returned to the original state when deformed, and is higher in ability to repair itself against deformation. The elastic recovery rate $\eta_{ITJ}$ is 0.50 or more under measurement conditions (Vickers quadrangular pyramid diamond indenter, loading condition: 2 mN/20 sec, unloading condition: 2 mN/20 sec) and is more preferably higher as long as it is in the range, from the viewpoint that the ability to repair itself is effectively expressed. The elastic recovery rate $\eta_{ITJ}$ is preferably 0.55 or more, more preferably 0.60 or more, further preferably 0.65 or more. The elastic recovery rate of the window material in the present embodiment can be measured by, but not limited to the following, for example, subjecting the surface of the window material to an indentation test with, for example, a micro-hardness meter Fischer scope (HM2000S manufactured by Fischer Instruments K.K.), a nano indentation tester (ENT-NEXUS manufactured by Elionix Inc.), a nano indenter (iNano, G200 manufactured by Toyo Corporation), or a nano indentation system (TI980 manufactured by Bruker AXS GmbH). Examples of the method for adjusting the elastic recovery rate $\eta_{ITJ}$ in the range include, but not limited to the following, a method involving coating a substrate with a coating material composition which satisfies a predetermined relationship represented by the expression (3) and in which a composition including the polymer nanoparticle (A) and a matrix raw material component (B') described below, mixed, are dispersed and dissolved in a solvent, and subjecting the resultant to heat treatment, ultraviolet irradiation, infrared irradiation, and/or the like to thereby form a coating film.

The content of the hydrolyzable silicon compound (a) in the window material (J) is preferably adjusted. The content of the hydrolyzable silicon compound (a) here represents the weight proportion of the solid content of the hydrolyzable silicon compound (a) included in the polymer nanoparticle (A) relative to the polymer nanoparticle (A), and the content is preferably higher because, as the content is higher, abrasion resistance and weather resistance are enhanced, and the content is preferably 50% by mass or more, more preferably 60% by mass or more. The content of the hydrolyzable silicon compound (a) in the polymer nanoparticle (A) can be measured by, but not limited to the following, for example, IR analysis, NMR analysis, and/or elemental analysis of the polymer nanoparticle (A).

EXAMPLES

Hereinafter, the present embodiment will be described with reference to specific Examples and Comparative Examples, but the present embodiment is not limited thereto.

Various physical properties in Synthesis Examples, Examples and Comparative Examples described below were measured according to the following methods.

(1) Measurement of Film Thickness of Hard Coating Film

The film thickness of the hard coating film was measured with a reflection spectroscopic film thickness meter (item number: FE-3000) manufactured by Otsuka Electronics Co., Ltd.

(2) Respective Average Particle Sizes of Polymer Nanoparticle (A) and Adhesive Emulsion Particle (F)

The respective average particle sizes of the polymer nanoparticle (A) and the adhesive emulsion particle (F) were obtained by using an aqueous polymer nanoparticle (A) dispersion and an aqueous adhesive emulsion particle (F) dispersion each obtained by a method described below and measuring the cumulant particle sizes with a dynamic light scattering type particle size distribution measuring apparatus manufactured by Otsuka Electronics Co., Ltd. (item number: ELSZ-1000).

(3) Respective Average Particle Sizes of Inorganic Oxides (D) and (G)

The respective average particle sizes of the inorganic oxides (D) and (G) were obtained by observing colloidal silica dispersed in water, described below, at a magnification of 50,000 to 100,000× with a transmission micrograph, taking an image so that 100 to 200 inorganic oxides in the form of particles were photographed, and measuring a longer diameter and a shorter diameter of each of such inorganic oxide particles to thereby determine the average values.

(4) Measurement of Haze

The haze of the hard coating film was measured with a turbidimeter (item number: NDH5000SP) manufactured by Nippon Denshoku Industries Co., Ltd., according to the method prescribed in JIS K7136.

(5) Measurement of Martens Hardness HM of Hard Coating Film

The microhardness was measured by an indentation test (test conditions; indenter: Vickers quadrangular pyramid diamond indenter, loading condition: 2 mN/20 sec, unloading condition: 2 mN/20 sec) with a Fischer scope manufactured by Fischer Instruments K.K. (item number: HM2000S), and the Martens hardness HM of the coating film was measured based on an indentation test according to ISO14577-1.

(6) Measurement of Elastic Recovery Rate $\eta_{IT}$ of Hard Coating Film

The microhardness was measured by an indentation test (test conditions; indenter: Vickers quadrangular pyramid diamond indenter, loading condition: 2 mN/20 sec, unloading condition: 2 mN/20 sec) with a Fischer scope manufactured by Fischer Instruments K.K. (item number: HM2000S), and the ratio of the elastic return deformation workload $W_{elast}$ of a depression to the total mechanical workload $W_{total}$ of a depression, namely, the value of $W_{elast}/W_{total}$ was determined as the elastic recovery rate $\eta_{IT}$ of the coating film based on an indentation test method according to ISO14577-1.

(7) Measurements of Martens Hardness $HM_A$ and Elastic Recovery Rate $\eta_{ITA}$ of Polymer Nanoparticle (A)

The Martens hardness $HM_A$ of the polymer nanoparticle (A) was measured by coating a glass substrate (material: white plate glass, thickness: 2 mm) with an aqueous polymer nanoparticle (A) dispersion by use of a bar coater so that the film thickness was 3 μm, and drying the resultant at 130° C. over 2 hours to thereby provide a hard coating film, and subjecting the hard coating film to the same measurement as in (6) described above. The microhardness was measured by an indentation test (test conditions; indenter: Vickers quadrangular pyramid diamond indenter, loading condition: 2 mN/20 sec, unloading condition: 2 mN/20 sec) with a Fischer scope manufactured by Fischer Instruments K.K. (item number: HM2000S), and the Martens hardness $HM_A$ of the polymer nanoparticle (A) was measured based on an indentation test method according to ISO14577-1. The elastic recovery rate $\eta_{ITA}$ (=$W_{elast}/W_{total}$) was measured in the same manner as in (6) described above.

(8) Measurements of Martens Hardness $HM_{B'}$ and Elastic Recovery Rate $\eta_{ITB'}$ of Component (B')

The Martens hardness $HM_{B'}$ of the component (B') was determined by dissolving or dispersing the component (B') in water/ethanol/acetic acid (compositional ratio: 77% by mass/20% by mass/3% by mass) so that the solid content concentration was 8% by mass, coating a glass substrate (material: white plate glass, thickness: 2 mm) with the resulting solution by use of a bar coater so that the film thickness was 3 μm, drying the resultant at 130° C. over 2 hours to thereby provide a hard coating film, and subjecting the hard coating film to measurement. The microhardness was measured by an indentation test (test conditions; indenter: Vickers quadrangular pyramid diamond indenter, loading condition: 2 mN/20 sec, unloading condition: 2 mN/20 sec) with a Fischer scope manufactured by Fischer Instruments K.K. (item number: HM2000S), and the $HM_{B'}$ and $\eta_{ITB'}$ "$W_{elast}/W_{total}$" were measured based on an indentation test method according to ISO14577-1. The component (B) corresponded to the hydrolyzed condensate of the corresponding component (B'), as described below, and thus the respective values of the Martens hardness $HM_{B'}$ and the elastic recovery rate $\eta_{ITB'}$ of the component (B') were determined under the assumption that the respective values of the Martens hardness $HM_{B'}$ and the elastic recovery rate $\eta_{ITB'}$, measured as described above, were well matched with the Martens hardness $HM_B$ and the elastic recovery rate $\eta_{ITB}$ of the matrix component (B).

(9) Evaluation of Abrasion Resistance

Evaluation of the abrasion resistance of the coating film was performed with a Taber type abrasion tester (No. 101) manufactured by Yasuda Seiki Company, according to the standard of ASTM D1044. In other words, the Taber abrasion test was performed under conditions of an abrasive wheel CS-10F and a load of 500 g, the haze before the test and the haze at a rotation number of 1000 were each measured based on (4) described above, and the difference therebetween was determined to thereby evaluate the abrasion resistance.

(10) Measurement of Total Light Transmittance

The total light transmittance of the hard coating film was measured with a turbidimeter (item number: NDH5000SP) manufactured by Nippon Denshoku Industries Co., Ltd. The total light transmittance retention rate of the hard coating film was calculated from the measurement value, based on the following calculation expression.

Total light transmittance retention rate of hard coating film (%)=(Total light transmittance (%) of hard coating film-applied substrate/Total light transmittance (%) of substrate)×100

(11) Measurement of Initial Adhesiveness

The initial adhesiveness was evaluated by applying and peeling a tape (tape according to the cross-cut test/cross-scoring test, manufactured by Nichiban Co., Ltd.) to and from the coating film on the hard coating film-applied substrate, and confirming whether or not the hard coating film was retained on the substrate.

(12) Measurement of Moisture Resistance

The moisture resistance of the hard coating film was evaluated with, as the change in adhesiveness, the change of the hard coating film after 2 weeks, during which the hard coating film-applied substrate was left to still stand in a benchtop environmental test chamber (model number: SH-642 manufactured by Espec Corp.) under an environment at 50° C. and 95% RH for 2 weeks. The adhesiveness was evaluated by applying and peeling a tape (tape according to the cross-cut test/cross-scoring test, manufactured by Nichiban Co., Ltd.) to and from the hard coating film-applied substrate, and confirming whether or not the hard coating film was retained on the substrate. The adhesiveness after such a moisture resistance test was evaluated, and a case of no change in adhesiveness was rated as A, a case of no problem in practical use was rated as B and a case of overall peeling was rated as C, in Tables 1 to 2.

(13) Measurement of Difference (ΔA) in Haze Between Rotation Numbers of 500 and 10 in Taber Abrasion Test The difference (ΔA) in haze between rotation numbers of 500 and 10 was measured according to the standard of ASTM D1044 (an abrasive wheel CS-10F and a load of 500 g). Evaluation was made by performing the Taber abrasion test 10 times, thereafter measuring the haze according to (4) described above, thereafter performing the Taber abrasion test 490 times at a location where the haze was measured, and again measuring the haze according to (4) described above.

(14) Measurement of Contamination Resistance

The contamination resistance of the hard coating film was evaluated using the hard coating film-applied substrate obtained by coating the hard coating film-applied substrate, subjected to the Taber abrasion test at a rotation number of 500 according to the standard of ASTM D1044, with a liquid where 10 g of a JIS test powder 1 (12 kinds, carbon black) was dispersed in 5 g of acetone, and thereafter removing the powder by use of a soft cloth, a detergent, and water. Such evaluation was performed at the total light transmittance retention rate of the hard coating film before and after the contamination resistance test, the total light transmittance retention rate was calculated by the following calculation expression, and the total light transmittance was measured with a turbidimeter (item number: NDH5000SP) manufactured by Nippon Denshoku Industries Co., Ltd.

Total light transmittance retention rate (%) after contamination resistance test=(Total light transmittance after such test/Total light transmittance before such test)×100

(15) Volume Fraction of Polymer Nanoparticle (A) in Coating Film (C)

The volume fraction of the polymer nanoparticle (A) in the coating film (C) was calculated from the compounding ratio of the coating material composition for use in production of the coating film (C).

(16) Volume Fraction of Polymer Nanoparticle (A) Based on Total of Polymer Nanoparticle (A) and Matrix Component (B)

The volume fraction of the polymer nanoparticle (A) based on the total of the polymer nanoparticle (A) and the matrix component (B) was calculated from the compounding ratio of the polymer nanoparticle (A) and the matrix raw material component (B') for use in production of the coating material composition (I).

(17) Content of Hydrolyzable Silicon Compound (a) in Polymer Nanoparticle (A)

The content of the hydrolyzable silicon compound (a) in the polymer nanoparticle (A) was calculated from the proportion of the weight in terms of a complete hydrolytic condensation product based on the weight where the amounts of water, dodecylbenzene sulfonic acid, and ammonium persulfate were removed from the total amount of loading in preparation of an aqueous polymer nanoparticle (A) dispersion described below. The weight in terms of a complete hydrolytic condensation product was defined as the weight when 100% of a hydrolyzable group of the hydrolyzable silicon compound used in the loading was hydrolyzed and converted into a SiOH group, and further completely condensed into siloxane.

(18) Measurement of Cohesion Force

The cohesion force was measured by creating a sample cross section with cryo-CP, and subjecting the sample cross section to measurement in a PeakForce QNM mode of AFM (Dimension ICON+NanoscopeV manufactured by Bruker AXS GmbH) under an Ar atmosphere. The level of the cohesion force was determined from the resulting image.

[Preparation of Aqueous Polymer Nanoparticle (A) Dispersion]

An aqueous polymer nanoparticle (A) dispersion for use in Examples described below was synthesized as follows.

<Aqueous Polymer Nanoparticle (A-1) Dispersion>

Polymerization according to a common emulsion polymerization method was performed with 1500 g of ion-exchange water, 45 g of an aqueous 10% dodecylbenzene sulfonic acid solution, 105 g of trimethoxysilane, 23 g of phenyltrimethoxysilane and 27 g of tetraethoxysilane in a reactor having a reflux condenser, a driptank, a thermometer and a stirring apparatus in an environment at 50° C. After the polymerization, the temperature was set to 80° C., thereafter polymerization according to a common emulsion polymerization method was further performed with 43 g of an aqueous 2% ammonium persulfate solution, 11 g of butyl acrylate, 12 g of diethylacrylamide, 1 g of acrylic acid and 1 g of 3-methacryloxypropyltrimethoxysilane, and the resultant was filtered with a 100-mesh wire gauze, thereby providing an aqueous polymer nanoparticle (A-1) dispersion. The resulting polymer nanoparticle (A-1) had a core/shell structure and the solid content thereof was 5.9% by mass.

<Aqueous Polymer Nanoparticle (A-2) Dispersion>

Polymerization according to a common emulsion polymerization method was performed with 1500 g of ion-exchange water, 45 g of an aqueous 10% dodecylbenzene sulfonic acid solution, 98 g of trimethoxysilane, 22 g of phenyltrimethoxysilane and 25 g of tetraethoxysilane in a reactor having a reflux condenser, a driptank, a thermometer and a stirring apparatus in an environment at 50° C. After the polymerization, the temperature was set to 80° C., thereafter polymerization according to a common emulsion polymerization method was further performed with 43 g of an aqueous 2% ammonium persulfate solution, 16 g of butyl acrylate, 16 g of diethylacrylamide, 1 g of acrylic acid and 1 g of 3-methacryloxypropyltrimethoxysilane, and the resultant was filtered with a 100-mesh wire gauze, thereby providing an aqueous polymer nanoparticle (A-2) dispersion. The resulting polymer nanoparticle (A-2) had a core/shell structure and the solid content thereof was 6.1% by mass.

<Aqueous Polymer Nanoparticle (A-3) Dispersion>

Polymerization according to a common emulsion polymerization method was performed with 1500 g of ion-exchange water, 45 g of an aqueous 10% dodecylbenzene sulfonic acid solution, 79 g of trimethoxysilane, 17 g of phenyltrimethoxysilane and 20 g of tetraethoxysilane in a reactor having a reflux condenser, a driptank, a thermometer and a stirring apparatus in an environment at 50° C. After the polymerization, the temperature was set to 80° C., thereafter polymerization according to a common emulsion polymerization method was further performed with 43 g of an aqueous 2% ammonium persulfate solution, 21 g of butyl acrylate, 21 g of diethylacrylamide, 1 g of acrylic acid and 1 g of 3-methacryloxypropyltrimethoxysilane, and the resultant was filtered with a 100-mesh wire gauze, thereby providing an aqueous polymer nanoparticle (A-3) dispersion. The resulting polymer nanoparticle (A-3) had a core/shell structure and the solid content thereof was 6.0% by mass.

<Aqueous Polymer Nanoparticle (A-4) Dispersion>

Polymerization according to a common emulsion polymerization method was performed with 1500 g of ion-exchange water, 18 g of an aqueous 10% dodecylbenzene sulfonic acid solution, 105 g of trimethoxysilane, 23 g of phenyltrimethoxysilane and 27 g of tetraethoxysilane in a reactor having a reflux condenser, a driptank, a thermometer and a stirring apparatus in an environment at 50° C. After the polymerization, the temperature was set to 80° C., thereafter polymerization according to a common emulsion polymerization method was further performed with 43 g of an aqueous 2% ammonium persulfate solution, 11 g of butyl acrylate, 12 g of diethylacrylamide, 1 g of acrylic acid and 1 g of 3-methacryloxypropyltrimethoxysilane, and the resultant was filtered with a 100-mesh wire gauze, thereby providing an aqueous polymer nanoparticle (A-4) dispersion. The resulting polymer nanoparticle (A-4) had a core/shell structure and the solid content thereof was 5.8% by mass.

<Aqueous Polymer Nanoparticle (A-5) Dispersion>

Polymerization according to a common emulsion polymerization method was performed with 1500 g of ion-exchange water, 45 g of an aqueous 10% dodecylbenzene sulfonic acid solution, 105 g of trimethoxysilane, 23 g of phenyltrimethoxysilane, 27 g of tetraethoxysilane, 43 g of an aqueous 2% ammonium persulfate solution, 11 g of butyl acrylate, 12 g of diethylacrylamide, 1 g of acrylic acid and 1.5 g of 3-methacryloxypropyltrimethoxysilane in a reactor having a reflux condenser, a driptank, a thermometer and a stirring apparatus in an environment at 80° C., and the resultant was filtered with a 100-mesh wire gauze, thereby providing an aqueous polymer nanoparticle (A-5) dispersion. The resulting polymer nanoparticle (A-5) had no core/shell structure and the solid content thereof was 5.9% by mass.

<Aqueous Polymer Nanoparticle (A-6) Dispersion>

Polymerization according to a common emulsion polymerization method was performed with 1410 g of ion-exchange water, 22 g of an aqueous 10% dodecylbenzene sulfonic acid solution, 65 g of dimethyldimethoxysilane and 37 g of phenyltrimethoxysilane in a reactor having a reflux condenser, a driptank, a thermometer and a stirring apparatus in an environment at 80° C. After the polymerization, polymerization according to a common emulsion polymerization method was further performed with 33 g of an aqueous 2% ammonium persulfate solution, 50 g of butyl acrylate, 90 g of diethylacrylamide, 120 g of tetraethoxysilane, 50 g of phenyltrimethoxysilane, 3 g of acrylic acid and 1.3 g of 3-methacryloxypropyltrimethoxysilane, and the resultant was filtered with a 100-mesh wire gauze, thereby providing an aqueous polymer nanoparticle (A-6) dispersion. The resulting polymer nanoparticle (A-6) had a core/shell structure and the solid content thereof was 14.0% by mass.

[Preparation of Coating Composition Liquid of Matrix Raw Material Component (B')]

Hereinafter, each component (B') used in Examples and Comparative Examples described below was formulated.

<Coating Composition Liquid of Matrix Raw Material Component (B'-1)>

A coating composition liquid of matrix raw material component (B'-1) was obtained by mixing 66 g of trimethoxysilane "KBM13" (trade name, manufactured by Shin-Etsu Chemical Co., Ltd.) and 63 g of tetraethoxysilane "KBE04" (trade name, manufactured by Shin-Etsu Chemical Co., Ltd.) each serving as the hydrolyzable silicon compound (b), and 500 g of colloidal silica "Snowtex OXS" (trade name, manufactured by Nissan Chemical Corporation, solid content: 10% by mass, average particle size: 5 nm) dispersed in water, serving as the inorganic oxide (D), under a room temperature condition.

<Coating Composition Liquid of Matrix Raw Material Component (B'-2)>

A coating composition liquid of matrix raw material component (B'-2) was obtained by mixing 48 g of tetraethoxysilane "KBE04" (trade name, manufactured by Shin-Etsu Chemical Co., Ltd.) and 81 g of tris-(trimethoxysilylpropyl)isocyanurate "KBM9659" (trade name, manufactured by Shin-Etsu Chemical Co., Ltd.) each serving as the hydrolyzable silicon compound (b), and 333 g of colloidal silica "Snowtex OXS" (trade name, manufactured by Nissan Chemical Corporation, solid content: 10% by mass, average particle size: 5 nm) dispersed in water, serving as the inorganic oxide (D), under a room temperature condition.

<Coating Composition Liquid of Matrix Raw Material Component (B'-3)>

A coating composition liquid of matrix raw material component (B'-3) was obtained by mixing 88 g of trimethoxysilane "KBM13" (trade name, manufactured by Shin-Etsu Chemical Co., Ltd.) and 83 g of tetraethoxysilane "KBE04" (trade name, manufactured by Shin-Etsu Chemical Co., Ltd.) each serving as the hydrolyzable silicon compound (b), and 333 g of colloidal silica "Snowtex OXS" (trade name, manufactured by Nissan Chemical Corporation, solid content: 10% by mass, average particle size: 5 nm) dispersed in water, serving as the inorganic oxide (D), under a room temperature condition.

<Coating Composition Liquid of Matrix Raw Material Component (B'-4)>

A coating composition liquid of matrix raw material component (B'-4) was obtained by mixing 76 g of tetraethoxysilane "KBE04" (trade name, manufactured by Shin-Etsu Chemical Co., Ltd.) and 129 g of tris-(trimethoxysilylpropyl)isocyanurate "KBM9659" (trade name, manufactured by Shin-Etsu Chemical Co., Ltd.) each serving as the hydrolyzable silicon compound (b) under a room temperature condition.

<Coating Composition Liquid of Matrix Raw Material Component (B'-5)>

A coating composition liquid of matrix raw material component (B'-5) was obtained by mixing 68 g of trimethoxysilane "KBM13" (trade name, manufactured by Shin-Etsu Chemical Co., Ltd.), 71 g of tetraethoxysilane "KBE04" (trade name, manufactured by Shin-Etsu Chemical Co., Ltd.) and 20 g of tris-(trimethoxysilylpropyl)isocyanurate "KBM9659" (trade name, manufactured by Shin-Etsu Chemical Co., Ltd.) each serving as the hydrolyzable silicon compound (b), and 333 g of colloidal silica "Snowtex OXS" (trade name, manufactured by Nissan Chemical Corporation, solid content: 10% by mass, average particle size: 5 nm) dispersed in water, serving as the inorganic oxide (D), under a room temperature condition.

<Coating Composition Liquid of Matrix Raw Material Component (B'-6)>

A coating composition liquid of matrix raw material component (B'-6) was obtained by mixing 88 g of trimethoxysilane "KBM13" (trade name, manufactured by Shin-Etsu Chemical Co., Ltd.) and 83 g of tetraethoxysilane "KBE04" (trade name, manufactured by Shin-Etsu Chemical Co., Ltd.) each serving as the hydrolyzable silicon compound (b), and 167 g of colloidal silica "Snowtex 0" (trade name, manufactured by Nissan Chemical Corporation, solid content: 20% by mass, average particle size: 15 nm) dispersed in water, serving as the inorganic oxide (D), under a room temperature condition.

<Coating Composition Liquid of Matrix Raw Material Component (B'-7)>

A coating composition liquid of matrix raw material component (B'-7) was obtained by mixing 186 g of trimethoxysilane "KBM13" (trade name, manufactured by Shin-Etsu Chemical Co., Ltd.) serving as the hydrolyzable silicon compound (b) and 45 g of colloidal silica "Snowtex 0" (trade name, manufactured by Nissan Chemical Corporation, solid content: 20% by mass, average particle size: 15 nm) dispersed in water, serving as the inorganic oxide (D), under a room temperature condition.

<Coating Composition Liquid of Matrix Raw Material Component (B'-8)>

A coating composition liquid of matrix raw material component (B'-8) was obtained by mixing 35 g of trimethoxysilane "KBM13" (trade name, manufactured by Shin-Etsu Chemical Co., Ltd.), 114 g of tetraethoxysilane "KBE04" (trade name, manufactured by Shin-Etsu Chemical Co., Ltd.) and 27 g of triphenylmethoxysilane "KBM103" (trade name, manufactured by Shin-Etsu Chemical Co., Ltd.) each serving as the hydrolyzable silicon compound (b), and 333 g of colloidal silica "Snowtex OXS" (trade name, manufactured by Nissan Chemical Corporation, solid content: 10% by mass, average particle size: 5 nm) dispersed in water, serving as the inorganic oxide (D), under a room temperature condition.

<Coating Composition Liquid of Matrix Raw Material Component (B'-9)>

A coating composition liquid of matrix raw material component (B'-9) was obtained by mixing 88 g of trimethoxysilane "KBM13" (trade name, manufactured by Shin-Etsu Chemical Co., Ltd.) and 42 g of "MS-56" (trade name, manufactured by Mitsubishi Chemical Corporation) each serving as the hydrolyzable silicon compound (b), and 333 g of colloidal silica "Snowtex OXS" (trade name, manufactured by Nissan Chemical Corporation, solid content: 10% by mass, average particle size: 5 nm) dispersed in water, serving as the inorganic oxide (D), under a room temperature condition.

<Coating Composition Liquid of Matrix Raw Material Component (B'-10)>

A coating composition liquid of matrix raw material component (B'-10) was obtained by mixing 81 g of tris-(trimethoxysilylpropyl)isocyanurate "KBM9659" (trade name, manufactured by Shin-Etsu Chemical Co., Ltd.) and 24 g of "MS-56" (trade name, manufactured by Mitsubishi Chemical Corporation) each serving as the hydrolyzable silicon compound (b), and 333 g of colloidal silica "Snowtex OXS" (trade name, manufactured by Nissan Chemical Corporation, solid content: 10% by mass, average particle size: 5 nm) dispersed in water, serving as the inorganic oxide (D), under a room temperature condition.

<Coating Composition Liquid of Matrix Raw Material Component (B'-11)>

A coating composition liquid of matrix raw material component (B'-11) was obtained by mixing 35 g of trimethoxysilane "KBM13" (trade name, manufactured by Shin-Etsu Chemical Co., Ltd.), 27 g of triphenylmethoxysilane "KBM103" (trade name, manufactured by Shin-Etsu Chemical Co., Ltd.) and 57 g of "MS-56" (trade name, manufactured by Mitsubishi Chemical Corporation) each serving as the hydrolyzable silicon compound (b), and 333 g of colloidal silica "Snowtex OXS" (trade name, manufactured by Nissan Chemical Corporation, solid content: 10% by mass, average particle size: 5 nm) dispersed in water, serving as the inorganic oxide (D), under a room temperature condition.

<Coating Composition Liquid of Matrix Raw Material Component (B'-12)>

A coating composition liquid of matrix raw material component (B'-12) was obtained by mixing 61 g of 1,2-bis(triethoxysilyl)ethane (manufactured by Sigma-Aldrich) and 88 g of trimethoxysilane "KBM13" (trade name, manufactured by Shin-Etsu Chemical Co., Ltd.) each serving as the hydrolyzable silicon compound (b), and 333 g of colloidal silica "Snowtex OXS" (trade name, manufactured by Nissan Chemical Corporation, solid content: 10% by mass, average particle size: 5 nm) dispersed in water, serving as the inorganic oxide (D), under a room temperature condition.

<Coating Composition Liquid of Matrix Raw Material Component (B'-13)>

A coating composition liquid of matrix raw material component (B'-13) was obtained by mixing 35 g of 1,2-bis (triethoxysilyl)ethane (manufactured by Sigma-Aldrich) and 81 g of tris-(trimethoxysilylpropyl)isocyanurate "KBM9659" (trade name, manufactured by Shin-Etsu Chemical Co., Ltd.) each serving as the hydrolyzable silicon compound (b), and 333 g of colloidal silica "Snowtex OXS" (trade name, manufactured by Nissan Chemical Corporation, solid content: 10% by mass, average particle size: 5 nm) dispersed in water, serving as the inorganic oxide (D), under a room temperature condition.

<Coating Composition Liquid of Matrix Raw Material Component (B'-14)>

A coating composition liquid of matrix raw material component (B'-14) was obtained by mixing 84 g of 1,2-bis (triethoxysilyl)ethane (manufactured by Sigma-Aldrich), 35 g of trimethoxysilane "KBM13" (trade name, manufactured by Shin-Etsu Chemical Co., Ltd.) and 27 g of triphenylmethoxysilane "KBM103" (trade name, manufactured by Shin-Etsu Chemical Co., Ltd.) each serving as the hydrolyzable silicon compound (b), and 333 g of colloidal silica "Snowtex OXS" (trade name, manufactured by Nissan Chemical Corporation, solid content: 10% by mass, average particle size: 5 nm) dispersed in water, serving as the inorganic oxide (D), under a room temperature condition.

<Coating Composition Liquid of Matrix Raw Material Component (B'-15)>

A coating composition liquid of matrix raw material component (B'-15) was obtained by using 56 g of dimethoxydimethylsilane "KBM22" (trade name, manufactured by Shin-Etsu Chemical Co., Ltd.) and 232 g of tetraethoxysilane "KBE04" (trade name, manufactured by Shin-Etsu Chemical Co., Ltd.) each serving as the hydrolyzable silicon compound (b).

[Production of Adhesion Layer-Applied Polycarbonate Substrate]

<Adhesion Layer-Applied Polycarbonate Substrate 1>

Adhesion layer 1 was formed on one surface of a polycarbonate substrate (manufactured by C.I. TAKIRON Corporation, item number: 1600, thickness: 2 mm), as follows. In other words, the polycarbonate substrate was coated with a mixed liquid of 19 g of an aqueous E2050S dispersion liquid (manufactured by Asahi Kasei Corporation, solid content concentration: 46%) serving as the adhesive emulsion particle (F), 17 g of colloidal silica "Snowtex C" (trade name, manufactured by Nissan Chemical Corporation, solid content: 20% by mass, average particle size: 15 nm) dispersed in water, serving as the inorganic oxide (G), 29 g of water and 35 g of ethanol, by use of a bar coater. Next, such a coating liquid was dried at 130° C. for 2 hours, thereby forming adhesion layer 1 having a film thickness of 1.0 μm, on the polycarbonate substrate. Thus, adhesion layer-applied polycarbonate substrate 1 was obtained.

<Adhesion Layer-Applied Polycarbonate Substrate 2>

Adhesion layer 2 was formed on one surface of a polycarbonate substrate (manufactured by C.I. TAKIRON Corporation, item number: 1600, thickness: 2 mm), as follows. In other words, the polycarbonate substrate was coated with a mixed liquid of 53 g of an aqueous E2050S dispersion liquid (manufactured by Asahi Kasei Corporation, solid content concentration: 46%) serving as the adhesive emulsion particle (F), 77 g of water and 70 g of ethanol, by use of a bar coater. Next, such a coating liquid was dried at 130° C. for 2 hours, thereby forming adhesion layer 2 having a film thickness of 1.0 μm, on the polycarbonate substrate. Thus, adhesion layer-applied polycarbonate substrate 2 was obtained.

<Adhesion Layer-Applied Polycarbonate Substrate 3>

Adhesion layer 3 was formed on one surface of a polycarbonate substrate (manufactured by C.I. TAKIRON Corporation, item number: 1600, thickness: 2 mm), as follows. In other words, the polycarbonate substrate was spray coated with AD-1 (trade name "Super-Excel primer" manufactured by Higashi Nippon Toryo Co., Ltd.). Next, the resultant was dried in an atmosphere of 25° C. and 50 RH % for 24 hours, thereby forming adhesion layer 3 having a film thickness of 0.5 μm, on the polycarbonate substrate. Thus, adhesion layer-applied polycarbonate substrate 3 was obtained.

Example 1

The aqueous polymer nanoparticle (A-1) dispersion adjusted above and matrix raw material component (B'-1) adjusted above were mixed so that the mass ratio of the respective solid contents of the polymer nanoparticle (A) and the matrix component (B) satisfied (A-1):(B-1)=100:200, thereby providing a mixture. An aqueous solution having an ethanol concentration of 20% by mass was used as a solvent, and the mixture was added thereto so that the solid content concentration was 8% by mass, thereby providing a coating material composition (I). Next, adhesion layer-applied polycarbonate substrate 1 was coated with the coating material composition (I) by use of a bar coater, and the resultant was dried at 130° C. for 2 hours, thereby providing a hard coating film-applied substrate having a hard coating film having a film thickness of 5.0 μm.

The Martens hardness HM, elastic recovery rate $\eta_{IT}$, abrasion resistance, total light transmittance, initial adhesiveness, moisture resistance and contamination resistance of the hard coating film were evaluated.

The matrix component in the coating film derived from matrix raw material component (B'-1) in the coating material composition is here referred to as component (B-1), and the matrix component in the coating film derived from matrix raw material component (B'-2) in the coating material composition is hereinafter similarly referred to as component (B-2). That is, matrix components (B-1) to (B-16) can be regarded as hydrolyzed condensates of matrix raw material components (B'-1) to (B'-16), respectively.

The Martens hardness $HM_A$ and elastic recovery rate $\eta_{ITA}$ of polymer nanoparticle (A-1), the Martens hardness $HM_{B'}$ and elastic recovery rate $\eta_{ITB'}$ of matrix raw material component (B'-1), and the Martens hardness $HM_B$ and elastic recovery rate $\eta_{ITB}$ of matrix component (B-1), used in Examples described above, were measured according to the above measurement methods.

Example 2

A hard coating film-applied substrate was obtained in the same manner as in Example 1 except that (B'-2) was used as the matrix raw material component (B') and the mass ratio of the respective solid contents of the polymer nanoparticle (A) and the matrix component (B) satisfied (A-1):(B-2)=100:300. The evaluation results of respective physical properties were obtained according to the same evaluation methods as in Example 1.

Example 3

A hard coating film-applied substrate was obtained in the same manner as in Example 2 except that the film thickness of the hard coating film was 10.0 μm. The evaluation results of respective physical properties were obtained according to the same evaluation methods as in Example 1.

Example 4

A hard coating film-applied substrate was obtained in the same manner as in Example 2 except that the film thickness of the hard coating film was 2.5 µm. The evaluation results of respective physical properties were obtained according to the same evaluation methods as in Example 1.

Example 5

A hard coating film-applied substrate was obtained in the same manner as in Example 2 except that (B'-3) was used as the matrix raw material component (B'). The evaluation results of respective physical properties were obtained according to the same evaluation methods as in Example 1.

Example 6

A hard coating film-applied substrate was obtained in the same manner as in Example 5 except that polymer nanoparticle (A-2) was used as the polymer nanoparticle (A). The evaluation results of respective physical properties were obtained according to the same evaluation methods as in Example 1.

Example 7

A hard coating film-applied substrate was obtained in the same manner as in Example 5 except that polymer nanoparticle (A-3) was used as the polymer nanoparticle (A). The evaluation results of respective physical properties were obtained according to the same evaluation methods as in Example 1.

Example 8

A hard coating film-applied substrate was obtained in the same manner as in Example 5 except that polymer nanoparticle (A-4) was used as the polymer nanoparticle (A). The evaluation results of respective physical properties were obtained according to the same evaluation methods as in Example 1.

Example 9

A hard coating film-applied substrate was obtained in the same manner as in Example 2 except that the mass ratio of the respective solid contents of the polymer nanoparticle (A) and the matrix component (B) satisfied (A-1):(B-2)=50:300. The evaluation results of respective physical properties were obtained according to the same evaluation methods as in Example 1.

Example 10

A hard coating film-applied substrate was obtained in the same manner as in Example 2 except that the mass ratio of the respective solid contents of the polymer nanoparticle (A) and the matrix component (B) satisfied (A-1):(B-2)=30:300. The evaluation results of respective physical properties were obtained according to the same evaluation methods as in Example 1.

Example 11

A hard coating film-applied substrate was obtained in the same manner as in Example 2 except that the mass ratio of the respective solid contents of the polymer nanoparticle (A) and the matrix component (B) satisfied (A-1):(B-2)=10:300 and the film thickness of the hard coating film was 3.0 µm. The evaluation results of respective physical properties were obtained according to the same evaluation methods as in Example 1.

Example 12

A hard coating film-applied substrate was obtained in the same manner as in Example 2 except that the mass ratio of the respective solid contents of the polymer nanoparticle (A) and the matrix component (B) satisfied (A-1):(B-2)=250:300. The evaluation results of respective physical properties were obtained according to the same evaluation methods as in Example 1.

Example 13

A hard coating film-applied substrate was obtained in the same manner as in Example 2 except that (B'-4) was used as the matrix raw material component (B') and the mass ratio of the respective solid contents of the polymer nanoparticle (A) and the matrix component (B) satisfied (A-1):(B-4)=100:200. The evaluation results of respective physical properties were obtained according to the same evaluation methods as in Example 1.

Example 14

A hard coating film-applied substrate was obtained in the same manner as in Example 2 except that (B'-5) was used as the matrix raw material component (B'). The evaluation results of respective physical properties were obtained according to the same evaluation methods as in Example 1.

Example 15

A hard coating film-applied substrate was obtained in the same manner as in Example 5 except that polymer nanoparticle (A-5) was used as the polymer nanoparticle (A). The evaluation results of respective physical properties were obtained according to the same evaluation methods as in Example 1.

Example 16

A hard coating film-applied substrate was obtained in the same manner as in Example 2 except that (B'-6) was used as the matrix raw material component (B'). The evaluation results of respective physical properties were obtained according to the same evaluation methods as in Example 1.

Example 17

A hard coating film-applied substrate was obtained in the same manner as in Example 2 except that adhesion layer-applied polycarbonate substrate 2 was used instead of adhesion layer-applied polycarbonate substrate 1 as the adhesion layer-applied polycarbonate substrate. The evaluation results of respective physical properties were obtained according to the same evaluation methods as in Example 1.

Example 18

A hard coating film-applied substrate was obtained in the same manner as in Example 2 except that the mass ratio of the respective solid contents of the polymer nanoparticle (A) and the matrix component (B) satisfied (A-1):(B-2)=100: 450. The evaluation results of respective physical properties were obtained according to the same evaluation methods as in Example 1.

Example 19

A hard coating film-applied substrate was obtained in the same manner as in Example 1 except that (A-1) was used as the polymer nanoparticle (A), (B'-8) was used as the matrix raw material component (B') and the mass ratio of the respective solid contents of the polymer nanoparticle (A) and the matrix component (B) satisfied (A-1):(B-8)=100: 200. The evaluation results of respective physical properties were obtained according to the same evaluation methods as in Example 1.

Example 20

A hard coating film-applied substrate was obtained in the same manner as in Example 1 except that (A-1) was used as the polymer nanoparticle (A), (B'-9) was used as the matrix raw material component (B') and the mass ratio of the respective solid contents of the polymer nanoparticle (A) and the matrix component (B) satisfied (A-1):(B-9)=50:300. The evaluation results of respective physical properties were obtained according to the same evaluation methods as in Example 1.

Example 21

A hard coating film-applied substrate was obtained in the same manner as in Example 1 except that (A-1) was used as the polymer nanoparticle (A), (B'-10) was used as the matrix raw material component (B') and the mass ratio of the respective solid contents of the polymer nanoparticle (A) and the matrix component (B) satisfied (A-1):(B-10)=50: 300. The evaluation results of respective physical properties were obtained according to the same evaluation methods as in Example 1.

Example 22

A hard coating film-applied substrate was obtained in the same manner as in Example 1 except that (A-1) was used as the polymer nanoparticle (A), (B'-11) was used as the matrix raw material component (B') and the mass ratio of the respective solid contents of the polymer nanoparticle (A) and the matrix component (B) satisfied (A-1):(B-11)=100: 200. The evaluation results of respective physical properties were obtained according to the same evaluation methods as in Example 1.

Example 23

A hard coating film-applied substrate was obtained in the same manner as in Example 1 except that (A-1) was used as the polymer nanoparticle (A), (B'-12) was used as the matrix raw material component (B') and the mass ratio of the respective solid contents of the polymer nanoparticle (A) and the matrix component (B) satisfied (A-1):(B-12)=50: 300. The evaluation results of respective physical properties were obtained according to the same evaluation methods as in Example 1.

Example 24

A hard coating film-applied substrate was obtained in the same manner as in Example 1 except that (A-1) was used as the polymer nanoparticle (A), (B'-13) was used as the matrix raw material component (B') and the mass ratio of the respective solid contents of the polymer nanoparticle (A) and the matrix component (B) satisfied (A-1):(B-13)=50: 300. The evaluation results of respective physical properties were obtained according to the same evaluation methods as in Example 1.

Example 25

A hard coating film-applied substrate was obtained in the same manner as in Example 1 except that (A-1) was used as the polymer nanoparticle (A), (B'-14) was used as the matrix raw material component (B') and the mass ratio of the respective solid contents of the polymer nanoparticle (A) and the matrix component (B) satisfied (A-1):(B-14)=100: 200. The evaluation results of respective physical properties were obtained according to the same evaluation methods as in Example 1.

Comparative Example 1

The coating composition liquid of (B'-1) as the matrix raw material component (B'), adjusted above, was mixed so as to be in the form of an aqueous solution having a solid content concentration of 8% and containing ethanol at a concentration of 20% by mass and acetic acid at a concentration of 3% by mass in a solvent. After adhesion layer-applied polycarbonate substrate 3 was coated with the resulting coating composition by use of a bar coater, the resultant was dried at 130° C. for 2 hours, thereby providing a coating film-applied substrate having a coating film having a thickness of 1.0 μm, configured from matrix component (B-1). The evaluation results of respective physical properties were obtained according to the same evaluation methods as in Example 1.

Comparative Example 2

A coating film-applied substrate was produced in the same manner as in Comparative Example 1 except that the film thickness of the coating film was 5.0 μm, and as a result, cracking was caused in the coating film.

Comparative Example 3

A coating film-applied substrate was produced in the same manner as in Comparative Example 1 except that (B'-2) was used as the matrix raw material component (B') and the film thickness of the coating film was 3.0 μm, and as a result, cracking was caused in the coating film.

Comparative Example 4

A coating film-applied substrate was produced in the same manner as in Comparative Example 1 except that (B'-7) was used as the matrix raw material component (B') and the film thickness of the coating film was 5.0 μm. The evaluation results of respective physical properties were obtained according to the same evaluation methods as in Example 1.

Comparative Example 5

E2050S and matrix raw material component (B'-15) adjusted above were mixed so as to provide an aqueous solution having a solid content concentration of 10% and containing ethanol at a concentration of 20% by mass and acetic acid at a concentration of 3% by mass in a solvent so that the mass ratio of the respective solid contents of E2050S (trade name, manufactured by Asahi Kasei Corporation) as the polymer nanoparticle (A) and (B-15) as the matrix component (B) satisfied E2050S:(B-15)=100:100. After adhesion layer-applied polycarbonate substrate 3 was coated with the resulting coating material composition by use of a bar coater, the resultant was dried at 130° C. for 30 minutes, thereby providing a coating film-applied substrate having a coating film having a film thickness of 5.0 μm. The evaluation results of respective physical properties were obtained according to the same evaluation methods as in Example 1.

Comparative Example 6

The aqueous polymer nanoparticle (A-6) dispersion adjusted above and matrix raw material component (B'-15) adjusted above were mixed so as to provide an aqueous solution having a solid content concentration of 8% and containing ethanol at a concentration of 20% by mass in a solvent so that the mass ratio of the respective solid contents of the polymer nanoparticle (A) and the matrix component (B) satisfied (A-6):(B-15)=100:100, adhesion layer-applied polycarbonate substrate 3 was coated with the resulting coating material composition by use of a bar coater, and thereafter the resultant was dried at 130° C. for 30 minutes, thereby providing a coating film-applied substrate having a coating film having a film thickness of 5.0 μm. The evaluation results of respective physical properties were obtained according to the same evaluation methods as in Example 1.

Comparative Example 7

The aqueous polymer nanoparticle (A-6) dispersion adjusted above and matrix raw material component (B'-15) adjusted above were mixed so as to provide an aqueous solution having a solid content concentration of 8% and containing ethanol at a concentration of 20% by mass in a solvent so that the mass ratio of the respective solid contents of the polymer nanoparticle (A) and the matrix component (B) satisfied (A-6):(B-15)=100:100, a polycarbonate substrate (manufactured by C.I. TAKIRON Corporation, item number: 1600, thickness: 2 mm) was coated with the resulting coating material composition by use of a bar coater, and thereafter the resultant was dried at 130° C. for 30 minutes, thereby providing a coating film-applied substrate having a coating film having a film thickness of 5.0 μm. The evaluation results of respective physical properties were obtained according to the same evaluation methods as in Example 1.

[Evaluation Results of Cohesion Force]

Each of the hard coating films obtained in Examples 1 to 25 was subjected to measurement of the cohesion force according to the measurement method of (17), and as a result, was higher in the cohesion force $F_A$ of the polymer nanoparticle (A) than the cohesion force $F_B$ of the matrix component (B). Each of the coating films obtained in Comparative Examples 5 to 7 was subjected to measurement of the cohesion force according to the measurement method of (17), and as a result, was lower in the cohesion force $F_A$ of the polymer nanoparticle (A) than the cohesion force $F_B$ of the matrix component (B).

The evaluation results of respective physical properties in Examples 1 to 25 and Comparative Examples 1 to 7 are shown in Tables 1 to 4.

TABLE 1

| | | Example 1 | Example 2 | Example 3 | Example 4 | Example 5 | Example 6 | Example 7 | Example 8 | Example 9 | Example 10 | Example 11 | Example 12 | Example 13 | Example 14 | Example 15 | Example 16 | Example 17 |
|---|---|---|---|---|---|---|---|---|---|---|---|---|---|---|---|---|---|---|
| Polymer nanoparticle (A) | Type of (A) | A-1 | A-1 | A-1 | A-1 | A-1 | A-2 | A-3 | A-4 | A-1 | A-1 | A-1 | A-1 | A-1 | A-1 | A-5 | A-1 | A-1 |
| | Average particle size (nm) | 60 | 60 | 60 | 60 | 60 | 60 | 60 | 120 | 60 | 60 | 60 | 60 | 60 | 60 | 60 | 60 | 60 |
| | Content of (a) | 76% | 76% | 76% | 76% | 76% | 66% | 57% | 76% | 76% | 76% | 76% | 76% | 76% | 76% | 76% | 76% | 76% |
| Matrix component (B) | Type of (B) | B-1 | B-2 | B-2 | B-2 | B-3 | B-3 | B-3 | B-3 | B-2 | B-2 | B-2 | B-2 | B-4 | B-5 | B-3 | B-6 | B-2 |
| | Type of inorganic oxide (D) | OXS | OXS | OXS | OXS | OXS | OXS | OXS | OXS | OXS | OXS | OXS | OXS | None | OXS | OXS | O | OXS |
| Adhesion layer | Adhesion layer-applied polycarbonate substrate | Adhesion layer 1 | Adhesion layer 1 | Adhesion layer 1 | Adhesion layer 1 | Adhesion layer 1 | Adhesion layer 1 | Adhesion layer 1 | Adhesion layer 1 | Adhesion layer 1 | Adhesion layer 1 | Adhesion layer 1 | Adhesion layer 1 | Adhesion layer 1 | Adhesion layer 1 | Adhesion layer 1 | Adhesion layer 1 | Adhesion layer 2 |
| | Adhesive emulsion particle (F) | E2050S | E2050S | E2050S | E2050S | E2050S | E2050S | E2050S | E2050S | E2050S | E2050S | E2050S | E2050S | E2050S | E2050S | E2050S | E2050S | E2050S |
| | Average particle size (nm) of adhesive emulsion particle (F) | 120 nm | 120 nm | 120 nm | 120 nm | 120 nm | 120 nm | 120 nm | 120 nm | 120 nm | 120 nm | 120 nm | 120 nm | 120 nm | 120 nm | 120 nm | 120 nm | 120 nm |
| | Type of inorganic oxide (G) | C | C | C | C | C | C | C | C | C | C | C | C | C | C | C | C | None |
| Film thickness of coating film (C) | Film thickness (μm) | 5.0 | 5.0 | 10.0 | 2.5 | 5.0 | 5.0 | 5.0 | 5.0 | 5.0 | 5.0 | 3.0 | 5.0 | 5.0 | 5.0 | 5.0 | 5.0 | 5.0 |
| Volume fraction of (A) in coating film (C) | Volume fraction of (A) | 40% | 29% | 29% | 29% | 29% | 29% | 29% | 29% | 17% | 11% | 4% | 50% | 40% | 29% | 29% | 29% | 29% |
| Martens hardness of coating film (C) | HM (N/mm²) | 350 | 300 | 300 | 300 | 330 | 330 | 320 | 330 | 400 | 380 | 400 | 240 | 260 | 330 | 330 | 330 | 330 |
| Elastic recovery rate of coating film (C) | $\eta_{IT}$ | 0.69 | 0.71 | 0.71 | 0.71 | 0.70 | 0.65 | 0.61 | 0.70 | 0.71 | 0.71 | 0.71 | 0.69 | 0.68 | 0.70 | 0.70 | 0.71 | 0.70 |
| Abrasion resistance of coating film | Haze before Taber abrasion test | 0.5 | 0.5 | 0.5 | 0.5 | 0.5 | 0.5 | 0.5 | 1.0 | 0.2 | 0.2 | 0.2 | 0.8 | 0.2 | 0.5 | 0.5 | 0.5 | 0.5 |
| | ΔHaze after Taber abrasion test 1000 times | 1 | 1 | 1 | 2 | 1 | 1 | 2 | 1 | 1 | 1 | 1 | 2 | 3 | 1 | 2 | 1 | 1 |
| Evaluation of transparency | Total light transmittance (%) of hard coating film-applied polycarbonate substrate | 91.1 | 91.1 | 91.0 | 91.2 | 91.1 | 91.0 | 91.1 | 91.2 | 91.2 | 91.1 | 91.2 | 91.0 | 91.1 | 91.1 | 91.1 | 91.2 | 91.2 |
| | Total light transmittance retention rate (%) of hard coating film substrate/polycarbonate substrate | 101.1 | 101.1 | 101.0 | 101.2 | 101.1 | 101.0 | 101.1 | 101.2 | 101.2 | 101.1 | 101.2 | 101.0 | 101.1 | 101.1 | 101.1 | 101.2 | 101.2 |
| Initial adhesiveness | Adhesiveness of tape | Good | Good | Good | Good | Good | Good | Good | Good | Good | Good | Good | Good | Good | Good | Good | Good | Good |
| Evaluation of moisture resistance | After constant temperature and humidity test at 50° C. for 2 weeks<br>A: Retention of adhesiveness<br>B: Decrease in adhesiveness at level not causing any problems in practical use<br>C: No adhesiveness | A | A | A | A | A | A | A | A | A | A | A | A | A | A | A | A | B |
| Evaluation of contamination resistance | ΔA | 0.4 | 0.4 | 0.4 | 0.4 | 0.4 | 0.4 | 1.0 | 0.6 | 0.4 | 0.4 | 0.4 | 0.5 | 2.0 | 0.4 | 1.0 | 0.4 | 0.4 |
| | Total light transmittance retention rate (%) after black carbon test | 100% | 100% | 100% | 100% | 100% | 100% | 99% | 100% | 100% | 100% | 100% | 100% | 99% | 100% | 99% | 100% | 99% |

TABLE 2

| | | Example 18 | Example 19 | Example 20 | Example 21 | Example 22 | Example 23 | Example 24 | Example 25 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|---|---|---|---|
| Polymer nanoparticle (A) | Type of (A) | A-1 | A-1 | A-1 | A-1 | A-1 | A-1 | A-1 | A-1 | None | None | None | None | E2050S | A-6 | A-6 |
| | Average particle size (nm) | 60 | 60 | 60 | 60 | 60 | 60 | 60 | 60 | — | — | — | — | 110 | 60 | 60 |
| | Content of (a) | 76% | 76% | 76% | 76% | 76% | 76% | 76% | 76% | — | — | — | — | 0% | 48% | 48% |
| Matrix component (B) | Type of (B) | B-2 | B-8 | B-9 | B-10 | B-11 | B-12 | B-13 | B-14 | B-1 | B-1 | B-2 | B-7 | B-15 | B-15 | B-15 |
| | Type of inorganic oxide (D) | OXS | OXS | OXS | OXS | OXS | OXS | OXS | OXS | OXS | OXS | OXS | O | None | None | None |
| Adhesion layer of adhesion layer-applied polycarbonate substrate | | Adhesion layer 1 | Adhesion layer 1 | Adhesion layer 1 | Adhesion layer 1 | Adhesion layer 1 | Adhesion layer 1 | Adhesion layer 1 | Adhesion layer 1 | Adhesion layer 3 | Adhesion layer 3 | Adhesion layer 3 | Adhesion layer 3 | Adhesion layer 3 | Adhesion layer 3 | No Adhesion layer |
| Adhesion layer | Adhesive emulsion particle (F) | E2050S | E2050S | E2050S | E2050S | E2050S | E2050S | E2050S | E2050S | — | — | — | — | — | — | — |
| | Average particle size (nm) of adhesive emulsion particle (F) | 120 nm | 120 nm | 120 nm | 120 nm | 120 nm | 120 nm | 120 nm | 120 nm | — | — | — | — | — | — | — |
| | Type of inorganic oxide (G) | C | C | C | C | C | C | C | C | None | None | None | None | None | None | None |
| Film thickness of coating film (C) | Film thickness (μm) | 5.0 | 5.0 | 5.0 | 5.0 | 5.0 | 5.0 | 5.0 | 5.0 | 1.0 | 5.0 | 3.0 | 5.0 | 5.0 | 5.0 | 5.0 |
| Volume fraction of (A) in coating film (C) | Volume fraction of (A) | 21% | 40% | 17% | 17% | 40% | 17% | 17% | 40% | 0% | 0% | 0% | 0% | 50% | 50% | 50% |
| Martens hardness of coating film (C) | HM(N/mm²) | 350 | 320 | 430 | 400 | 320 | 410 | 380 | 310 | 400 | Failure of film formation | Failure of film formation | 130 | 80 | 110 | 110 |
| Elastic recovery rate of coating film (C) | $\eta_{IT}$ | 0.72 | 0.67 | 0.70 | 0.71 | 0.67 | 0.70 | 0.70 | 0.68 | 0.69 | | | 0.65 | 0.42 | 0.45 | 0.45 |
| Abrasion resistance | Haze before Taber abrasion test | 0.5 | 0.3 | 0.4 | 0.5 | 0.3 | 0.4 | 0.5 | 0.4 | 0.2 | | | 0.2 | 1.0 | 0.4 | 0.3 |
| | ΔHaze after Taber abrasion test 1000 times | 0.5 | 1 | 1 | 1 | 1 | 1 | 1 | 1 | 39 | | | 15 | 40 | 35 | 40 |
| Evaluation of transparency | Total light transmittance (%) of hard coating film-applied substrate/polycarbonate substrate | 91.1 | 91.2 | 91.1 | 91.1 | 91.1 | 91.2 | 91.2 | 91.2 | 91.1 | 78.3 | 76.2 | 91.2 | 91.1 | 91.1 | 91.2 |
| | Total light transmittance retention rate (%) of hard coating film | 101.1 | 101.1 | 101.1 | 101.1 | 101.1 | 101.2 | 101.2 | 101.2 | 101.1 | 88.3 | 86.2 | 101.2 | 101.1 | 101.1 | 101.2 |
| Initial adhesiveness | Adhesiveness of tape | Good | Good | Good | Good | Good | Good | Good | Good | Good | Good | Good | Good | Good | Good | Poor |
| Evaluation of moisture resistance | After constant temperature and humidity test at 50° C. for 2 weeks A: Retention of adhesiveness B: Decrease in adhesiveness at level not causing any problems in practical use C: No adhesiveness | A | A | A | A | A | A | A | A | C | — | — | C | C | C | C |
| Evaluation of contamination resistance | ΔA | 0.4 | 0.5 | 0.4 | 0.4 | 0.5 | 0.4 | 0.4 | 0.5 | 22 | — | — | 13 | 20 | 15 | 18 |
| | Total light transmittance retention rate (%) after black carbon test | 100% | 100% | 100% | 99% | 100% | 100% | 100% | 99% | 35% | — | — | 78% | 40% | 36% | 38% |

TABLE 3

|  |  | Example 1 | Example 2 | Example 3 | Example 4 | Example 5 | Example 6 | Example 7 | Example 8 | Example 9 |
|---|---|---|---|---|---|---|---|---|---|---|
| Polymer nanoparticle (A) | Type | A-1 | A-1 | A-1 | A-1 | A-1 | A-2 | A-3 | A-4 | A-1 |
|  | $\eta_{ITA}$ | 0.70 | 0.70 | 0.70 | 0.70 | 0.70 | 0.60 | 0.49 | 0.70 | 0.70 |
|  | $HM_A$ (N/mm$^2$) | 150 | 150 | 150 | 150 | 150 | 150 | 140 | 150 | 150 |
| Matrix raw material component (B') | Type | B'-1 | B'-2 | B'-2 | B'-2 | B'-2 | B'-3 | B'-3 | B'-3 | B'-2 |
|  | $\eta_{ITB'}$ | 0.69 | 0.72 | 0.72 | 0.72 | 0.72 | 0.72 | 0.72 | 0.72 | 0.72 |
|  | $HM_{B'}$ (N/mm$^2$) | 900 | 450 | 450 | 450 | 500 | 500 | 500 | 500 | 450 |
| Matrix component (B) | Type | B-1 | B-2 | B-2 | B-2 | B-2 | B-3 | B-3 | B-3 | B-2 |
|  | $\eta_{ITB}$ | 0.69 | 0.72 | 0.72 | 0.72 | 0.72 | 0.72 | 0.72 | 0.72 | 0.72 |
|  | $HM_B$ (N/mm$^2$) | 900 | 450 | 450 | 450 | 500 | 500 | 500 | 500 | 450 |

|  |  | Example 10 | Example 11 | Example 12 | Example 13 | Example 14 | Example 15 | Example 16 | Example 17 |
|---|---|---|---|---|---|---|---|---|---|
| Polymer nanoparticle (A) | Type | A-1 | A-1 | A-1 | A-1 | A-1 | A-5 | A-1 | A-1 |
|  | $\eta_{ITA}$ | 0.70 | 0.70 | 0.70 | 0.70 | 0.70 | 0.69 | 0.70 | 0.70 |
|  | $HM_A$ (N/mm$^2$) | 150 | 150 | 150 | 150 | 150 | 150 | 150 | 150 |
| Matrix raw material component (B') | Type | B'-2 | B'-2 | B'-2 | B'-4 | B'-5 | B'-3 | B'-6 | B'-2 |
|  | $\eta_{ITB'}$ | 0.72 | 0.72 | 0.72 | 0.71 | 0.70 | 0.72 | 0.71 | 0.72 |
|  | $HM_{B'}$ (N/mm$^2$) | 450 | 450 | 450 | 380 | 500 | 500 | 500 | 450 |
| Matrix component (B) | Type | B-2 | B-2 | B-2 | B-4 | B-5 | B-3 | B-6 | B-2 |
|  | $\eta_{ITB}$ | 0.72 | 0.72 | 0.72 | 0.71 | 0.70 | 0.72 | 0.71 | 0.72 |
|  | $HM_B$ (N/mm$^2$) | 450 | 450 | 450 | 380 | 500 | 500 | 500 | 450 |

TABLE 4

|  |  | Example 18 | Example 19 | Example 20 | Example 21 | Example 22 | Example 23 | Example 24 | Example 25 | Comparative Example 1 |
|---|---|---|---|---|---|---|---|---|---|---|
| Polymer nanoparticle (A) | Type | A-1 | A-1 | A-1 | A-1 | A-1 | A-1 | A-1 | A-1 | None |
|  | $\eta_{ITA}$ | 0.70 | 0.70 | 0.70 | 0.70 | 0.70 | 0.70 | 0.70 | 0.70 | — |
|  | $HM_A$ (N/mm$^2$) | 150 | 150 | 150 | 150 | 150 | 150 | 150 | 150 | — |
| Matrix raw material component (B') | Type | B'-2 | B'-8 | B'-9 | B'-10 | B'-11 | B'-12 | B'-13 | B'-14 | B'-1 |
|  | $\eta_{ITB'}$ | 0.72 | 0.67 | 0.72 | 0.72 | 0.67 | 0.71 | 0.71 | 0.68 | 0.69 |
|  | $HM_{B'}$ (N/mm$^2$) | 450 | 600 | 500 | 450 | 600 | 420 | 420 | 470 | 900 |
| Matrix component (B) | Type | B-2 | B-8 | B-9 | B-10 | B-11 | B-12 | B-13 | B-14 | B-1 |
|  | $\eta_{ITB}$ | 0.72 | 0.67 | 0.72 | 0.72 | 0.67 | 0.71 | 0.71 | 0.68 | 0.69 |
|  | $HM_B$ (N/mm$^2$) | 450 | 600 | 500 | 450 | 600 | 420 | 420 | 470 | 900 |

|  |  | Comparative Example 2 | Comparative Example 3 | Comparative Example 4 | Comparative Example 5 | Comparative Example 6 | Comparative Example 7 |
|---|---|---|---|---|---|---|---|
| Polymer nanoparticle (A) | Type | None | None | None | E2050S | A-6 | A-6 |
|  | $\eta_{ITA}$ | — | — | — | 0.12 | 0.27 | 0.27 |
|  | $HM_A$ (N/mm$^2$) | — | — | — | 100 | 150 | 150 |
| Matrix raw material component (B') | Type | B'-1 | B'-2 | B'-7 | B'-15 | B'-15 | B'-15 |
|  | $\eta_{ITB'}$ | 0.69 | 0.72 | 0.65 | 0.50 | 0.50 | 0.50 |
|  | $HM_{B'}$ (N/mm$^2$) | 900 | 450 | 130 | 50 | 50 | 50 |

TABLE 4-continued

| Matrix component (B) | Type | B-1 | B-2 | B-7 | B'-15 | B'-15 | B'-15 |
|---|---|---|---|---|---|---|---|
| | $\eta_{ITB}$ | 0.69 | 0.72 | 0.65 | 0.50 | 0.50 | 0.50 |
| | $HM_B$ (N/mm$^2$) | 900 | 450 | 130 | 50 | 50 | 50 |

[Evaluation Results]

It was found from Tables 1 to 4 that each of the hard coating films of Examples 1 to 25, containing the polymer nanoparticle (A) in the matrix component (B) and satisfying relationships of $HM_B/HM_A>1$, $HM_B/HM_A>1$ and $F_A/F_B>1$, was excellent in abrasion resistance as compared with each of the coating films of Comparative Examples 1 to 4, containing no polymer nanoparticle (A), and each of the coating films of Comparative Examples 5 to 7, not satisfying any relationships of $HM_B/HM_A>1$, $HM_B/HM_A>1$ and $F_A/F_B>1$.

It was also found that each of the hard coating films of Examples 1 to 25, having a ΔA of 10 or less, was excellent in contamination resistance as compared with each of the coating films of Comparative Examples 1 and 4 to 7, having a ΔA of more than 10.

Each of the hard coating films and each of the hard coating film-applied substrates of Examples 1 to 25 not only exhibited abrasion resistance at a high level, but also exhibited contamination resistance at a high level, and thus were each evaluated to be preferably applicable as a window material for automobiles.

The present application is based on Japanese Patent Application (Japanese Patent Application No. 2018-163683) filed on Aug. 31, 2018 and Japanese Patent Application (Japanese Patent Application No. 2019-070499) filed on Apr. 2, 2019, the contents of which are herein incorporated as reference.

INDUSTRIAL APPLICABILITY

The coating film provided by the present invention, which exhibits abrasion resistance and contamination resistance at high levels, is useful as a hard coating for, for example, a building material, an automobile member, electronic equipment, and an electronic product.

The invention claimed is:

1. A hard coating film-applied substrate, comprising
a substrate, and
a hard coating film formed on one surface and/or both surfaces of the substrate, the hard coating film comprising a polymer nanoparticle (A) dispersed in a matrix component (B), wherein the polymer nanoparticle (A) comprises 60% by mass or more of a hydrolysable silicon compound (a) or a hydrolyzed product or a condensate thereof, and the hydrolysable silicon compound (a) is contained as a main component of the polymer nanoparticle (A) in a content of 50% by mass or more in the polymer nanoparticle (A),
the matrix component (B) comprises a polymer having a structural unit derived from at least one of a hydrolysable silicon compound (b), a hydrolyzed product and a condensate thereof,
a Martens hardness HM of the hard coating film is 100 N/mm$^2$ or more, where the Martens hardness HM is determined based on a value calculated from an indentation depth formed under a measurement condition where a Vickers quadrangular pyramid diamond indenter is pressed at a loading condition of 2 mN/20 sec. and an unloading condition of 2 mN/20 sec., in accordance with ISO14577-1,
a Martens hardness $HM_A$ of the polymer nanoparticle (A) and a Martens hardness $HM_B$ of the matrix component (B) satisfy a relationship of $HM_B/HM_A>1$, and
an elastic recovery rate $\eta_{ITA}$ of the polymer nanoparticle (A), as measured by an indentation test according to ISO14577-1, is 0.30 or more and 0.90 or less.

2. The hard coating film-applied substrate according to claim 1, further comprising an adhesion layer disposed between the substrate and the hard coating film.

3. The hard coating film-applied substrate according to claim 2, wherein the adhesion layer comprises an adhesive emulsion particle (F).

4. The hard coating film-applied substrate according to claim 3, wherein an average particle size of the adhesive emulsion particle (F) is 300 nm or less.

5. The hard coating film-applied substrate according to claim 2, wherein the adhesion layer further comprises an inorganic oxide (G).

6. The hard coating film-applied substrate according to claim 5, wherein the inorganic oxide (G) is a silica particle.

7. The hard coating film-applied substrate according to claim 1, for use in an automobile member.

8. The hard coating film-applied substrate according to claim 1, wherein when a Taber abrasion test is performed under conditions of an abrasive wheel CS-10F and a load of 500 g according to ASTM D1044, a difference between a haze at a rotation number of 500 and a haze at a rotation number of 10 is 10 or less.

9. The hard coating film-applied substrate according to claim 1, wherein when a Taber abrasion test is performed under conditions of an abrasive wheel CS-10F and a load of 500 g according to ASTM D1044, a difference between a haze at a rotation number of 1000 and a haze before the Taber abrasion test is 10 or less.

10. The hard coating film-applied substrate according to claim 1, wherein an elastic recovery rate $\eta_{IT}$ of the hard coating film, as measured by an indentation test according to ISO14577-1, is 0.50 or more.

11. The hard coating film-applied substrate according to claim 1, wherein a film thickness of the hard coating film is 1 μm or more and 100 μm or less.

12. The hard coating film-applied substrate according to claim 1, wherein an average particle size of the polymer nanoparticle (A) is 10 nm or more and 400 nm or less.

13. The hard coating film-applied substrate according to claim 1, wherein a volume fraction of the polymer nanoparticle (A) in the hard coating film is 2% or more and 80% or less.

14. The hard coating film-applied substrate according to claim 1, wherein the hydrolyzable silicon compound (a) comprises one or more selected from a compound having an atomic group represented by the following formula (a-1) and a hydrolyzed product and a condensate thereof, and a compound represented by the following formula (a-2) and a hydrolyzed product and a condensate thereof:

(a-1)

wherein $R^1$ represents a hydrogen atom, an alkyl group, an alkenyl group or an alkynyl group having 1 to 10 carbon atoms, or an aryl group, $R^1$ optionally has a substituent having halogen, a hydroxy group, a mercapto group, an amino group, a (meth)acryloyl group or an epoxy group, $X^1$ represents a hydrolyzable group, and n1 represents an integer of 0 to 2;

$$SiX^2{}_4 \qquad (a\text{-}2)$$

wherein $X^2$ represents a hydrolyzable group.

15. The hard coating film-applied substrate according to claim 1, wherein the matrix component (B) comprises a hydrolyzable silicon compound (b).

16. The hard coating film-applied substrate according to claim 15, wherein the hydrolyzable silicon compound (b) comprises one or more selected from a compound having an atomic group represented by the following formula (b-1) and a hydrolyzed product and a condensate thereof, and a compound represented by the following formula (b-2) and a hydrolyzed product and a condensate thereof:

$$-R^2{}_{n2}SiX^3{}_{3-n2} \qquad (b\text{-}1)$$

wherein $R^2$ represents a hydrogen atom, an alkyl group, an alkenyl group or an alkynyl group having 1 to 10 carbon atoms, or an aryl group, $R^2$ optionally has a substituent having halogen, a hydroxy group, a mercapto group, an amino group, a (meth)acryloyl group or an epoxy group, $X^3$ represents a hydrolyzable group, and n2 represents an integer of 0 to 2;

$$SiX^4{}_4 \qquad (b\text{-}2)$$

wherein $X^4$ represents a hydrolyzable group.

17. The hard coating film-applied substrate according to claim 1, wherein the matrix component (B) further comprises an inorganic oxide (D).

18. The hard coating film-applied substrate according to claim 17, wherein an average particle size of the inorganic oxide (D) is 2 nm or more and 150 nm or less.

19. The hard coating film-applied substrate according to claim 17, wherein the inorganic oxide (D) is a silica particle.

20. The hard coating film-applied substrate according to claim 1, wherein a cohesion force FA of the polymer nanoparticle (A) and a cohesion force FB of the matrix component (B), as measured in a cohesion force mode of a scanning probe microscope, satisfy a relationship of $F_A/F_B>1$, and
a Martens hardness HM of the hard coating film is 100 N/mm² or more.

21. The hard coating film-applied substrate according to claim 1, wherein the Martens hardness $HM_A$ of the polymer nanoparticle (A) and the Martens hardness $HM_B$ of the matrix component (B) satisfy a relationship of $6 \geq HM_B/HM_A > 1$.

22. A coating material composition comprising a polymer nanoparticle (A) and a matrix raw material component (B'), wherein
the polymer nanoparticle (A) comprises 60% by mass or more of a hydrolysable silicon compound (a) or a hydrolyzed product or a condensate thereof, and the hydrolysable silicon compound (a) is contained as a main component of the polymer nanoparticle (A) in a content of 50% by mass or more in the polymer nanoparticle (A),
an elastic recovery rate $\eta_{IT A}$ of the polymer nanoparticle (A), as measured by an indentation test according to ISO14577-1, is 0.30 or more and 0.90 or less, the matrix raw material component (B') comprises a hydrolysable silicon compound (b) or a condensate thereof, and
a Martens hardness $HM_A$ of the polymer nanoparticle (A) and a Martens hardness $HM_{B'}$ of the matrix raw material component (B') satisfy a relationship of $HM_{B'}/HM_A > 1$, where each of the Martens hardness $HM_A$ and $HM_B$ is determined based on a value calculated from an indentation depth formed under a measurement condition where a Vickers quadrangular pyramid diamond indenter is pressed at a loading condition of 2 mN/20 sec. and an unloading condition of 2 mN/20 sec., in accordance with ISO14577-1.

23. The coating material composition according to claim 22, wherein
the polymer nanoparticle (A) comprises a hydrolyzable silicon compound (a), and
the matrix raw material component (B') comprises a hydrolyzable silicon compound (b).

24. The coating material composition according to claim 22, wherein a volume fraction of the polymer nanoparticle (A) based on a total of the polymer nanoparticle (A) and the matrix raw material component (B') is 2 to 80%.

25. The coating material composition according to claim 22, wherein the polymer nanoparticle (A) has a functional group (e) having a secondary amide group and/or a tertiary amide group.

26. The coating material composition according to claim 22, wherein an elastic recovery rate $\eta_{IT B'}$ of the matrix raw material component (B'), as measured by an indentation test according to ISO14577-1, is 0.60 or more and 0.95 or less.

27. The coating material composition according to claim 22, wherein the hydrolyzable silicon compound (a) comprises one or more selected from a compound having an atomic group represented by the following formula (a-1) and a hydrolyzed product and a condensate thereof, and a compound represented by the following formula (a-2) and a hydrolyzed product and a condensate thereof:

$$-R^1{}_{n1}SiX^1{}_{3-n1} \qquad (a\text{-}1)$$

wherein $R^1$ represents a hydrogen atom, an alkyl group, an alkenyl group or an alkynyl group having 1 to 10 carbon atoms, or an aryl group, $R^1$ optionally has a substituent having halogen, a hydroxy group, a mercapto group, an amino group, a (meth)acryloyl group or an epoxy group, $X^1$ represents a hydrolyzable group, and n1 represents an integer of 0 to 2;

$$SiX^2{}_4 \qquad (a\text{-}2)$$

wherein $X^2$ represents a hydrolyzable group.

28. The coating material composition according to claim 22, wherein the hydrolyzable silicon compound (b) comprises one or more selected from a compound having an atomic group represented by the following formula (b-1) and a hydrolyzed product and a condensate thereof, and a compound represented by the following formula (b-2) and a hydrolyzed product and a condensate thereof:

$$-R^2{}_{n2}SiX^3{}_{3-n2} \qquad (b\text{-}1)$$

wherein $R^2$ represents a hydrogen atom, an alkyl group, an alkenyl group or an alkynyl group having 1 to 10 carbon atoms, or an aryl group, $R^2$ optionally has a substituent having halogen, a hydroxy group, a mercapto group, an amino group, a (meth)acryloyl group or an epoxy group, $X^3$ represents a hydrolyzable group, and n2 represents an integer of 0 to 2;

$$SiX^4{}_4 \qquad (b\text{-}2)$$

wherein $X^4$ represents a hydrolyzable group.

29. The coating material composition according to claim 22, wherein the matrix raw material component (B') further comprises an inorganic oxide (D).

30. The coating material composition according to claim 29, wherein an average particle size of the inorganic oxide (D) is 2 nm or more and 150 nm or less.

31. The coating material composition according to claim 29, wherein the inorganic oxide (D) is a silica particle.

32. The coating material composition according to claim 22, wherein the polymer nanoparticle (A) has a core/shell structure comprising a core layer and one or more shell layers covering the core layer.

33. A window material comprising a polycarbonate resin and a coating film disposed on the polycarbonate resin, wherein the coating film comprises a polymer nanoparticle (A) dispersed in a matrix component (B), the polymer nanoparticle (A) comprises 60% by mass or more of a hydrolyzable silicon compound (a) or a hydrolyzed product or a condensate thereof, and the hydrolysable silicon compound (a) is contained as a main component of the polymer nanoparticle (A) in a content of 50% by mass or more in the polymer nanoparticle (A), an elastic recovery rate $\eta_{IT\!A}$ of the polymer nanoparticle (A), as measured by an indentation test according to ISO14577-1, is 0.30 or more and 0.90 or less, the matrix component (B) comprises a polymer having a structural unit derived from at least one of a hydrolyzable silicon compound (b), a hydrolyzed product and a condensate thereof, a Martens hardness $HM_J$ of the window material is 100 N/mm$^2$ or more and 4000 N/mm$^2$ or less, where the Martens hardness $HM_J$ is determined based on a value calculated from an indentation depth formed under a measurement condition where a Vickers quadrangular pyramid diamond indenter is pressed at a loading condition of 2 mN/20 sec. and an unloading condition of 2 mN/20 sec., in accordance with ISO14577-1, a Martens hardness $HM_A$ of the polymer nanoparticle (A) and a Martens hardness $HM_B$ of the matrix component (B) satisfy a relationship of $HM_B/HM_A > 1$, and an elastic recovery rate $\eta_{IT\!J}$ of the window material, as measured by an indentation test according to ISO14577-1, is 0.50 or more.

34. The window material according to claim 33, for use in an automobile.

* * * * *